United States Patent
Takahashi et al.

(10) Patent No.: US 9,617,090 B2
(45) Date of Patent: Apr. 11, 2017

(54) IMAGE FORMING APPARATUS THAT INCLUDES A PLURALITY OF SHEET STORAGE PORTIONS

(71) Applicant: CANON KABUSHIKI KAISHA, Tokyo (JP)

(72) Inventors: Genki Takahashi, Mishima (JP); Masayoshi Fukatsu, Suntou-gun (JP); Hiroharu Tsuji, Numazu (JP); Yohei Suzuki, Mishima (JP); Daisuke Kaneko, Suntou-gun (JP); Kazuhisa Sato, Suntou-gun (JP); Hajime Sugaya, Susono (JP); Yuu Matsuda, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/443,978

(22) PCT Filed: Nov. 12, 2013

(86) PCT No.: PCT/JP2013/006655
§ 371 (c)(1),
(2) Date: May 19, 2015

(87) PCT Pub. No.: WO2014/076943
PCT Pub. Date: May 22, 2014

(65) Prior Publication Data
US 2015/0307295 A1     Oct. 29, 2015

(30) Foreign Application Priority Data

Nov. 19, 2012 (JP) .................................. 2012-253461
Nov. 19, 2012 (JP) .................................. 2012-253462

(Continued)

(51) Int. Cl.
*B65H 29/60* (2006.01)
*B65H 1/04* (2006.01)
(Continued)

(52) U.S. Cl.
CPC ................. *B65H 1/04* (2013.01); *B65H 1/20* (2013.01); *B65H 5/00* (2013.01); *B65H 7/06* (2013.01);
(Continued)

(58) Field of Classification Search
None
See application file for complete search history.

(56) References Cited

U.S. PATENT DOCUMENTS 3,957,264 A * 5/1976 Bach ...................... B65H 29/58
                                                        271/182
4,170,349 A * 10/1979 Baumann ............. B65H 39/115
                                                        271/270

(Continued)

FOREIGN PATENT DOCUMENTS

JP          7-125909 A     5/1995
JP          8-259081 A    10/1996
(Continued)

*Primary Examiner* — Paul F Payer
(74) *Attorney, Agent, or Firm* — Canon U.S.A., Inc. IP Division

(57) ABSTRACT

An image forming apparatus of the invention includes an image forming unit configured to form an image on a sheet; a plurality of storage portions each configured to store the sheet with the image formed thereon by the image forming unit; an opening configured to expose the sheet stored in the storage portion to the outside; and a sheet moving unit configured to move the sheet until a leading edge of the sheet stored in the storage portion passes the opening and a portion of the sheet is exposed from the opening to the outside. The (Continued)

sheet moving unit exposes sheets stored in a plurality of the storage portions in a stacked manner from the opening.

42 Claims, 51 Drawing Sheets

(30) Foreign Application Priority Data

Jun. 20, 2013 (JP) .................................. 2013-129229
Dec. 13, 2013 (JP) .................................. 2012-272626

(51) Int. Cl.
| | | |
|---|---|---|
| *B65H 31/24* | (2006.01) | |
| *G03G 15/00* | (2006.01) | |
| *B65H 31/30* | (2006.01) | |
| *B65H 39/11* | (2006.01) | |
| *B65H 1/20* | (2006.01) | |
| *B65H 5/00* | (2006.01) | |
| *B65H 7/06* | (2006.01) | |
| *G06K 15/02* | (2006.01) | |

(52) U.S. Cl.
CPC ......... *B65H 31/24* (2013.01); *B65H 31/3081* (2013.01); *B65H 39/11* (2013.01); *G03G 15/6552* (2013.01); *G06K 15/1889* (2013.01); *B65H 2402/443* (2013.01); *B65H 2405/35* (2013.01); *B65H 2408/111* (2013.01); *B65H 2511/415* (2013.01); *B65H 2801/06* (2013.01)

(56) References Cited

U.S. PATENT DOCUMENTS

| | | | | | |
|---|---|---|---|---|---|
| 4,534,643 | A | * | 8/1985 | Watanabe | B65H 1/14 271/186 |
| 4,576,371 | A | * | 3/1986 | Takahashi | B65H 39/11 271/188 |
| 4,787,616 | A | * | 11/1988 | Sasaki | B65H 39/11 271/176 |
| 4,822,025 | A | * | 4/1989 | Chung | B65H 31/24 209/933 |
| 5,078,385 | A | * | 1/1992 | Serita | B65H 39/11 271/296 |
| 5,419,548 | A | * | 5/1995 | Ueda | B65H 39/11 271/209 |
| 5,501,449 | A | * | 3/1996 | Olexy | B65H 39/115 271/292 |
| 5,957,450 | A | * | 9/1999 | Kida | G03G 15/6552 271/186 |
| 6,421,582 | B1 | * | 7/2002 | Wada | G03G 15/6538 194/239 |
| 7,711,310 | B2 | * | 5/2010 | Suzuki | G03G 15/00 271/161 |
| 7,872,768 | B2 | * | 1/2011 | Kasamatsu | H04N 1/00342 340/568.1 |
| 7,933,035 | B2 | * | 4/2011 | Okada | G06F 3/1208 270/58.07 |
| 9,017,410 | B2 | * | 4/2015 | Hansell | A61F 2/4425 623/17.15 |

FOREIGN PATENT DOCUMENTS

| | | |
|---|---|---|
| JP | 2003-128325 A | 5/2003 |
| JP | 2005-067157 A | 3/2005 |
| JP | 2007-269486 A | 10/2007 |

* cited by examiner

FIG. 8

| SHEET STORAGE PORTION ID | JOB NUMBER | ATTRIBUTE INFORMATION 355 ||||||||
|---|---|---|---|---|---|---|---|---|
| | | USER | DEPARTMENT | SHEET SIZE | PAPER TYPE | APPLICATION | OS | FUNCTION |
| SHEET STORAGE PORTION 201 | 1 | A | xx | A4 | Type1 | App1 | OS1 | COPY |
| SHEET STORAGE PORTION 202 | 2 | A | xx | LTR | Type1 | App1 | OS1 | PRINT |
| SHEET STORAGE PORTION 203 | 3 | B | xx | LTR | Type2 | App2 | OS2 | COPY |

FIG. 14

| SHEET STORAGE PORTION ID | ATTRIBUTE INFORMATION 355 | | | |
|---|---|---|---|---|
| | JOB NUMBER | PRINT TIME | A.M./P.M. | AFTER/BEFORE 17:00 |
| SHEET STORAGE PORTION 201 | 1,2,3 | 10:00 TO 11:00 | A.M. | BEFORE |
| SHEET STORAGE PORTION 202 | 4 | 15:00 TO 16:00 | P.M. | BEFORE |
| SHEET STORAGE PORTION 203 | 5,6 | 19:00 TO 20:00 | P.M. | AFTER |

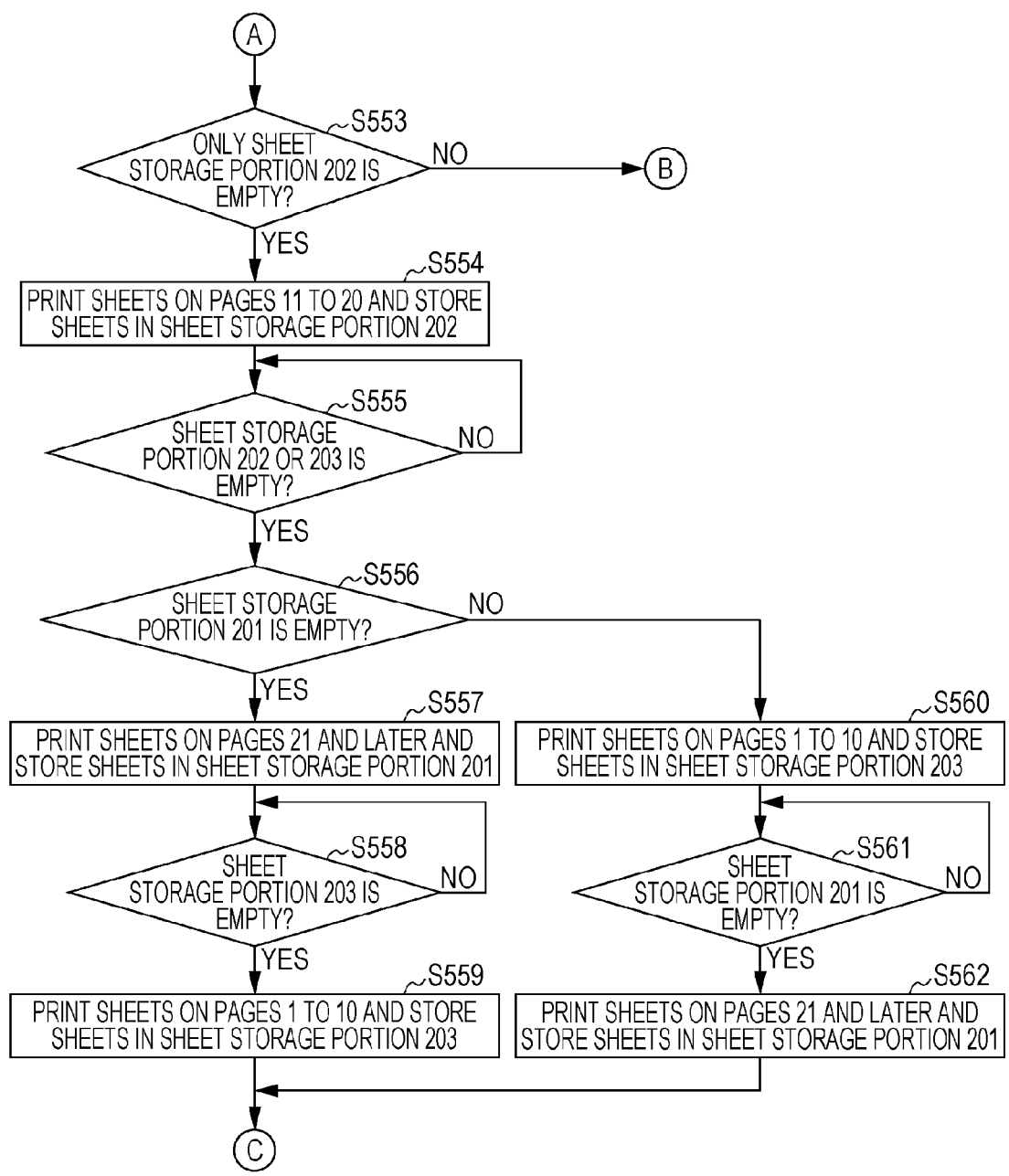

| BASIS WEIGHT | 60 g/m² (THIN PAPER) | 120 g/m² (NORMAL PAPER) | 200 g/m² (THICK PAPER) |
|---|---|---|---|
| ALLOWABLE EXPOSURE LENGTH | 60 mm | 75 mm | 95 mm |

FIG. 46

| BASIS WEIGHT (UPPER STAGE) | 60 g/m² (THIN PAPER) | 200 g/m² (THICK PAPER) |
|---|---|---|
| BASIS WEIGHT (LOWER STAGE) | 200 g/m² (THICK PAPER) | 60 g/m² (THIN PAPER) |
| ALLOWABLE EXPOSURE LENGTH | 87 mm | 60 mm |

FIG. 47

| SIZE | A5 (SMALL-SIZE PAPER) | A4 (MEDIUM-SIZE PAPER) | A3 (LARGE-SIZE PAPER) |
|---|---|---|---|
| ALLOWABLE EXPOSURE LENGTH | 55 mm | 65 mm | 75 mm |

FIG. 50

| SIZE (UPPER STAGE) | A5 (SMALL-SIZE PAPER) | A3 (LARGE-SIZE PAPER) |
|---|---|---|
| SIZE (LOWER STAGE) | A3 (LARGE-SIZE PAPER) | A5 (SMALL-SIZE PAPER) |
| ALLOWABLE EXPOSURE LENGTH | 71 mm | 55 mm |

IMAGE FORMING APPARATUS THAT INCLUDES A PLURALITY OF SHEET STORAGE PORTIONS

TECHNICAL FIELD

The present invention relates to an image forming apparatus including a sheet storage portion that temporarily stores a sheet having an image formed thereon in the apparatus.

BACKGROUND ART

There is an image forming apparatus, such as a copier, of related art including a sheet storage portion that temporarily stores a sheet having an image formed thereon in the apparatus.

PTL 1 describes an image forming apparatus including a plurality of sheet storage portions in the apparatus, in addition to a typical discharge tray that is provided at an upper surface of an apparatus body and is used by a plurality of users in a shared manner. With this image forming apparatus, sheets are sorted to the sheet storage portions different for respective users. To take out a sheet, a user instructs the image forming apparatus to discharge the sheet, and hence the user can take out the sheet from the sheet storage portion corresponding to the user who has instructed the discharge. Accordingly, the user no longer requires a cumbersome work of finding own sheet from a discharge tray, on which own sheet and other sheet are stacked in a mixed manner.

CITATION LIST

Patent Literature

PTL 1: Japanese Patent Laid-Open No. 7-125909

SUMMARY OF INVENTION

Technical Problem

With the image forming apparatus described in PTL 1, to take out the sheet stored in the plurality of sheet storage portions in the apparatus, the user has to instruct discharge of the sheet a plurality of times. Hence, if there are the plurality of sheet storage portions storing sheets that the user wants to take out, the number of times the instruction is made for discharge of the sheets increases, and a cumbersome work and a time are required for taking out the sheets.

Solution to Problem

The present invention provides an image forming apparatus that allows a user to take out sheets stored in a plurality of sheet storage portions without a cumbersome work or a long time.

Accordingly, an image forming apparatus of the invention includes an image forming unit configured to form an image on a sheet; a plurality of storage portions each configured to store the sheet with the image formed thereon by the image forming unit; an opening configured to expose the sheet stored in the storage portion to the outside; and a sheet moving unit configured to move the sheet until a leading edge of the sheet stored in the storage portion passes the opening and a portion of the sheet is exposed from the opening to the outside. The sheet moving unit exposes sheets stored in a plurality of the storage portions in a stacked manner from the opening.

Further features of the present invention will become apparent from the following description of exemplary embodiments with reference to the attached drawings.

BRIEF DESCRIPTION OF DRAWINGS

FIG. 8 illustrates a discharge group according to the first embodiment of the invention.

FIG. 14 illustrates a discharge group according to the second embodiment of the invention.

FIG. 23B provides the flowchart showing the operation of the control unit according to the sixth embodiment of the invention.

FIG. 46 is a table showing an allowable exposure length when sheets having different basis weights are stacked and exposed.

FIG. 47 is a table showing the relationship between the size and the allowable exposure length of a sheet to be exposed.

FIG. 50 is a table showing an allowable exposure length when sheets having different sizes are stacked and exposed.

DESCRIPTION OF EMBODIMENTS

First Embodiment

Embodiments of the invention are described below in detail with reference to the drawings. In a first embodiment, a plurality of sheet storage portions are divided into some groups. Also, an image forming apparatus that allows a user to take out sheets from a plurality of sheet storage portions belonging to a designated group, without a cumbersome work or a long time, is described.

Configuration Diagram of Image Forming Apparatus

Figure 1:
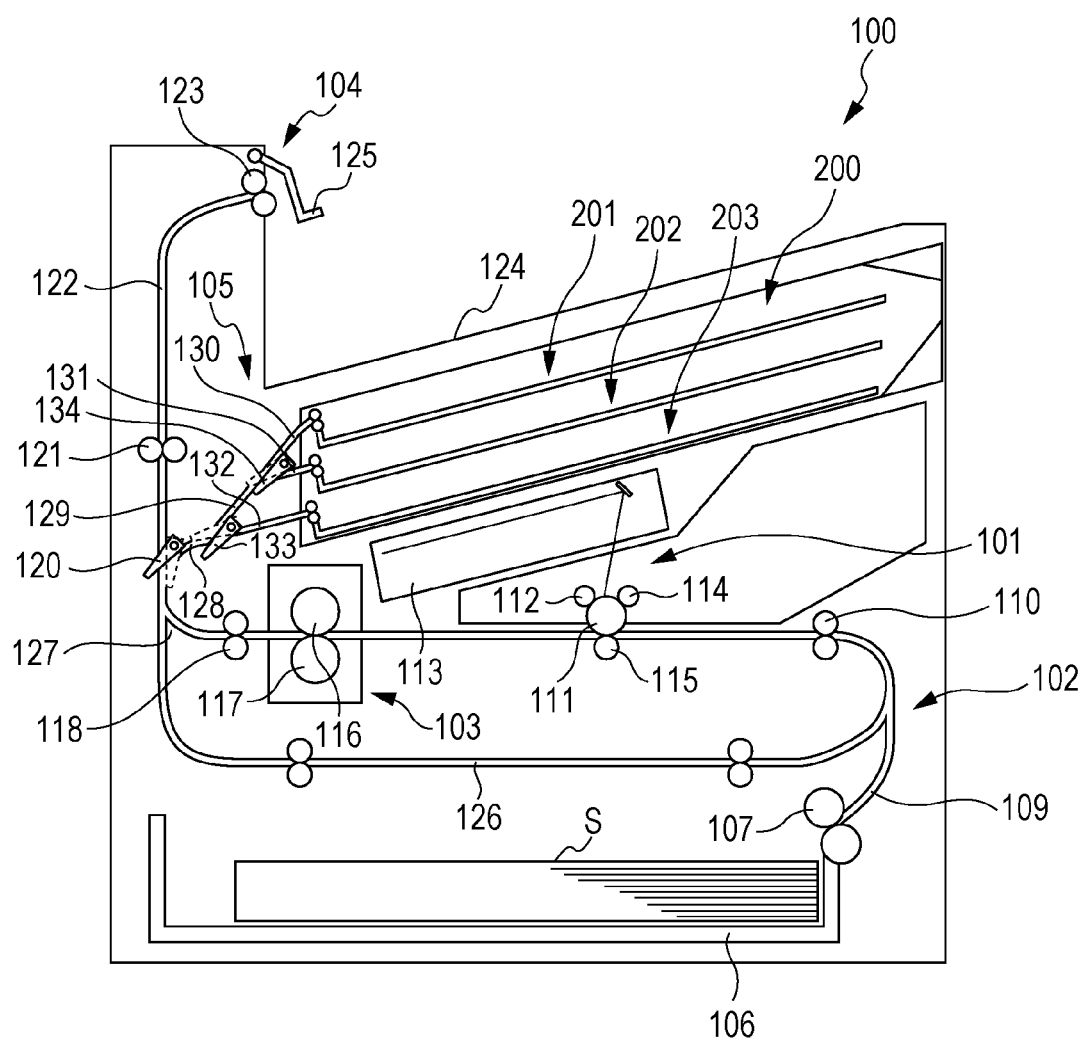
FIG. 1 illustrates a configuration of an image forming apparatus according to an embodiment of the invention.

FIG. 1 illustrates a general structure of an image forming apparatus including sheet storage portions according to the first embodiment of the invention. In this embodiment, a laser beam printer is exemplified.

In FIG. 1, an apparatus body of an image forming apparatus 100 includes an image forming unit 101, a sheet feed unit 102 that feeds a sheet S such as paper to the image forming unit 101, a fixing unit 103 that fixes an image formed on the sheet S to the sheet S, and a sheet discharge unit 104. Also, a sheet storage device 200 is provided above the image forming unit 101. The sheet storage device 200 includes a plurality of sheet storage portions 201 to 203 that temporarily store the sheet S having the image formed thereon in the apparatus. Further, the image forming apparatus 100 includes a sheet conveyance unit 105 that conveys the sheet S having the image formed thereon to the sheet storage device 200.

The image forming unit 101 includes a photosensitive drum 111 that rotates clockwise in FIG. 1, a charging roller 112 that electrically charges the surface of the photosensitive drum 111, and an exposure device 113 that irradiates the photosensitive drum with light and forms an electrostatic latent image. Further, the image forming unit 101 includes a developing device 114 that provides a toner on the electrostatic latent image and forms a toner image on the photosensitive drum, and a transfer roller 115 that transfers the toner image on the conveyed sheet S. The image forming unit 101 forms the toner image on the sheet S by such an image forming process. Further, the fixing unit 103 includes a fixing roller 116, a pressure roller 117 that contacts the fixing roller 116 from below, and a fixing and discharging roller 118. The fixing unit 103 fixes the toner image transferred on the sheet S to the sheet S.

The sheet feed unit 102 includes a feed cassette 106 in which a plurality of sheets S for image formation are stored in a stacked manner, a feed roller 107, a conveyance guide 109, and a registration roller 110. The sheet discharge unit 104 includes a first switch member 120, a conveying roller 121 that can rotate forward and backward, a conveyance guide 122, a discharge roller 123, a discharge tray 124, and a full-state detection lever 125. The first switch member 120 can be switched between a position indicated by solid lines in FIG. 1 to cause the sheet S after image formation to be directed to the sheet storage device 200, and a position indicated by broken lines to cause the sheet S to be discharged on the discharge tray 124, by an actuator (not shown). The discharge tray 124 is provided on the upper surface of the apparatus body of the image forming apparatus 100, and can be used by a plurality of users in a shared manner. On the discharge tray 124, a sheet is discharged such that a surface (front surface) having an image formed thereon faces downward (face down). When the full-state detection lever 125 detects the full state of sheets S, the image forming apparatus does not perform image formation until the sheets S on the discharge tray 124 are taken out.

Also, a duplex conveyance path 126 that is used when image formation is performed on both front and back surfaces of a sheet S is provided between the image forming unit 101 and the feed cassette 106. When image formation is performed on both surfaces of a sheet S, a sheet S having an image fixed to one surface (front surface) is conveyed toward the discharge tray 124, and then the conveying roller 121 and the discharge roller 123 are rotated backward at a timing when the trailing edge of the sheet S passes a branch point 127. Accordingly, the sheet S is switched back, and is guided to the duplex conveyance path 126. The sheet S passes through the area between the image forming unit 101 and the fixing unit 103 again from the path, and hence an image can be formed on the other surface (back surface) of the sheet S.

The sheet conveyance unit 105 includes a second switch member 133 and a third switch member 134 for switching the conveyance target of the sheet S, and conveyance guides 128 to 132 that guide the sheet S to one of the sheet storage portions. The second switch member 133 and the third switch member 134 can be each switched between a position indicated by solid lines in FIG. 1 and a position indicated by broken lines, by an actuator (not shown). For example, when the sheet S is conveyed to the first sheet storage portion 201, the second switch member 133 and the third switch member 134 are positioned at the respective positions indicated by the solid lines in FIG. 1. The sheet S successively passes through the conveyance guides 128, 129, and 130, and then is conveyed to the first sheet storage portion 201. Also, when the sheet S is conveyed to the second sheet storage portion 202, only the third switch member 134 is switched to a position indicated by the broken lines. In this case, the sheet S successively passes through the conveyance guides 128, 129, and 131, and then is conveyed to the second sheet storage portion 202. Like the discharge tray 124, a sheet is stored in a face-down state in one of the sheet storage portions.

Configuration Diagram of Sheet Storage Device in First Embodiment

Figure 2:
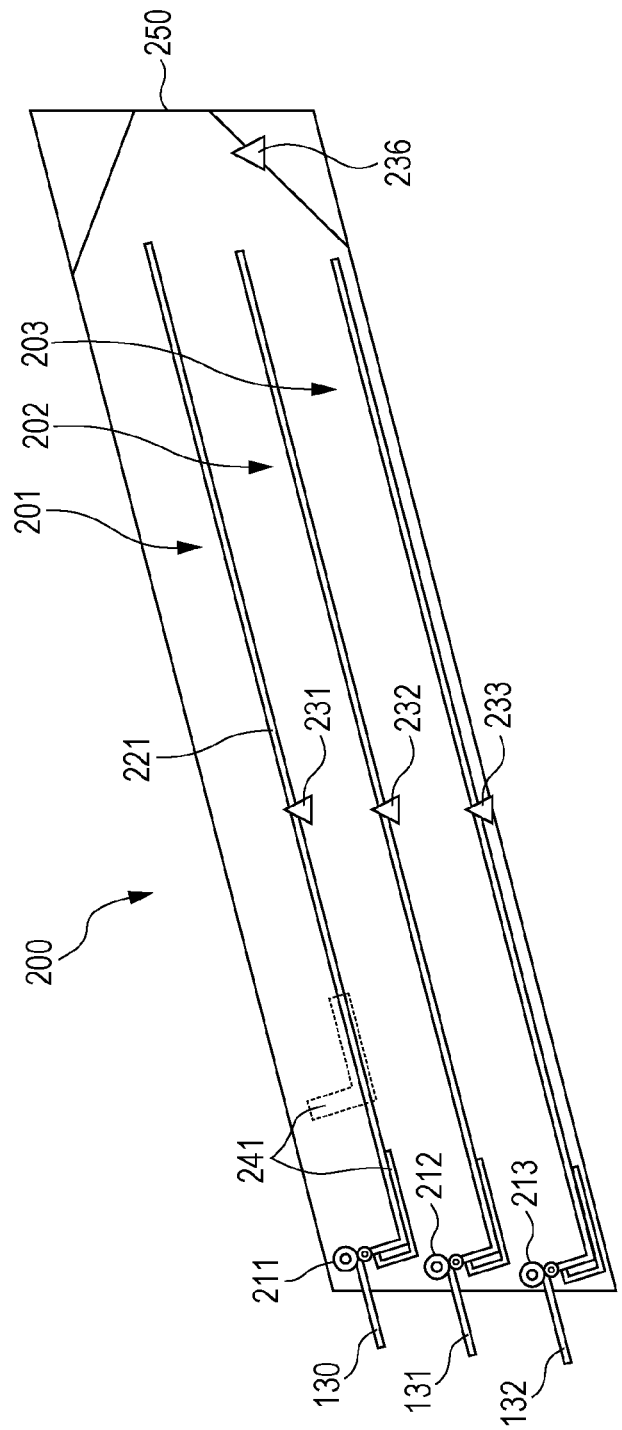
FIG. 2 illustrates a configuration of a sheet storage device according to first and second embodiments of the invention.

FIG. 2 illustrates a configuration of the sheet storage device 200. In the sheet storage device of this embodiment, a plurality of stages of sheet storage portions are vertically stacked. The respective sheet storage portions have the same configuration. Here, the configuration of the first sheet storage portion 201 is described.

The first sheet storage portion 201 includes a conveying roller 211 that conveys and stacks a sheet, a stack tray 221 that stacks and temporarily stores the sheet, and a sheet sensor 231 that detects whether the sheet is stored on the stack tray or not. Further, the first sheet storage portion 201 includes a sheet moving unit 241 that presses the trailing edge of the stored sheet (an upstream edge in a conveying direction of the sheet), and causes the leading edge of the stored sheet (a downstream edge in the conveying direction of the sheet) to be exposed to the outside of the image forming apparatus 100. The sheet moving unit 241 moves the sheet to a position at which the user can take out the sheet, that is, until the leading edge of the sheet passes an opening 250. Further, the first sheet storage portion 201 is arranged near the opening 250, and includes an opening sensor 236 that detects a taken out state of the sheet exposed to the outside of the apparatus. The stack tray 221 has a length set such that, even when a sheet with the maximum size being able to be stored in the first sheet storage portion 201 is stacked, the leading edge of the sheet is not exposed from the opening 250. If sheets are successively conveyed to the first sheet storage portion 201, the sheet moving unit 241 is located at a stack position indicated by solid lines in FIG. 2 so as not to disturb conveyance and stacking of the sheets. In contrast, to expose the stored sheets, the sheet moving unit 241 can move toward the opening 250 in the sheet conveying direction, and can move to an exposure position indicated by broken lines so as to expose the sheets.

Figure 3:
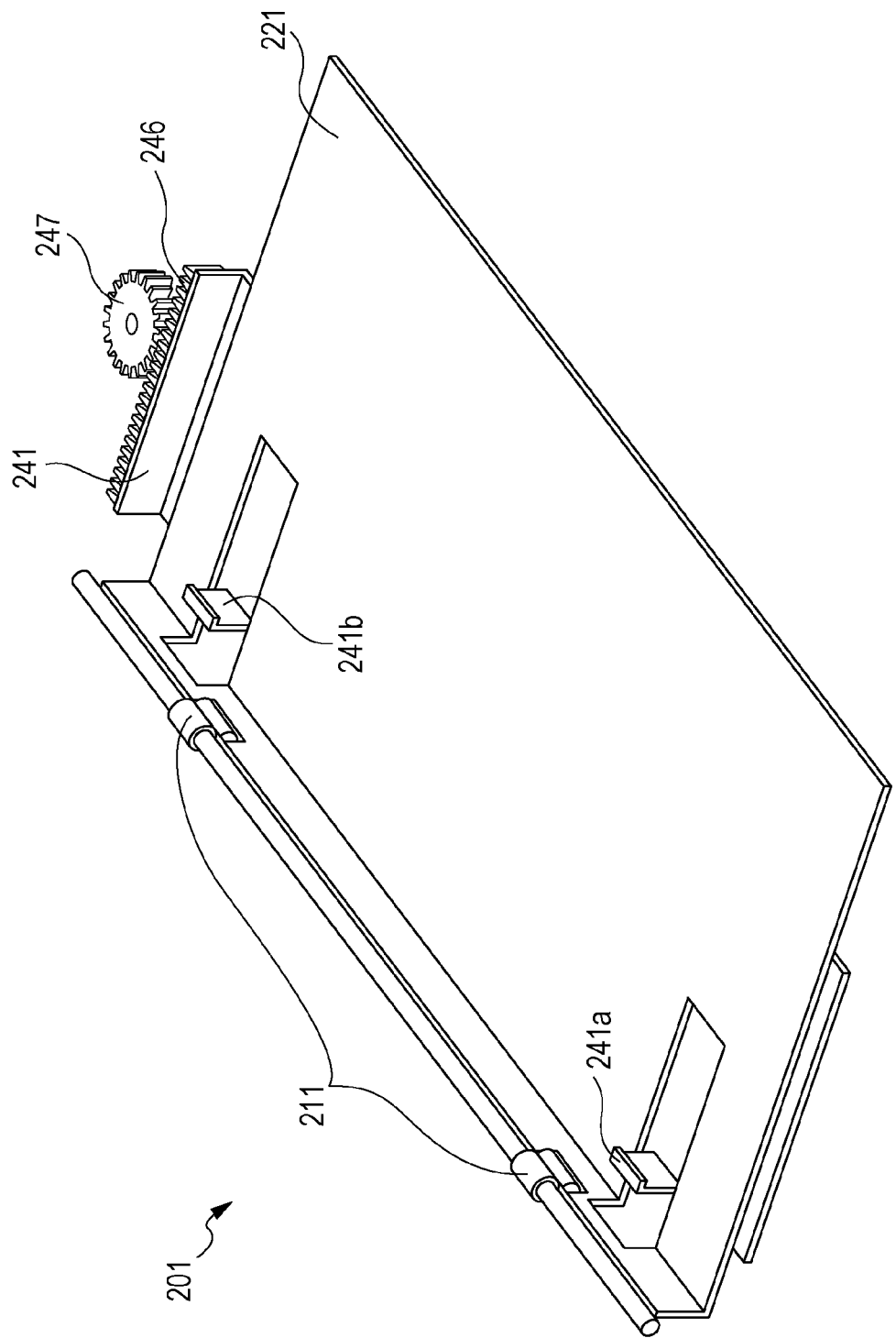
FIG. 3 is a perspective view of the sheet storage device according to the first and second embodiments of the invention.

FIG. 3 is a perspective view of the sheet storage device 200. In FIG. 3, the sheet moving unit 241 is located at a position between the stack position and the exposure position. The sheet moving unit 241 has two sheet trailing-edge pressing portions 241a and 241b arranged along a sheet width direction. Also, the sheet moving unit 241 has a rack 246 integrally formed therewith. The rack 246 meshes with a pinion 247. The pinion 247 is connected with an actuator, which is a driving unit (not shown in FIG. 3). The actuator is driven forward or backward, and hence the sheet moving unit 241 can reciprocate between the stack position and the exposure position.

Block Diagram of Control Unit and Function Configuration in First Embodiment

Figure 4:
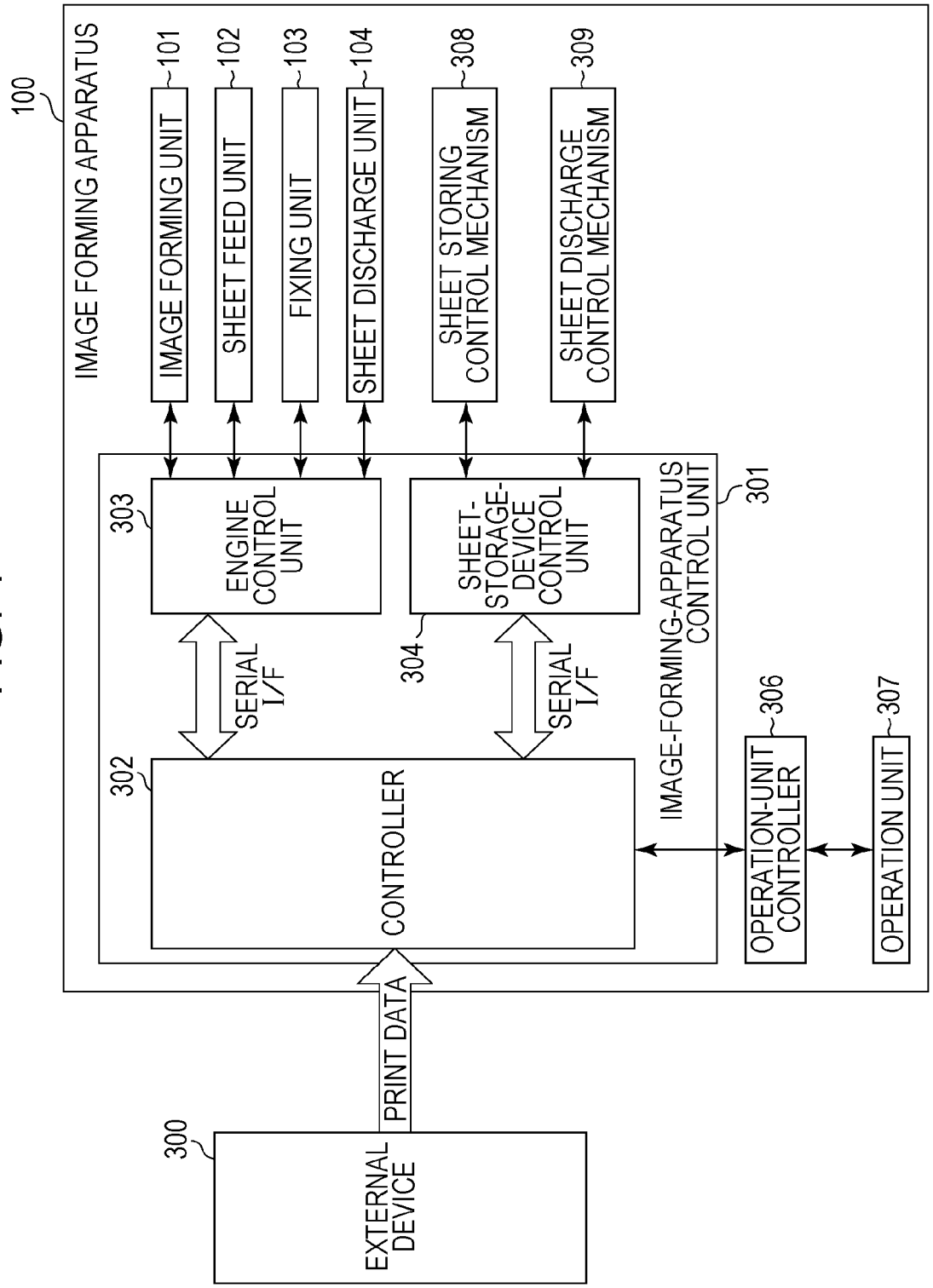
FIG. 4 is a block diagram showing a control unit and a function configuration of an image forming apparatus according to the first and second embodiments of the invention.

FIG. 4 is a block diagram showing a control unit and a function configuration in this embodiment. The image forming apparatus 100 includes an image-forming-apparatus control unit 301 as the control unit. The image-forming-apparatus control unit 301 includes a controller 302, an engine control unit 303, and a sheet-storage-device control unit 304.

The controller 302 makes communication with an external device 300 such as a host computer and receives print data. Also, the controller 302 designates a print condition that is created from the print data, for the engine control unit 303 through a serial UF, and instructs printing. The engine control unit 303 controls respective mechanisms under the print condition received from the controller 302. To be specific, the engine control unit 303 controls the sheet feed unit 102 and the sheet discharge unit 104 to feed and discharge a sheet, and controls the image forming unit 101 and the fixing unit 103 to form an image on and fixing the image to the sheet.

Also, the controller 302 designates a storing condition and a discharge condition, for the sheet-storage-device control unit 304 through a serial I/F. The sheet-storage-device control unit 304 controls respective mechanisms under the storing condition and the discharge condition received from the controller 302. To be specific, the sheet-storage-device control unit 304 controls a sheet storing control mechanism 308 including the conveying roller 211 to convey the sheet with the image formed thereon to one of the sheet storage portions, and controls a sheet discharge control mechanism 309 including the sheet moving unit 241 to move the sheet stored in one of the sheet storage portions to the opening 250. Also, an operation-unit controller 306 performs control of notifying the controller 302 about various settings and a discharge instruction made by the user with an operation unit 307.

Detail of Sheet-Storage-Device Control Unit in First Embodiment

Figure 5:
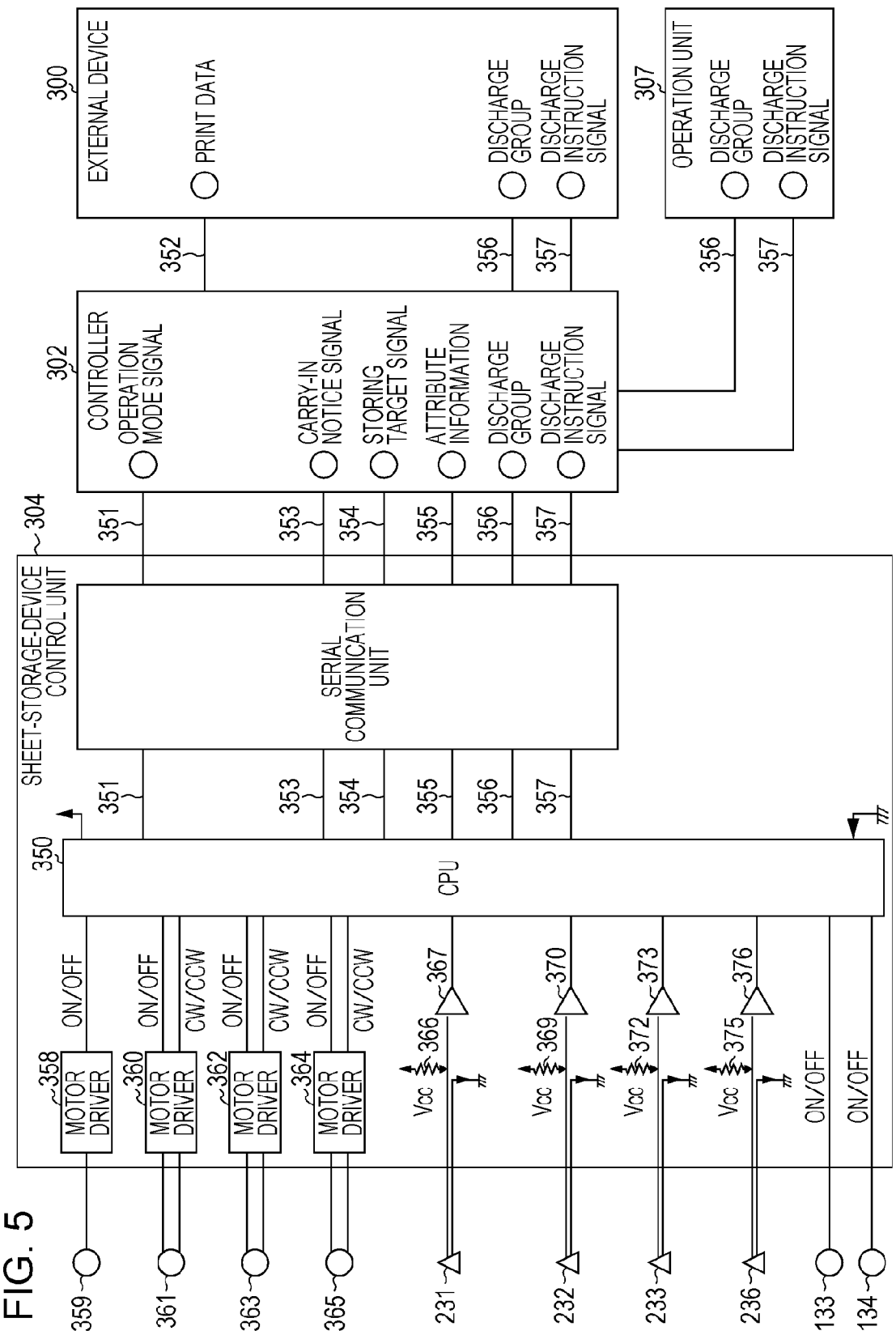
FIG. 5 is a detailed view of a sheet-storage-device control unit according to the first embodiment of the invention.

FIG. 5 is a detailed view of the sheet-storage-device control unit 304 in this embodiment. The sheet-storage-device control unit 304 includes a CPU 350, and makes communication with the controller 302 through a serial communication unit. The serial communication unit connects the CPU 350 with the controller 302 through a plurality of signal lines.

When the controller 302 is notified of print data 352 through the external device 300, the controller 302 notifies the CPU 350 of signals, such as an operation mode signal 351, a carry-in notice signal 353, and a storing target signal 354, via the serial communication unit. Further, the controller 302 functions as an attribute information adding unit that adds attribute information 355 to print information corresponding to each sheet. The attribute information 355 contains a job number of a sheet, user information of user who has instructed printing of the sheet, a sheet size, etc. The controller 302 stores the attribute information 355 in association with the printed sheet. An operation mode set by the operation mode signal 351 determines a way of sorting sheets to the plurality of sheet storage portions. In this embodiment, it is assumed that the operation mode signal 351 previously sets a first sorting mode. The first sorting mode is a mode that sorts sheets to sheet storage portions for respectively different job numbers. The CPU 350 controls each actuator (described later), and conveys a printed sheet to one of the sheet storage portions.

Also, the controller 302 creates a discharge group 356 by grouping sheets having the same information contained in the attribute information 355 of each job. For the discharge group 356, for example, a group having the same user information, a group having the same sheet size, etc., may be created. The controller 302 notifies the user about a plurality of created discharge groups through the external device 300 or the operation unit 307. The user may designate one discharge group from the plurality of discharge groups 356, and the discharge may be performed. When the user selects the discharge group 356 through the external device 300 or the operation unit 307 and designates the discharge, the controller 302 is notified of the discharge instruction signal 357. The controller 302 determines that the sheets in the sheet storage portion belonging to the selected discharge group 356 are exposed from the opening. The controller 302 notifies the CPU 350 of a discharge instruction signal 357 through the serial communication unit, and instructs the discharge to the corresponding sheet storage portion. The CPU 350 controls each actuator (described later) to cause the sheets in the notified sheet storage portion to be exposed from the opening.

Next, each actuator connected with the CPU 350 is described.

A motor driver 358 is connected with an output terminal of the CPU 350. The motor driver 358 drives a convey motor 359. When the convey motor 359 is rotated, conveying rollers 211, 212, and 213 are rotated and convey sheets to the respective sheet storage portions.

A motor driver 360 is connected with an output terminal of the CPU 350. The motor driver 360 drives a discharge motor 361. When the discharge motor 361 is rotated in the clockwise direction (CW direction), the sheet moving unit 241 of the first sheet storage portion 201 moves to the exposure position, and the sheet is exposed to the outside from the opening 250. When the discharge motor 361 is rotated in the counter-clockwise direction (CCW direction), the sheet moving unit 241 of the first sheet storage portion moves to the stack position. Similarly, motor drivers 362 and 364 are connected with output terminals of the CPU 350, and respectively drive discharge motors 363 and 365. The discharge motor 363 controls a sheet moving unit 242 (not shown) of the second sheet storage portion 202, and the discharge motor 365 controls a sheet moving unit 243 (not shown) of the third sheet storage portion 203.

The sheet sensor 231 uses a pull-up resistance 366 and inputs information indicative of whether or not a sheet is stored in the first sheet storage portion 201 to the CPU 350 through a buffer 367. Similarly, a sheet sensor 232 uses a pull-up resistance 369 and inputs information indicative of whether or not a sheet is stored in the second sheet storage portion to the CPU 350 through a buffer 370. A sheet sensor 233 uses a pull-up resistance 372 and inputs information indicative of whether or not a sheet is stored in the third sheet storage portion to the CPU 350 through a buffer 373.

An opening sensor 236 uses a pull-up resistance 375 and inputs information indicative of whether or not a sheet is exposed at the opening 250, to the CPU 350 through a buffer 376.

An actuator that switches the second switch member 133 is connected with an output terminal of the CPU 350. When the actuator is ON, the second switch member 133 is switched to convey a sheet toward the conveyance guide 129. When the actuator is OFF, the second switch member 133 is switched to convey a sheet toward the conveyance guide 132. Similarly, an actuator that switches the third switch member 134 is connected with an output terminal of the CPU 350. The third switch member 134 is switched to convey a sheet toward the conveyance guide 130 when the actuator is ON, and is switched to convey a sheet toward the conveyance guide 131 when the actuator is OFF.

Description on Operation of Controller

Figure 6:
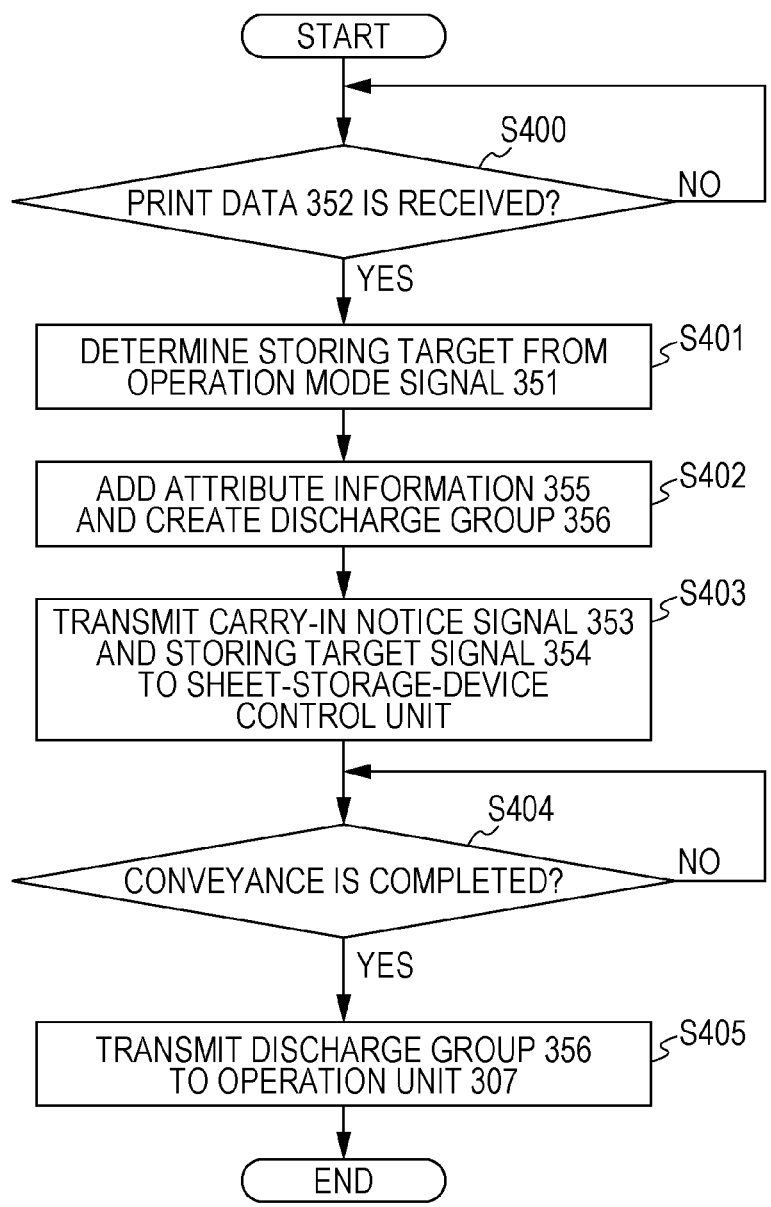
FIG. 6 is a flowchart showing an operation of a controller when a sheet is stored according to the first and second embodiments of the invention.

Next, an operation of the controller 302 when sheets are conveyed to the sheet storage device 200 is described with reference to FIG. 6.

When the controller 302 receives the print data 352 from the external device 300 (S400), the controller 302 determines a storing target in accordance with a previously set operation mode. In this embodiment, it is assumed that the mode is the first sorting mode in which the storing target is switched every job number (S401). Then, the attribute information 355 is added to print information corresponding to each sheet, and the discharge group 356 is created. In this embodiment, an example is provided in which three pieces of print data with different job numbers are received, and a discharge group shown in FIG. 8 is created (S402). Then, the carry-in notice signal 353 and the storing target signal 354 are transmitted to the sheet-storage-device control unit 304 (S403). When completion of conveyance is received from the sheet-storage-device control unit 304 (S404), the discharge group 356 is transmitted to the operation unit 307, and the processing is ended (S405).

Figure 7:
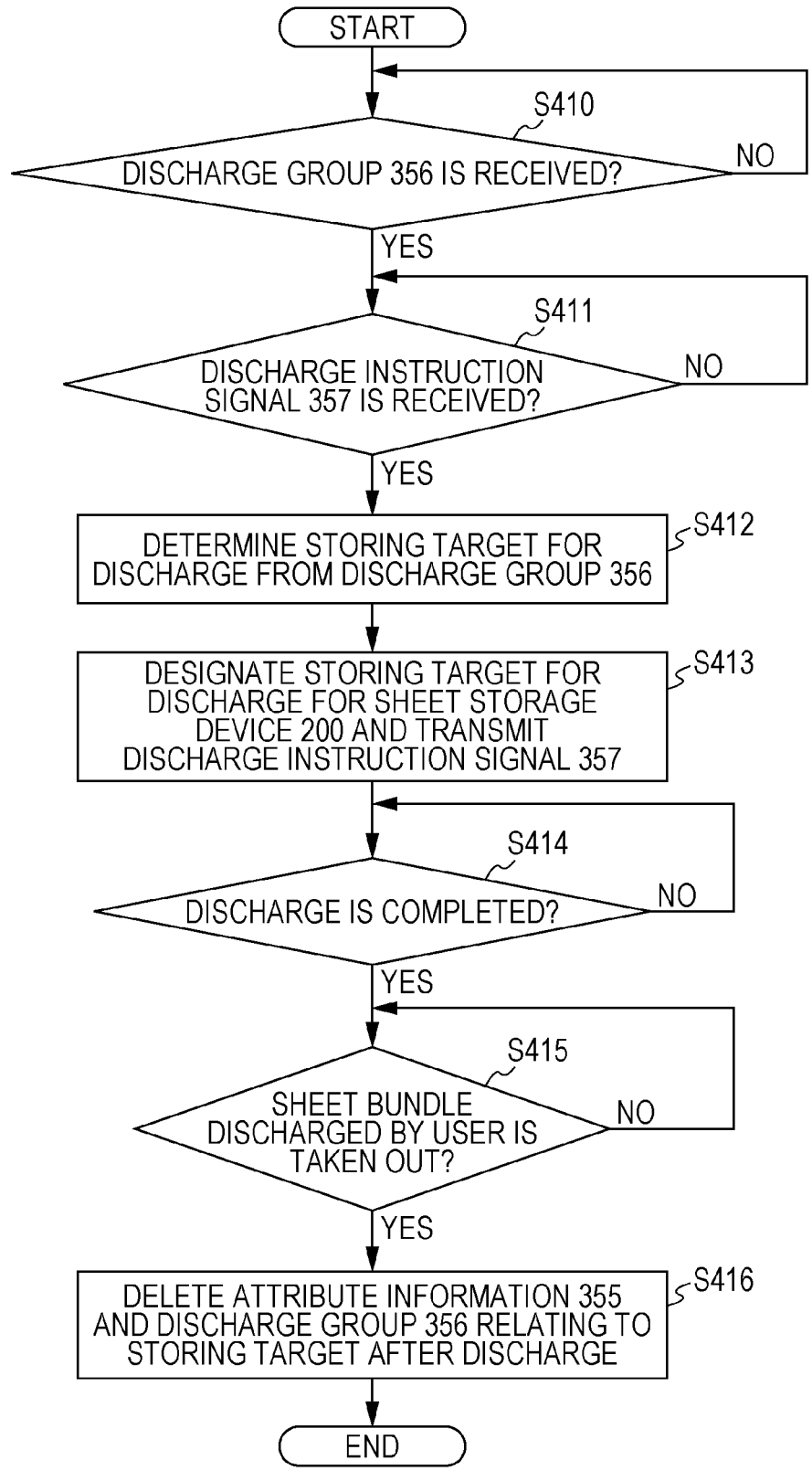
FIG. 7 is a flowchart showing an operation of the controller when a sheet is discharged according to the first and second embodiments of the invention.

Next, an operation of the controller 302 when sheets are exposed to the outside from the sheet storage device 200 is described with reference to FIG. 7.

When the controller 302 receives the discharge group 356 selected by the user through the operation unit 307 (S410) and receives the discharge instruction signal 357 (S411), the controller 302 determines the storing target for discharge based on the discharge group 356 (S412). Then, the storing target for the discharge is designated for the sheet-storage-device control unit 304, and the discharge instruction signal 357 is transmitted (S413). When notification about the completion of discharge is received from the sheet-storage-device control unit 304 (S414) and a taken out state of a sheet bundle exposed at the opening by the user is received (S415), the attribute information 355 and the discharge group 356 relating to the storing target after the discharge are deleted, and the processing is ended (S416).

It is to be noted that "APPLICATION" in the attribute information 355 shown in FIG. 8 represents application software of an external device used when a sheet is printed. Also, "OS" represents an operating system of an external device used when a sheet is printed. Also, "FUNCTION" represents a function of an image forming apparatus used when a sheet is printed. For example, information of a copy function or a print function is added.

Figure 9:
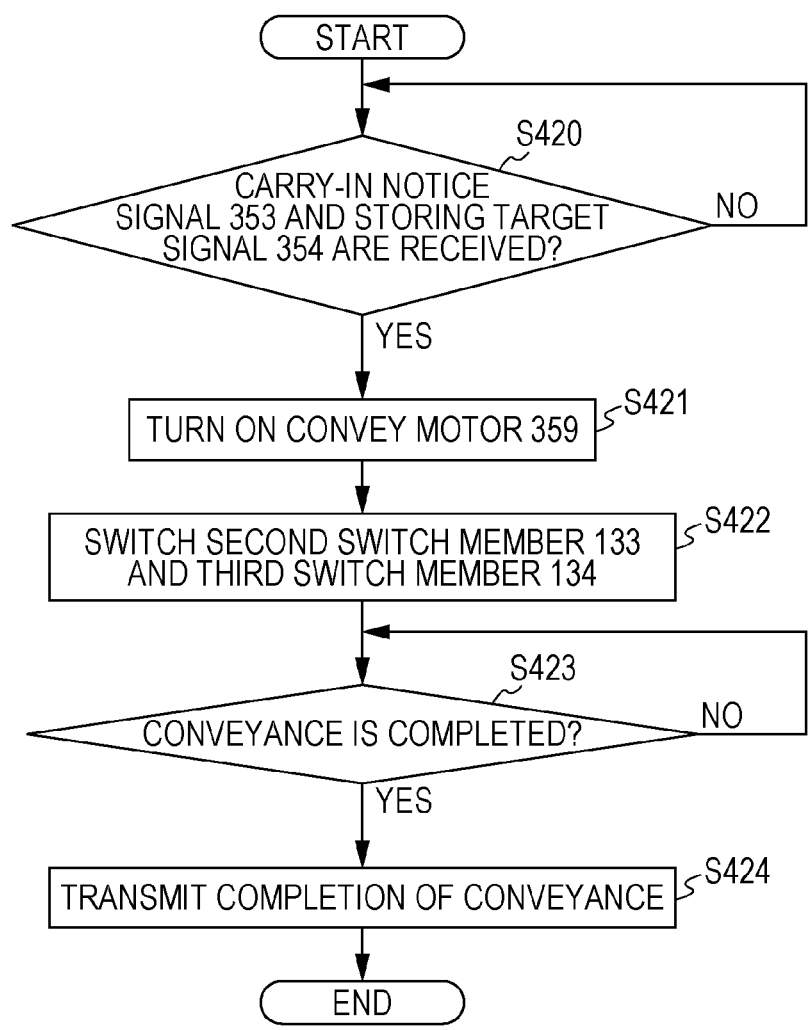
FIG. 9 is a flowchart showing an operation of the sheet-storage-device control unit when a sheet is stored according to the first and second embodiments of the invention.

Description on Operation of Sheet-Storage-Device Control Unit in First Embodiment Next, an operation of the sheet-storage-device control unit 304 when sheets are conveyed to the sheet storage device 200 is described with reference to FIG. 9.

When the carry-in notice signal 353 and the storing target signal 354 are received from the controller 302 (S420), the convey motor 359 is turned ON (S421). Then, the second switch member 133 and the third switch member 134 are switched to allow the sheets to be conveyed to the storing target designated by the received storing target signal 354 (S422). When the conveyance to the designated storing target is completed (S423), the completion of conveyance is transmitted to the controller 302 (S424).

Figure 10:
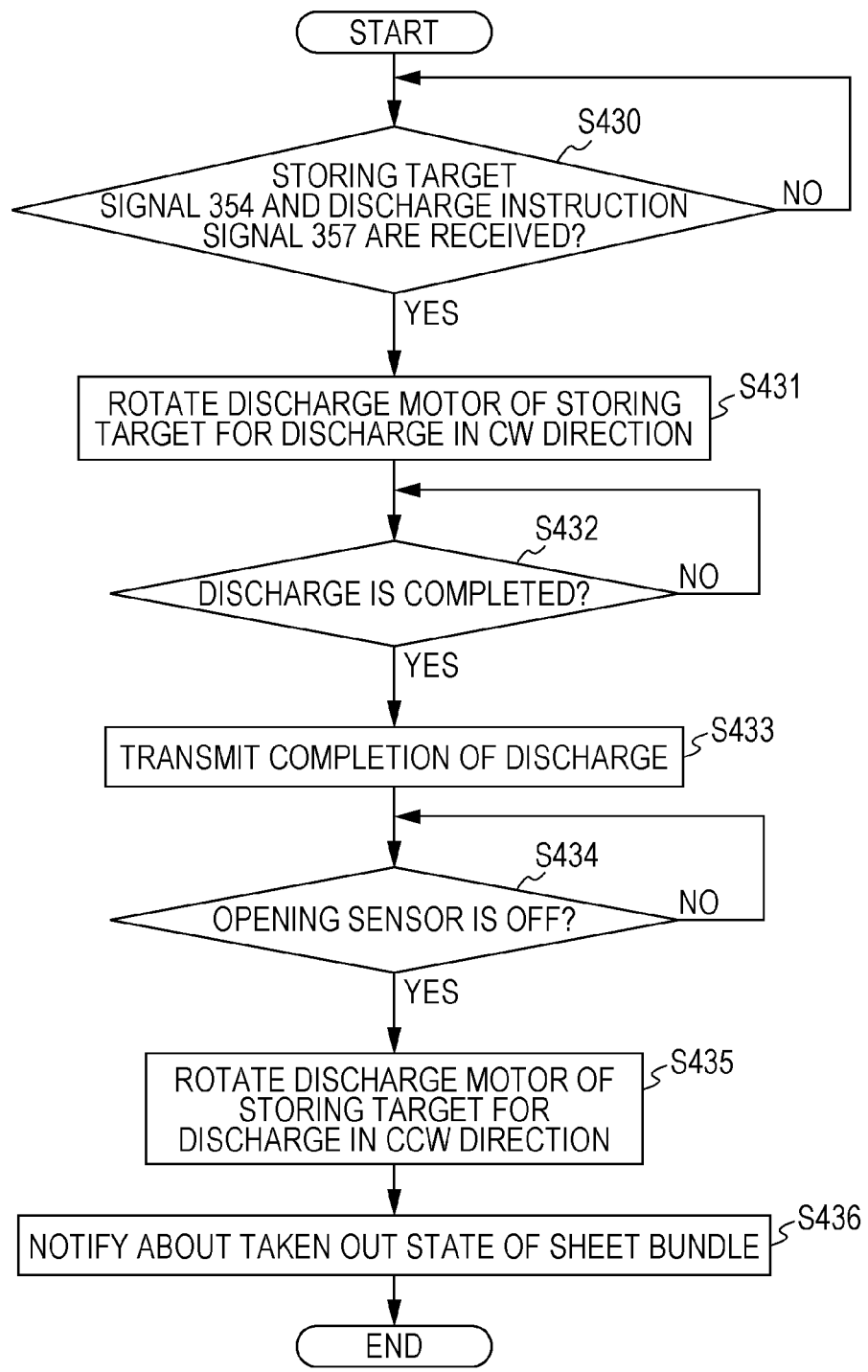
FIG. 10 is a flowchart showing an operation of the sheet-storage-device control unit when a sheet is discharged according to the first and second embodiments of the invention.

Next, an operation of the sheet-storage-device control unit 304 when sheets are exposed to the outside from the sheet storage device 200 is described with reference to FIG. 10.

When the storing target signal 354 and the discharge instruction signal 357 for the discharge are received (S430), the discharge motor of the storing target for the discharge is rotated in the CW direction to move the sheet moving unit to the exposure position (S431). Then, when the sheets are exposed from the opening 250 (S432), the completion of discharge is transmitted to the controller 302 (S433). Then, when the opening sensor 236 of the opening 250 is turned OFF (S434), the discharge motor is rotated in the CCW direction to return the sheet moving unit to the stack position (S435), and notifies the controller 302 about a taken out state of a sheet bundle (S436).

Figure 11:
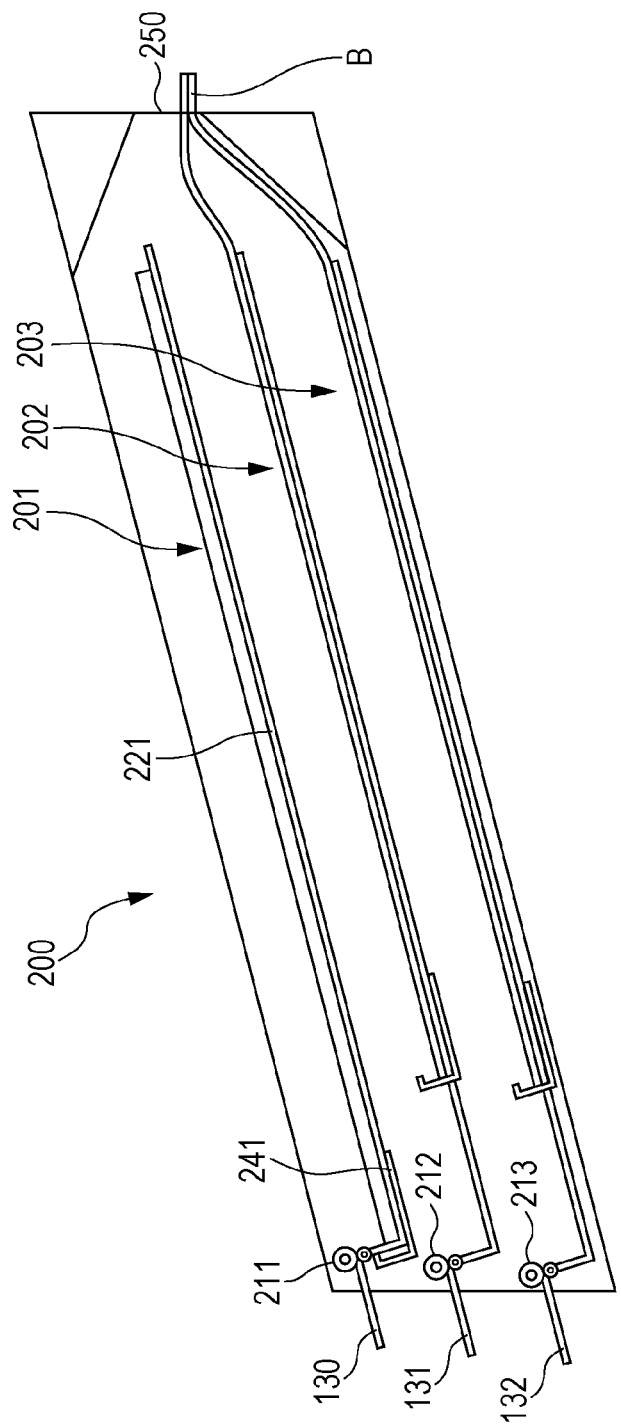
FIG. 11 illustrates a state of the sheet storage device when sheets are discharged according to the first embodiment of the invention.
Figure 12:
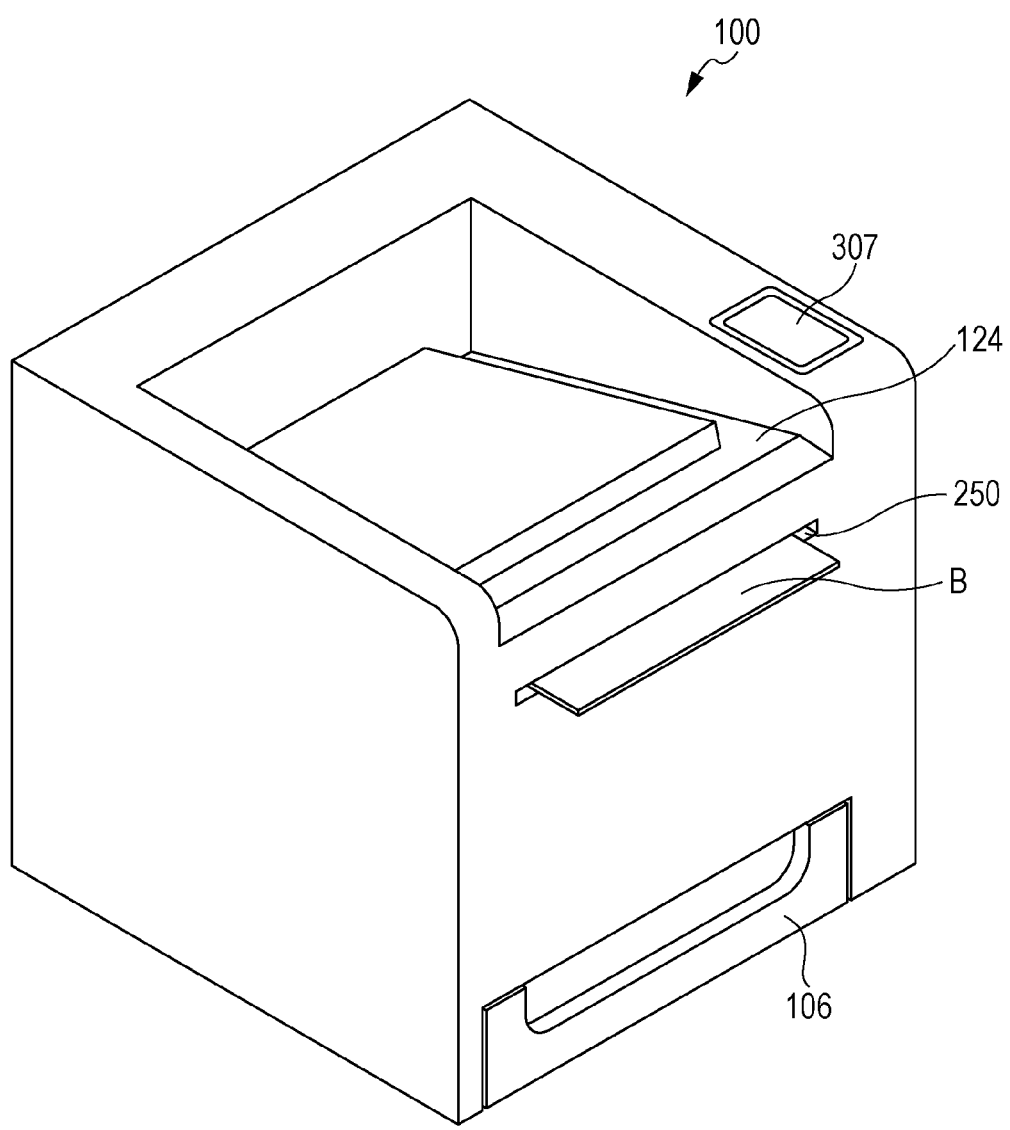
FIG. 12 is a perspective view of an apparatus body when sheets are discharged according to the first embodiment of the invention.

In FIG. 8, if the discharge group selected by the user has a sheet size of letter (LTR), the sheet storage portions 202 and 203 become the storing targets for the discharge. At this time, the sheet moving units of both sheet storage portions 202 and 203 are driven, and the sheets stored in the sheet storage portions are exposed from the same opening. Accordingly, the user can collectively take out the sheets stored in the plurality of sheet storage portions. FIG. 11 illustrates a state of the sheet storage device 200 at this time. FIG. 12 is a perspective view of the apparatus body of the image forming apparatus 100. A sheet bundle B is formed by stacking sheets stored in the sheet storage portions 202 and 203, and is exposed to the outside at the opening 250.

With the above-described embodiment, the user can take out the sheets from the plurality of sheet storage portions belonging to the designated group, without a cumbersome work or a long time.

Second Embodiment

In the first embodiment, the discharge group is created by sorting sheets to the corresponding sheet storage portion every job number in accordance with the previously set first sorting mode. In this embodiment, an image forming apparatus that allows a user to set a condition of sorting sheets for sheet storage portions is described. Major part of description is similar to the first embodiment, and only part different from the first embodiment is described here.

Detail of Sheet-Storage-Device Control Unit in Second Embodiment

Figure 13:
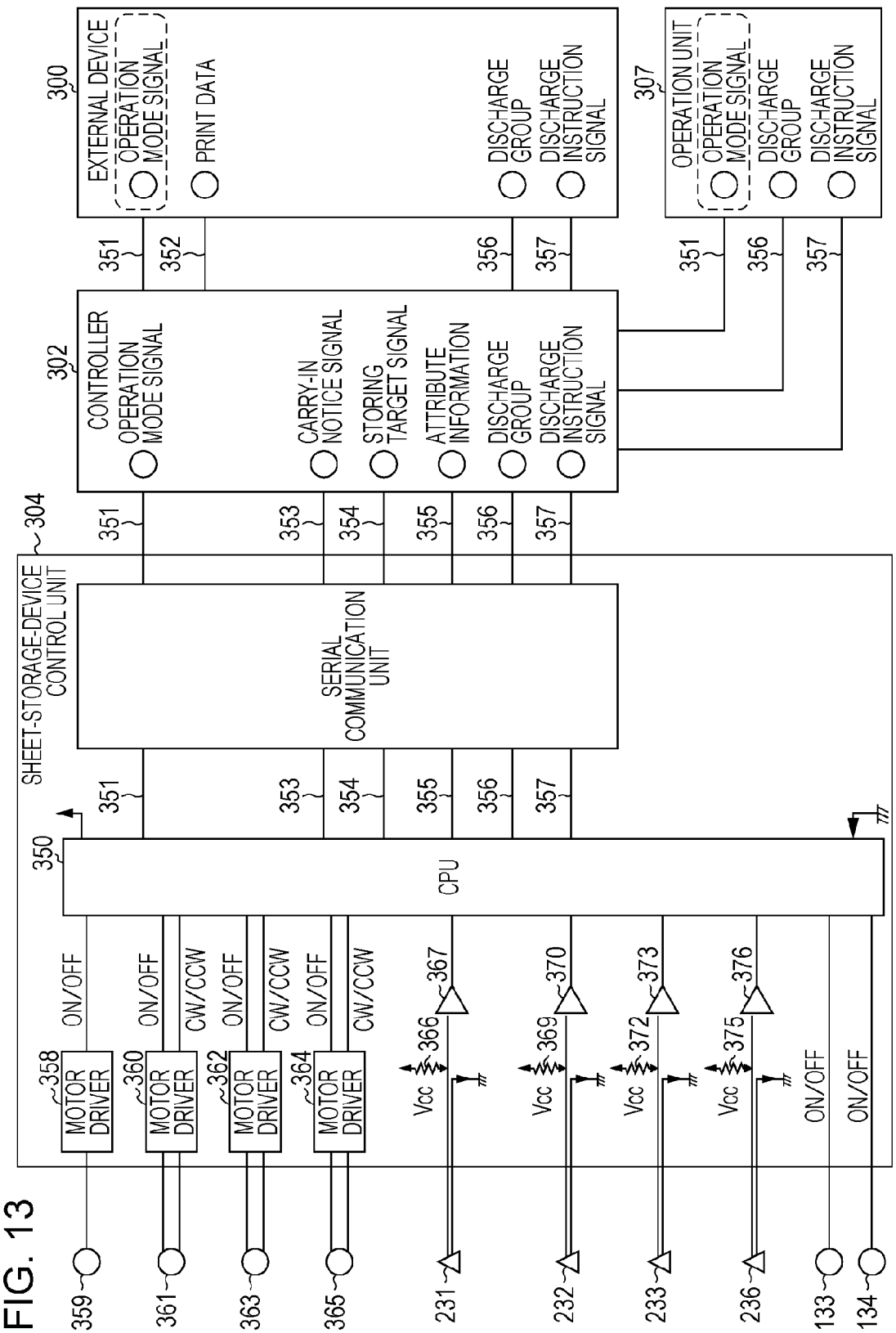
FIG. 13 is a detailed view of a sheet-storage-device control unit according to the second embodiment of the invention.

FIG. 13 is a detailed view of a sheet-storage-device control unit 304 in this embodiment. A point different from FIG. 5 is that the user can set an operation mode through the external device 300 or the operation unit 307. The operation unit 307 functions as an attribute information designating unit provided in the image forming apparatus 100. When the user sets the operation mode through the external device 300 or the operation unit 307, the controller 302 is notified of the content, and the controller 302 notifies the CPU 350 of an operation mode signal 351 through the serial communication unit. The CPU 350 controls each actuator in accordance with the notified operation mode signal 351. It is assumed that the operation mode is previously set by the user before the processing for the print data 352 is performed. The processing for the print data 352 is performed similarly to the first embodiment.

Description on Operation of Sheet-Storage-Device Control Unit in Second Embodiment Communication between the controller 302 and the sheet-storage-device control unit 304 is made similarly to the first embodiment. To describe a more specific operation, a case is considered in which six pieces of print data with respectively different job numbers are received.

In the case of the first sorting mode in the first embodiment, since the storing target is switched every job number, all sheet storage portions may be used in a moment. Owing to this, the operation mode is allowed to be set by the user, and sheets are sorted to sheet storage portions under the condition set by the user. In this embodiment, a second sorting mode is set as the operation mode. The second sorting mode is a mode that switches the storing target of sheets every predetermined time. Since the second sorting mode is employed, a plurality of jobs can be stacked on one sheet storage portion. Further, the controller 302 adds attribute information 355, such as, a job number, a print time, whether the print time belongs to forenoon (a.m.) or afternoon (p.m.), and whether the print time belongs to before a predetermined time or after the predetermined time, to print information corresponding to each sheet, and creates a discharge group 356 shown in FIG. 14.

In FIG. 14, if the discharge group selected by the user belongs to afternoon from among forenoon and afternoon, the sheet storage portions 202 and 203 become the storing targets for the discharge. At this time, the sheet moving units of both sheet storage portions 202 and 203 are driven, and the sheets stored in the sheet storage portions are exposed from the same opening. Accordingly, the user can collectively take out the sheets stored in the plurality of sheet storage portions. Also, in FIG. 14, since a plurality of pieces of the attribute information 355 with different job numbers are included in one sheet storage portion, such pieces do not form a discharge group.

With the above-described embodiment, since the user can set the condition for sorting sheets to the sheet storage portions, the sorting condition can be changed flexibly by the user setting. Also, the user can take out sheets from a plurality of sheet storage portions belonging to a designated group, without a cumbersome work or a long time.

In the above-described first and second embodiments, the sheet moving units of the respective sheet storage portions have the individual actuators. Accordingly, by driving the actuators simultaneously, a plurality of sheet bundles can be exposed in a stacked manner. Alternatively, actuators may be provided by a number smaller than the number of sheet storage portions, and for example, a drive transmission switch unit, such as a clutch (not shown), may be provided. Accordingly, a plurality of sheet moving units may be selectively moved by one actuator.

Also, in the above-described first and second embodiments, the configuration with the three sheet storage portions is described. However, the number of sheet storage portions is not limited to three. The number of sheet storage portions may be set in accordance with the environment in which the apparatus body is used, the number of users who use the apparatus in a shared manner, or the specification of the apparatus body.

Figure 15:
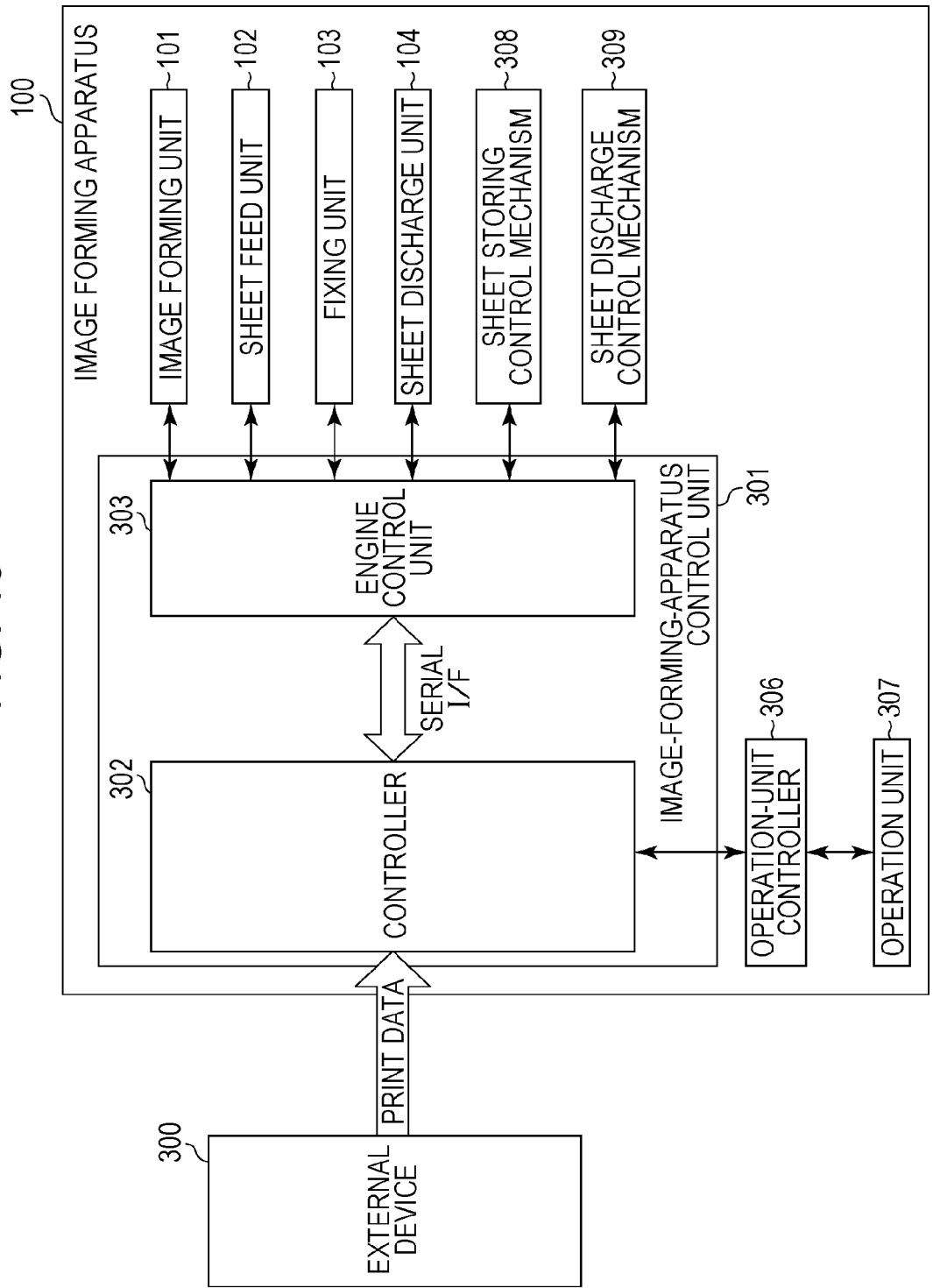
FIG. 15 is a block diagram showing a control unit and a function configuration of an image forming apparatus according to a modification of the invention.

Also, in the above-described first and second embodiments, the engine control unit 303 and the sheet-storage-device control unit 304 are individually configured. However, as shown in FIG. 15, the engine control unit 303 and the sheet-storage-device control unit 304 may be integrally configured. In this case, the engine control unit 303 may control the sheet storing control mechanism 308 and the sheet discharge control mechanism 309.

Also, in the above-described first and second embodiments, the sheet conveying paths are combined at the downstream sides of the respective sheet storage portions, and only the one opening is provided. However, a plurality of openings may be additionally provided. In this case, the operation of the above-described embodiments can be applied to a case in which sheets of the plurality of sheet storage portions are exposed from one of the plurality of openings.

Also, in the above-described first and second embodiments, the controller 302 performs control of, for example, adding the attribute information 355, creating the discharge group 356, and designating the storing target. However, the sheet-storage-device control unit 304 may perform the control.

Also, in the above-described first and second embodiments, the example of a laser beam printer is shown. The image forming apparatus to which the invention is applied is not limited thereto. A printer of other print method, such as an inkjet printer, or a copier may be employed.

Third Embodiment

In a third embodiment, control, in which sheets are printed by a predetermined number that is larger than a number by which sheets can be stored in one sheet storage portion and equal to or smaller than a number by which sheets can be stored in two sheet storage portions and are stored in sheet storage portions, is described. The configuration of the image forming apparatus 100 and the configuration of the sheet storage device 200 are the same as those of the first embodiment, and hence are not described.

Block Diagram of Control Unit and Function Configuration in Third Embodiment

Figure 16:
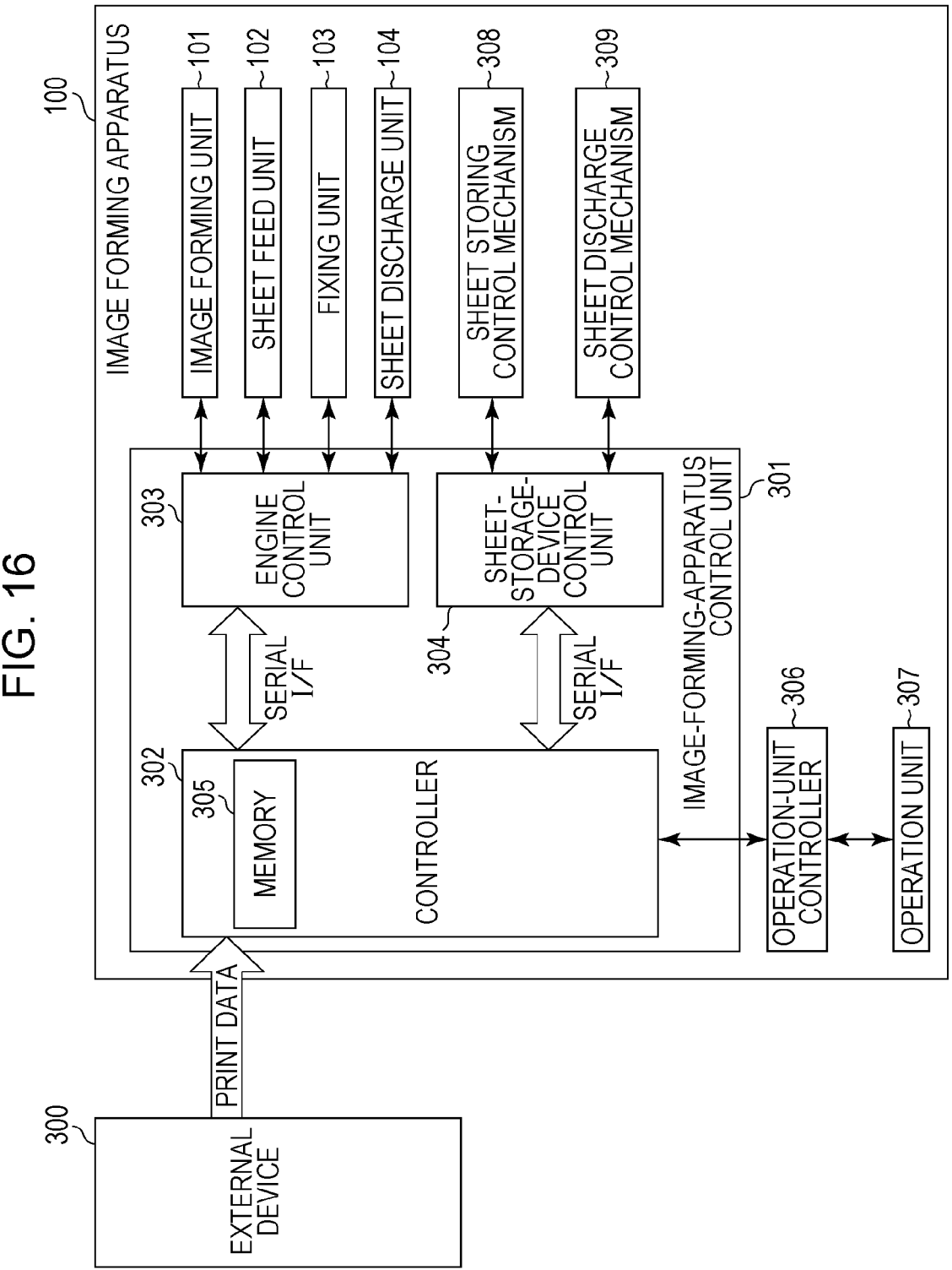
FIG. 16 is a block diagram showing a control unit and a function configuration of an image forming apparatus according to third to seventh embodiments of the invention.

FIG. 16 is a block diagram showing a control unit and a function configuration in this embodiment. FIG. 16 differs from FIG. 4 in that the controller 302 includes a memory 305. The image forming apparatus 100 includes an image-forming-apparatus control unit 301 as the control unit. The image-forming-apparatus control unit 301 includes a controller 302, an engine control unit 303, and a sheet-storage-device control unit 304.

The controller 302 makes communication with an external device 300 such as a host computer and receives print data. The received print data is stored in the memory 305 (for example, hard disk). The controller 302 develops the print data stored in the memory 305 and creates a print condition. Also, the controller 302 designates a print condition that is created on the basis of the print data, for the engine control unit 303 through a serial I/F. The engine control unit 303 controls respective mechanisms under the print condition received from the controller 302. To be specific, the engine control unit 303 controls a sheet feed unit 102 and a sheet discharge unit 104 to feed and discharge a sheet, and controls an image forming unit 101 and a fixing unit 103 to form an image on and fixing the image to the sheet.

Also, the controller 302 develops the print data stored in the memory 305 and creates a storing condition and a discharge condition of each sheet storage portion. Also, the controller 302 designates a storing condition and a discharge condition that are created on the basis of the print data, for the sheet-storage-device control unit 304 through a serial I/F. The sheet-storage-device control unit 304 controls respective mechanisms under the storing condition and the discharge condition received from the controller 302. To be specific, the sheet-storage-device control unit 304 controls a sheet storing control mechanism 308 including a conveying roller 211 to convey the sheet with the image formed thereon to one of the sheet storage portions, and controls a sheet discharge control mechanism 309 including a sheet moving unit 241 to move the sheet stored in one of the sheet storage portions to an opening 250. Also, an operation-unit controller 306 performs control of notifying the controller 302 about various settings and a discharge instruction made by the user with an operation unit 307.

Detail of Sheet-Storage-Device Control Unit in Third Embodiment

Figure 17:
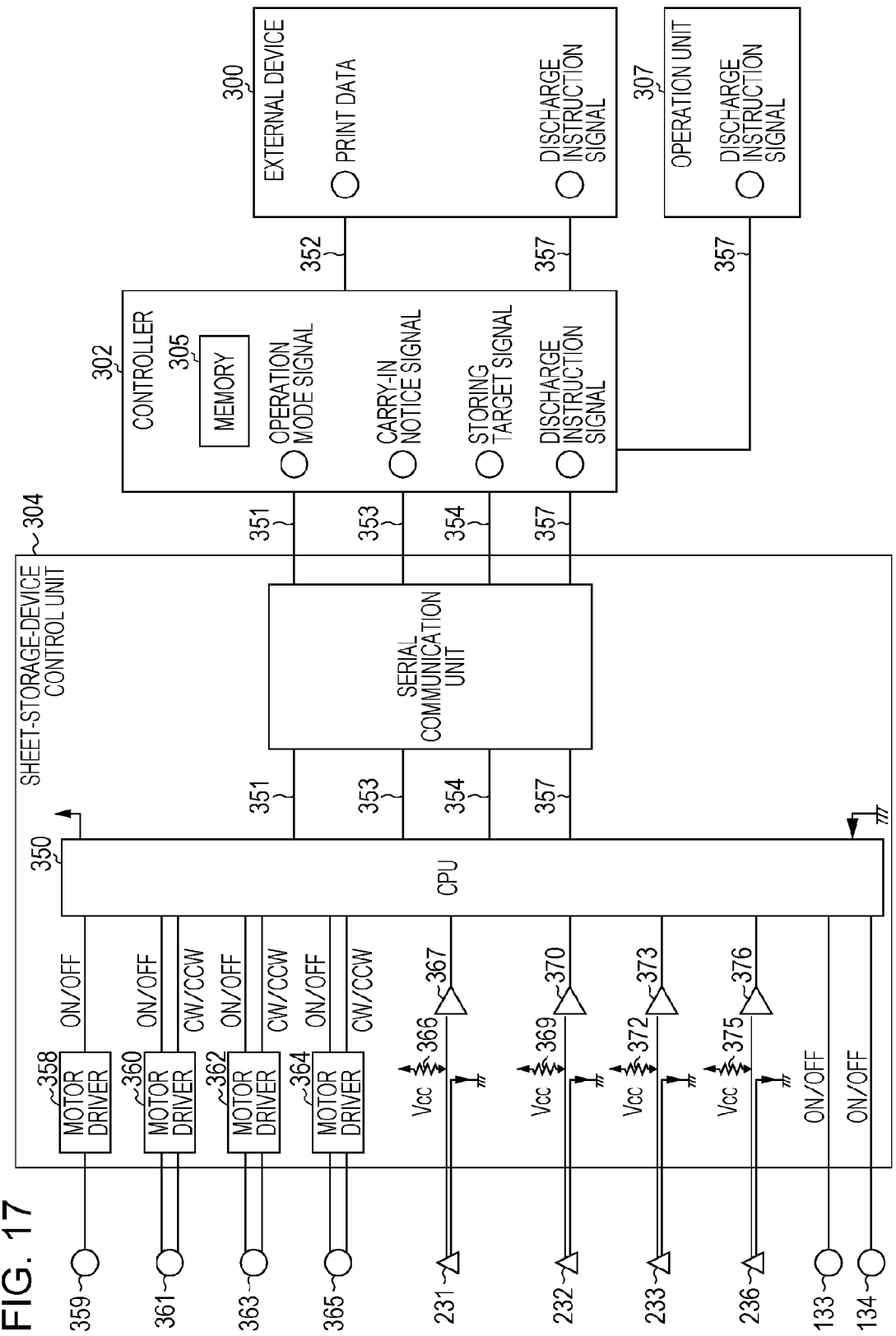
FIG. 17 is a detailed view of a sheet-storage-device control unit according to the third to seventh embodiments of the invention.

FIG. 17 is a detailed view of the sheet-storage-device control unit 304 in this embodiment. FIG. 17 differs from FIG. 5 in that the controller 302 includes the memory 305.

The sheet-storage-device control unit 304 includes a CPU 350, and makes communication with the controller 302 through a serial communication unit. The serial communication unit connects the CPU 350 with the controller 302 through a plurality of signal lines.

When the controller 302 is notified of print data 352 through the external device 300, the controller 302 temporarily stores the print data 352 in the memory 305. Then, the controller 302 develops the stored print data 352, and notifies the CPU 350 of signals, such as an operation mode signal 351, a carry-in notice signal 353, and a storing target signal 354 through the serial communication unit. Further, the controller 302 stores a job number of each sheet and user information of a user who has instructed printing of each sheet, in the memory 305. An operation mode set by the operation mode signal 351 determines a way of sorting sheets to the plurality of sheet storage portions. In this embodiment, it is assumed that the operation mode signal 351 previously sets the first sorting mode. The first sorting mode is a mode that sorts sheets to sheet storage portions for respectively different job numbers. The CPU 350 controls each actuator (described later), and conveys a printed sheet to one of the sheet storage portions.

Also, the controller 302 creates a discharge group having the same user information based on user information of each sheet stored in the memory 305. Then, the user is notified of the discharge group through the external device 300 or the operation unit 307. The user selects own group from such discharge groups, and hence can take out only sheets instructed by the user for printing. When the user selects the discharge group through the external device 300 or the operation unit 307 and instructs to discharge the sheets for the image forming apparatus, the controller 302 is notified of the discharge instruction signal 357. The controller 302 determines exposure of the sheets, which are instructed by the user for the discharge, from the opening based on the user information of each sheet stored in the memory 305. The controller 302 notifies the CPU 350 of a discharge instruction signal 357 through the serial communication unit, and instructs the discharge to the corresponding sheet storage portion. The CPU 350 controls each actuator (described later) to cause the sheets in the notified sheet storage portion to be exposed from the opening.

Next, each actuator connected with the CPU 350 is described.

A motor driver 358 is connected with an output terminal of the CPU 350. The motor driver 358 drives a convey motor 359. When the convey motor 359 is rotated, the conveying rollers 211, 212, and 213 are rotated and convey sheets to the respective sheet storage portions.

A motor driver 360 is connected with an output terminal of the CPU 350. The motor driver 360 drives a discharge motor 361. When the discharge motor 361 is rotated in the CW direction, the sheet moving unit 241 of the first sheet storage portion 201 moves to an exposure position, and the sheet is exposed to the outside from the opening 250. When the discharge motor 361 is rotated in the CCW direction, the sheet moving unit 241 of the first sheet storage portion moves to a stack position. Similarly, motor drivers 362 and 364 are connected with output terminals of the CPU 350, and respectively drive discharge motors 363 and 365. The discharge motor 363 controls a sheet moving unit of the second sheet storage portion 202, and the discharge motor 365 controls a sheet moving unit of the third sheet storage portion 203.

A sheet sensor 231 uses a pull-up resistance 366 and inputs information indicative of whether or not a sheet is stored in the first sheet storage portion 201 to the CPU 350 through a buffer 367. Similarly, a sheet sensor 232 uses a pull-up resistance 369 and inputs information indicative of whether or not a sheet is stored in the second sheet storage portion to the CPU 350 through a buffer 370. A sheet sensor 233 uses a pull-up resistance 372 and inputs information indicative of whether or not a sheet is stored in the third sheet storage portion to the CPU 350 through a buffer 373.

The opening sensor 236 uses a pull-up resistance 375 and inputs information indicative of whether or not a sheet is exposed from the opening 250, to the CPU 350 through a buffer 376.

An actuator that switches a second switch member 133 is connected with an output terminal of the CPU 350. When the actuator is ON, the second switch member 133 is switched to convey a sheet toward the conveyance guide 129. When the actuator is OFF, the second switch member 133 is switched to convey a sheet toward the conveyance guide 132. Similarly, an actuator that switches a third switch member 134 is connected with an output terminal of the CPU 350. The third switch member 134 is switched to convey a sheet toward the conveyance guide 130 when the actuator is ON, and is switched to convey a sheet toward the conveyance guide 131 when the actuator is OFF.

Description on Operation of Sheet Storage Device in Third Embodiment

Next, an operation of the sheet storage device 200 is described. In this embodiment, as described above, the sheet storage portions are provided with the individual actuators for driving the respective sheet moving units. Therefore, even when sheets of the same user are stored in the plurality of sheet storage portions, by driving the respective actuators, the user can collectively take out the sheets.

Figure 18:
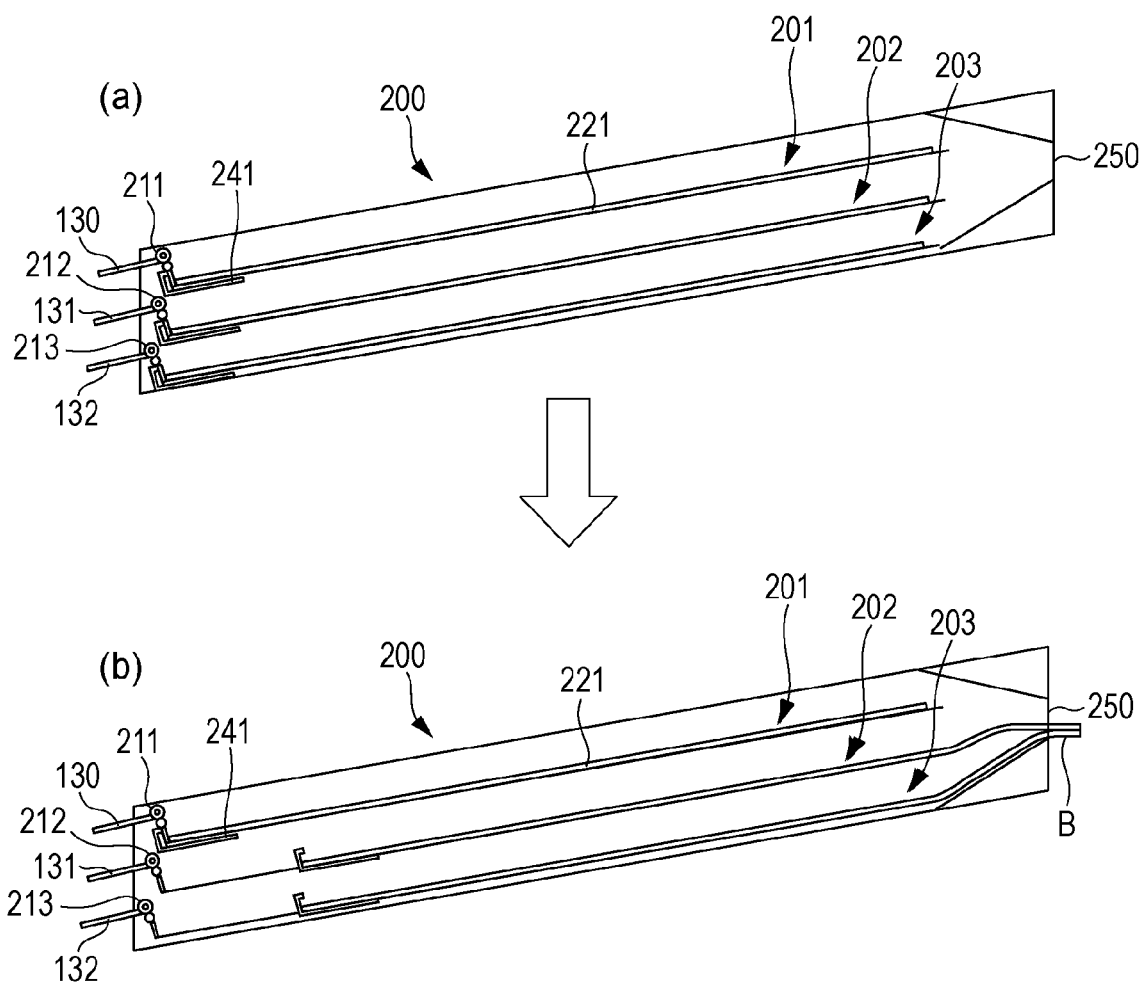
FIG. 18 illustrates a state of a sheet storage device when sheets are exposed according to the third to seventh embodiments of the invention.

FIG. 18 illustrates an operation example of the sheet storage device 200. In part (a) of FIG. 18, sheets of a user A are stored in the sheet storage portion 201, and sheets of a user B are stored in the sheet storage portions 202 and 203. In part (b) of FIG. 18, when a discharge instruction is output for the sheets of the user B, the sheet moving units of the sheet storage portions 202 and 203 are moved to the exposure positions, and expose a sheet bundle B from the opening 250.

Figure 19:
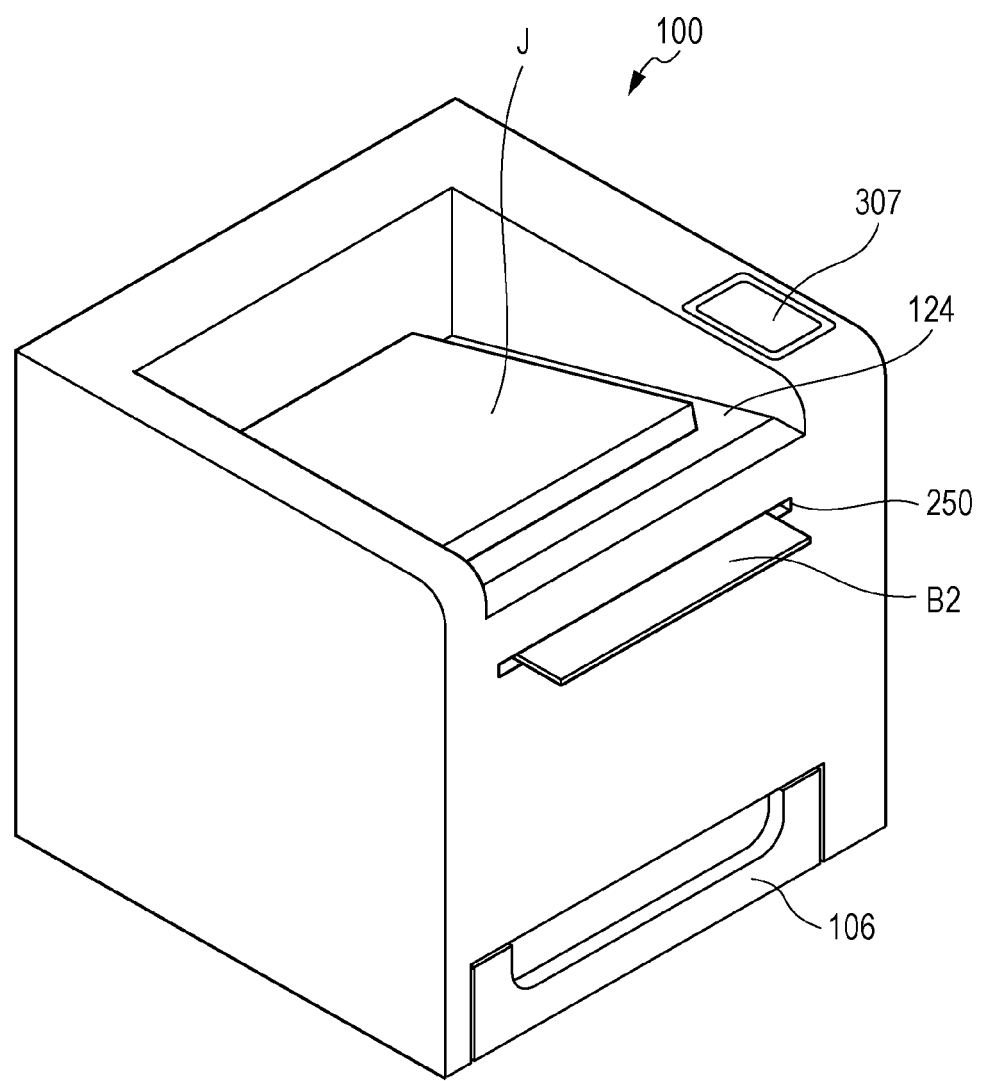
FIG. 19 is a perspective view of the image forming apparatus when sheets are exposed according to the third to seventh embodiments of the invention.

FIG. 19 is a perspective view of the image forming apparatus 100 at this time. A sheet bundle J printed by a plurality of users is stacked on the discharge tray 124, and a downstream edge portion B2 of the sheet bundle B is exposed from the sheet storage portions 202 and 203 from the opening 250. The user can take out the sheet bundle by grabbing the downstream edge portion B2 exposed to the outside of the apparatus and pulling out the sheet bundle B.

At this time, the exposure length of the sheet bundle B can be set so that the center of gravity of the sheet bundle B does not go beyond the opening 250. This is because, if the sheet bundle B is pushed out to a position at which the center of gravity goes beyond the opening 250, the sheet bundle B may slip down from the opening 250 before the user takes out the sheet bundle B.

Also, if it is detected that the sheet bundle B is pulled out when the opening sensor 236 is changed from ON to OFF, the sheet moving unit 241 moves from the exposure position to the stack position. Further, when the sheet sensors 231 to 233 detect that a sheet is not stacked in the sheet storage portions, the sheet storage portions become available for storing new sheets.

When Sheets are Stored by a Larger Number than a Number by which Sheets can be Stored in One Sheet Storage Portion With the above-described image forming apparatus, a control method characteristic to the embodiment of the invention is described. In this embodiment, control, in which sheets are printed by a predetermined number that is larger than a number by which sheets can be stored in one sheet storage portion and equal to or smaller than a number by which sheets can be stored in two sheet storage portions and are stored in sheet storage portions, is described. In this embodiment, it is assumed that a sheet is not initially stored in any of the sheet storage portions.

Figure 20:
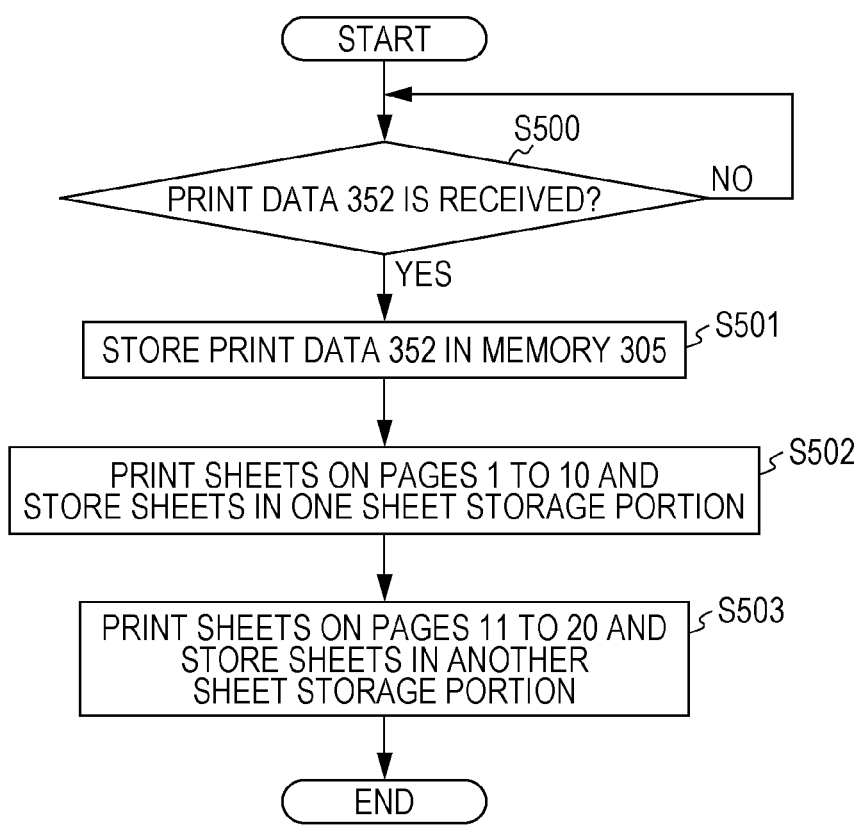
FIG. 20 is a flowchart showing an operation of the control unit according to the third embodiment of the invention.

It is assumed that the upper limit number of sheets that can be stored in one sheet storage portion is 10. In this embodiment, control when 20 sheets are printed and stored in sheet storage portions is described. FIG. 20 is a flowchart of this embodiment. Control based on the flowchart in FIG. 20 is executed by the controller 302 described in FIG. 16 based on a program stored in the memory 305.

When print data 352 is received from the external device 300 (S500), the print data 352 is stored in the memory 305 (S501). While all sheet storage portions are empty, sheets on pages 1 to 10 are printed, and the printed sheets are stored in one of the sheet storage portions (S502). Then, residual sheets (pages 11 to 20) are printed, and the sheets that cannot be stored in the one sheet storage portion are stored in another empty sheet storage portion (S503).

The sheets up to page 20 are stored in the sheet storage portions, and then the 20 sheets stored in the plurality of sheet storage portions are exposed in a stacked manner from the opening according to the discharge instruction by the user. Consequently, the user can collectively take out own sheets from the sheet storage portions.

In this embodiment, the case, in which sheets are printed by a predetermined number that is larger than a number by which sheets can be stored in one sheet storage portion and equal to or smaller than a number by which sheets can be stored in two sheet storage portions, is considered. However, this embodiment can be similarly applied to a case, in which sheets are printed by a predetermined number that is larger than a number by which sheets can be stored in one sheet storage portion and equal to or smaller than a number by which sheets can be stored in three sheet storage portions.

With the above-described embodiment, when sheets are printed by a predetermined number that is larger than a number by which sheets can be stored in one sheet storage portion and equal to or smaller than a number by which sheets can be stored in two sheet storage portions, the sheets are stored in the plurality of sheet storage portions. Accordingly, an image forming apparatus that allows all sheets to be stored in the sheet storage portions without stopping image formation can be provided.

Fourth Embodiment

In the third embodiment, the control, in which sheets are printed by a predetermined number that is larger than a number by which sheets can be stored in one sheet storage portion and equal to or smaller than a number by which sheets can be stored in two sheet storage portions and are stored in sheet storage portions, is described. In this embodiment, control with regard to the order of pages of a sheet bundle exposed from the opening is described. Major part of description is similar to the third embodiment, and only part different from the third embodiment is described here.

Figure 21:
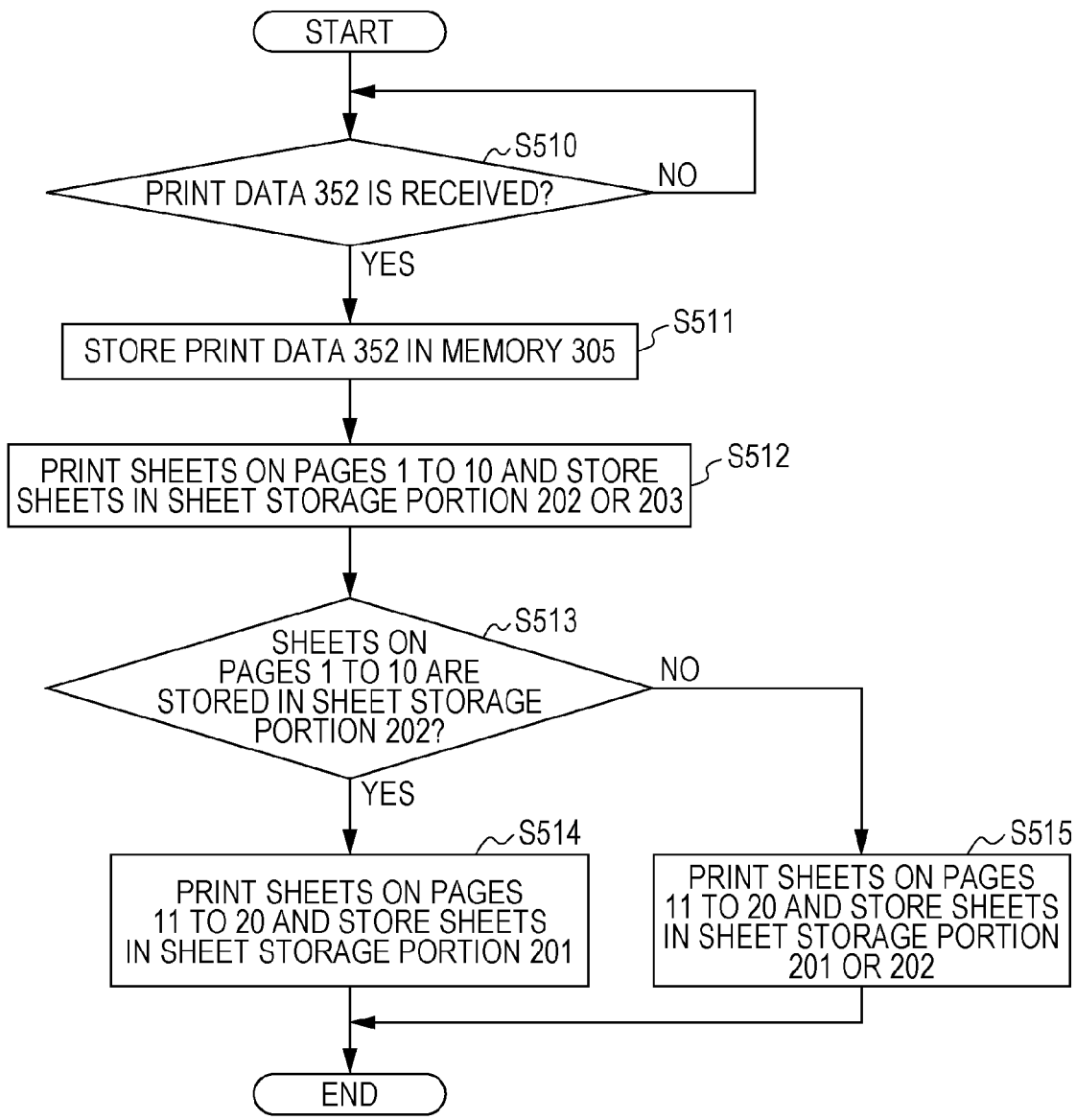
FIG. 21 is a flowchart showing an operation of the control unit according to the fourth embodiment of the invention.

In this embodiment, control when 20 sheets are printed and stored in sheet storage portions is described like the third embodiment. FIG. 21 is a flowchart of this embodiment. Control based on the flowchart in FIG. 21 is executed by the controller 302 described in FIG. 16 based on a program stored in the memory 305.

When print data 352 is received from the external device 300 (S510), the print data 352 is stored in the memory 305 (S511). Then, sheets on pages 1 to 10 are printed, and the printed sheets are stored in the sheet storage portion 202 or the sheet storage portion 203 (S512). If the sheets are stored in the sheet storage portion 202 (S513), sheets on pages 11 to 20 are printed, and the printed sheets are stored in the sheet storage portion 201 (S514). In contrast, if the sheets are stored in the sheet storage portion 203 (S513), sheets on pages 11 to 20 are printed, and the printed sheets are stored in the sheet storage portion 201 or the sheet storage portion 202 (S515).

The sheets up to page 20 are stored in the sheet storage portions, and then the 20 sheets stored in the plurality of sheet storage portions are exposed in a stacked manner from the opening according to the discharge instruction by the user. Consequently, the user can take out a sheet bundle arranged in a correct page order, from the opening.

In this embodiment, the case, in which sheets are printed by a predetermined number that is larger than a number by which sheets can be stored in one sheet storage portion and equal to or smaller than a number by which sheets can be stored in two sheet storage portions, is considered. However, this embodiment can be similarly applied to a case, in which sheets are printed by a predetermined number that is larger than a number by which sheets can be stored in one sheet storage portion and equal to or smaller than a number by which sheets can be stored in three sheet storage portions.

With the above-described embodiment, when sheets are printed by a predetermined number that is larger than a number by which sheets can be stored in one sheet storage portion and equal to or smaller than a number by which sheets can be stored in two sheet storage portions, the sheet storage portion that store the sheets is selected with regard to the order of pages. Accordingly, an image forming apparatus that allows a bundle of sheets to be in a correct page order when the user collectively takes out the sheets stored in the plurality of sheet storage portions can be provided.

Fifth Embodiment

In the third embodiment and the fourth embodiment, the case in which all sheets to be printed can be stored in the sheet storage portions, in which a sheet is not initially stored. In this embodiment, a case in which two of three sheet storage portions cannot be used because the two sheet storage portions store sheets of other user. In this state, control, in which sheets are printed by a predetermined number that is larger than a number by which sheets can be stored in one sheet storage portion and equal to or smaller than a number by which sheets can be stored in two sheet storage portions and are stored in sheet storage portions, is described. Major part of description is similar to the third embodiment, and only part different from the third embodiment is described here. In the following description, a sheet storage portion not storing a sheet is defined as a first group, and a sheet storage portion storing a sheet is defined as a second group.

Figure 22:
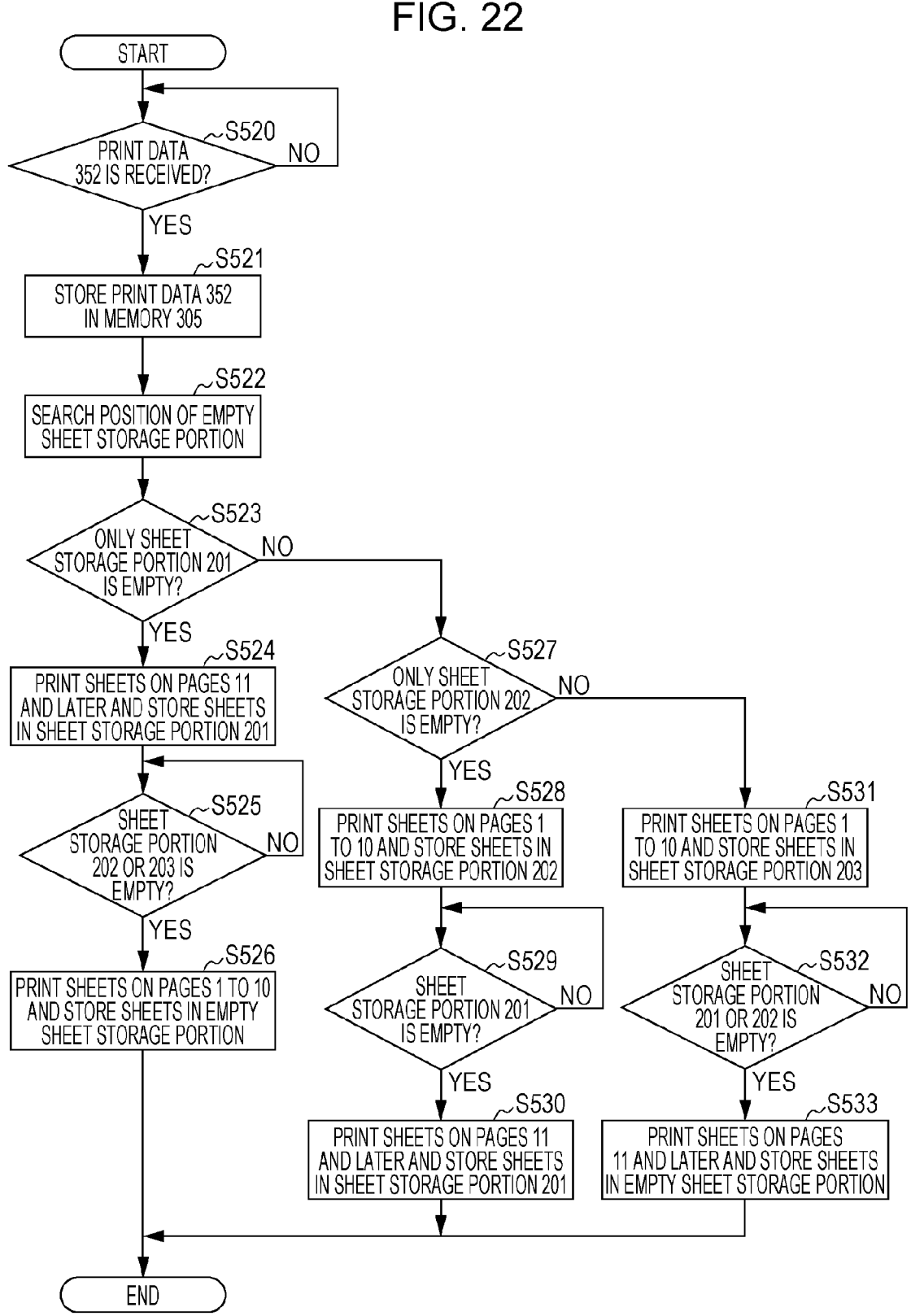
FIG. 22 is a flowchart showing an operation of the control unit according to the fifth embodiment of the invention.

In this embodiment, control when 20 sheets are printed and stored in sheet storage portions is described. FIG. 22 is a flowchart of this embodiment. Control based on the flowchart in FIG. 22 is executed by the controller 302 described in FIG. 16 based on a program stored in the memory 305.

When print data 352 is received from the external device 300 (S520), the print data 352 is stored in the memory 305 (S521). Then, an empty sheet storage portion is searched from the detection results of the sheet sensors 231 to 233 (S522). If only the sheet storage portion 201 is empty and belongs to the first group (S523), sheets on pages 11 and later are printed, and the printed sheets are stored in the sheet storage portion 201 (S524). Then, printing is stopped until the sheet storage portion 202 or 203 becomes empty (S525), if either one becomes empty, sheets on pages 1 to 10 are printed, and the printed sheets are stored in the empty sheet storage portion (S526).

If only the sheet storage portion 202 is empty and belongs to the first group (S527), sheets on pages 1 to 10 are printed, and the printed sheets are stored in the sheet storage portion 202 (S528). Then, printing is stopped until the sheet storage portion 201 becomes empty (S529), if the sheet storage portion 201 becomes empty, sheets on pages 11 and later are printed, and the printed sheets are stored in the sheet storage portion 201 (S530).

If only the sheet storage portion 203 is empty and belongs to the first group, sheets on pages 1 to 10 are printed, and the printed sheets are stored in the sheet storage portion 203 (S531). Then, printing is stopped until the sheet storage portion 201 or 202 becomes empty (S532), if either one becomes empty, sheets on pages 11 and later are printed, and the printed sheets are stored in the empty sheet storage portion (S533).

In S528 of FIG. 22, if the sheet storage portion 202 is empty and belongs to the first group, sheets on pages 1 to 10 are printed, and the printed sheets are stored in the sheet storage portion 202. However, sheets on pages 11 and later may be printed and stored in the sheet storage portion 202. In this case, printing is stopped until the sheet storage portion 203 becomes empty next time, if the sheet storage portion 203 becomes empty, sheets on pages 1 to 10 are printed, and the printed sheets are stored in the sheet storage portion 203. As described above, in this embodiment, the order of pages to be printed is changed depending on the positional relationship between the sheet storage portion belonging to the first group and the sheet storage portion belonging to the second group.

The sheets up to page 20 are stored in the sheet storage portions, and then the 20 sheets stored in the plurality of sheet storage portions are exposed in a stacked manner from the opening according to the discharge instruction by the user. Consequently, the user can take out a sheet bundle arranged in a correct page order, from the opening.

Also, in this embodiment, only the sheets of the user who instructs the discharge are exposed from the opening. Therefore, a phenomenon in which sheets of a plurality of users are exposed in a stacked manner and the page order is discontinued does not occur.

As described above, in this embodiment, the state is considered, in which one of three sheet storage portions is empty, and the other two sheet storage portions store sheets of other user and hence cannot be used. With this embodiment, when sheets are printed by a predetermined number that is larger than a number by which sheets can be stored in one sheet storage portion and equal to or smaller than a number by which sheets can be stored in two sheet storage portions, the order of pages to be printed is changed. Accordingly, an image forming apparatus that allows a bundle of sheets to be in a correct page order when the user collectively takes out the sheets stored in the plurality of sheet storage portions can be provided.

Sixth Embodiment

In the fifth embodiment, the control, in which sheets are printed by a predetermined number that is larger than a number by which sheets can be stored in one sheet storage portion and equal to or smaller than a number by which sheets can be stored in two sheet storage portions and are stored in sheet storage portions, is described. In this embodiment, control, in which sheets are printed by a predetermined number that is larger than a number by which sheets can be stored in two sheet storage portions and equal to or smaller than a number by which sheets can be stored in three sheet storage portions and are stored in sheet storage portions, is described. Major part of description is similar to the third embodiment, and only part different from the third embodiment is described here.

Figure 23A:
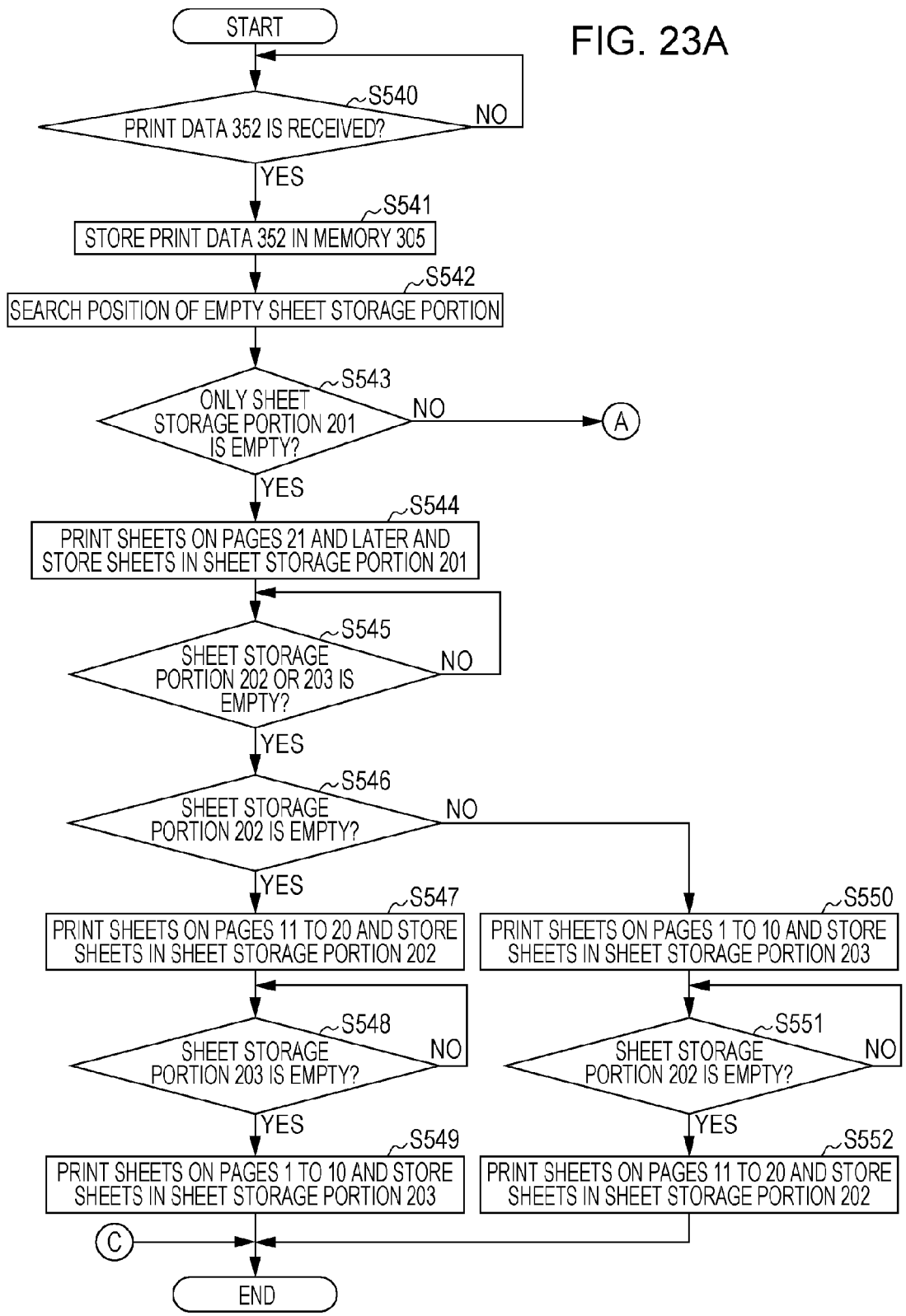
FIG. 23A provides a flowchart showing an operation of the control unit according to the sixth embodiment of the invention.
Figure 23C:
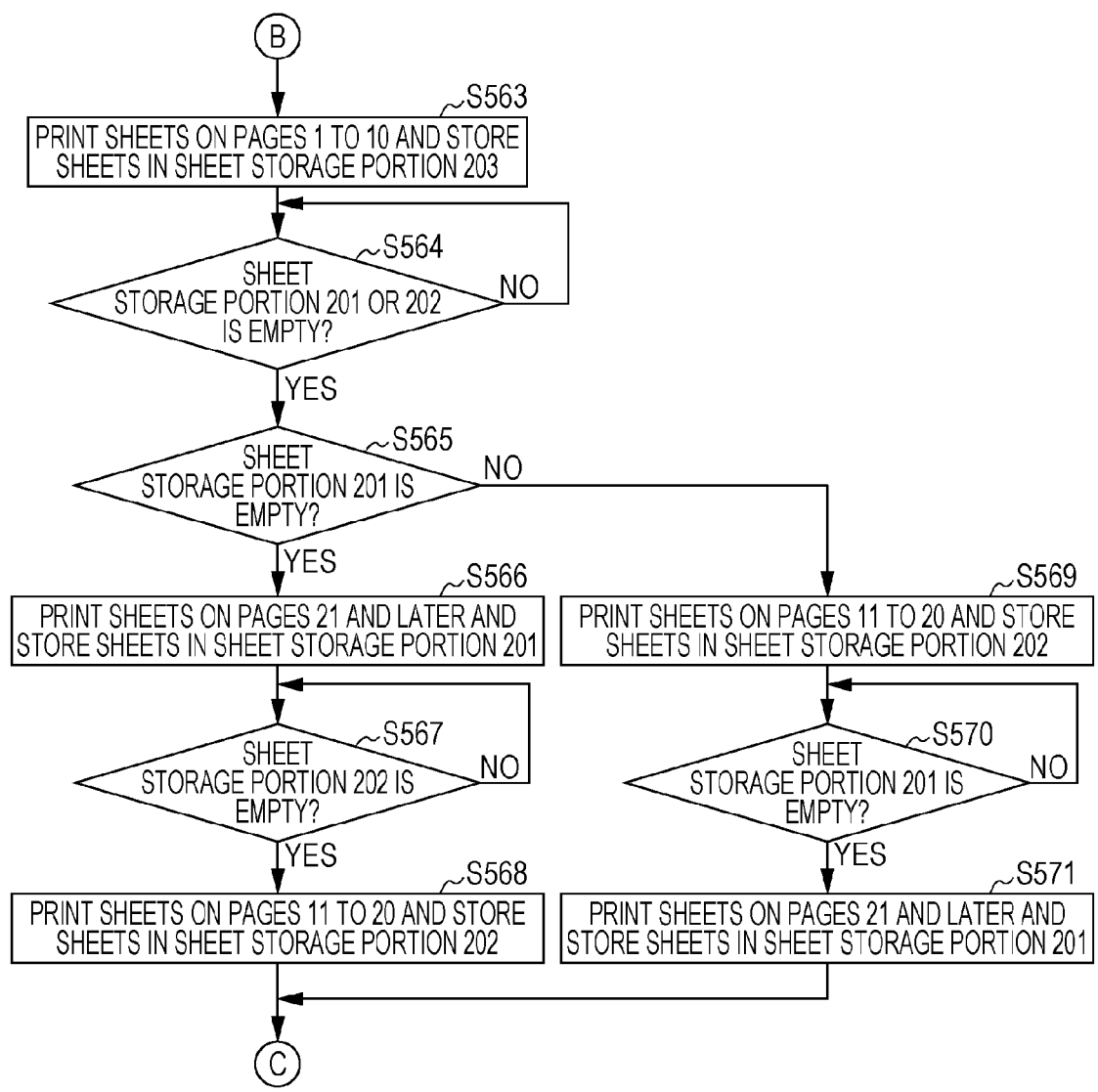
FIG. 23C provides the flowchart showing the operation of the control unit according to the sixth embodiment of the invention.

In this embodiment, control when 30 sheets are printed and stored in sheet storage portions is described. FIGS. 23A to 23C provide a flowchart of this embodiment. Control based on the flowchart in FIGS. 23A to 23C is executed by the controller 302 described in FIG. 16 based on a program stored in the memory 305.

When print data 352 is received from the external device 300 (S540), the print data 352 is stored in the memory 305 (S541). Then, an empty sheet storage portion is searched from the detection results of the sheet sensors 231 to 233 (S542). If only the sheet storage portion 201 is empty and belongs to the first group (S543), sheets on pages 21 and later are printed, and the printed sheets are stored in the sheet storage portion 201 (S544). Then, the processing waits until the sheet storage portion 202 or 203 becomes empty (S545). If the sheet storage portion 202 becomes empty (S546), sheets on pages 11 to 20 are printed, and the printed sheets are stored in the sheet storage portion 202 (S547). Then, the processing waits until the sheet storage portion 203 becomes empty (S548). If the sheet storage portion 203 becomes empty, sheets on pages 1 to 10 are printed, and the printed sheets are stored in the sheet storage portion 203 (S549). In S546, if the sheet storage portion 203 becomes empty, sheets on pages 1 to 10 are printed, and the printed sheets are stored in the sheet storage portion 203 (S550). Then, the processing waits until the sheet storage portion 202 becomes empty (S551). If the sheet storage portion 202 becomes empty, sheets on pages 11 to 20 are printed, and the printed sheets are stored in the sheet storage portion 202 (S552).

If only the sheet storage portion 202 is empty and belongs to the first group (S553), sheets on pages 11 to 20 are printed, and the printed sheets are stored in the sheet storage portion 202 (S554). Then, the processing waits until the sheet storage portion 201 or 203 becomes empty (S555). If the sheet storage portion 201 becomes empty (S556), sheets on pages 21 and later are printed, and the printed sheets are stored in the sheet storage portion 201 (S557). Then, the processing waits until the sheet storage portion 203 becomes empty (S558). If the sheet storage portion 203 becomes empty, sheets on pages 1 to 10 are printed, and the printed sheets are stored in the sheet storage portion 203 (S559). In S556, if the sheet storage portion 203 becomes empty, sheets on pages 1 to 10 are printed, and the printed sheets are stored in the sheet storage portion 203 (S560). Then, the processing waits until the sheet storage portion 201 becomes empty (S561). If the sheet storage portion 201 becomes empty, sheets on pages 21 and later are printed, and the printed sheets are stored in the sheet storage portion 201 (S562).

If only the sheet storage portion 203 is empty and belongs to the first group, sheets on pages 1 to 10 are printed, and the printed sheets are stored in the sheet storage portion 203 (S563). Then, the processing waits until the sheet storage portion 201 or 202 becomes empty (S564). If the sheet storage portion 201 becomes empty (S565), sheets on pages 21 and later are printed, and the printed sheets are stored in the sheet storage portion 201 (S566). Then, the processing waits until the sheet storage portion 202 becomes empty (S567). If the sheet storage portion 202 becomes empty, sheets on pages 11 to 20 are printed, and the printed sheets are stored in the sheet storage portion 202 (S568). In S565, if the sheet storage portion 202 becomes empty, sheets on pages 11 to 20 are printed, and the printed sheets are stored in the sheet storage portion 202 (S569). Then, the processing waits until the sheet storage portion 201 becomes empty (S570). If the sheet storage portion 201 becomes empty, sheets on pages 21 and later are printed, and the printed sheets are stored in the sheet storage portion 201 (S571). As described above, in this embodiment, the order of pages to be printed is changed depending on the positional relationship between the sheet storage portion belonging to the first group and the sheet storage portion belonging to the second group.

The sheets up to page 30 are stored in the sheet storage portions, and then the 30 sheets stored in the plurality of sheet storage portions are exposed in a stacked manner from the opening according to the discharge instruction by the user. Consequently, the user can take out a sheet bundle arranged in a correct page order, from the opening.

As described above, in this embodiment, the state is considered, in which one of three sheet storage portions is empty, and the other two sheet storage portions store sheets of other user and hence cannot be used. With this embodiment, when sheets are printed by a predetermined number that is larger than a number by which sheets can be stored in two sheet storage portions and equal to or smaller than a number by which sheets can be stored in three sheet storage portions, the order of pages to be printed is changed. Accordingly, an image forming apparatus that allows a bundle of sheets to be in a correct page order when the user collectively takes out the sheets stored in the plurality of sheet storage portions can be provided.

Seventh Embodiment

In the fifth and sixth embodiments, the state is considered, in which one of three sheet storage portions is empty, and the other two sheet storage portions store sheets of other user and hence cannot be used. In this embodiment, a state is considered, in which two of three sheet storage portions are empty, and the other sheet storage portion stores sheets of other user and hence cannot be used. In this state, control, in which sheets are printed by a predetermined number that is larger than a number by which sheets can be stored in two sheet storage portions and equal to or smaller than a number by which sheets can be stored in three sheet storage portions and are stored in sheet storage portions, is described. Major part of description is similar to the third embodiment, and only part different from the third embodiment is described here.

Figure 24:
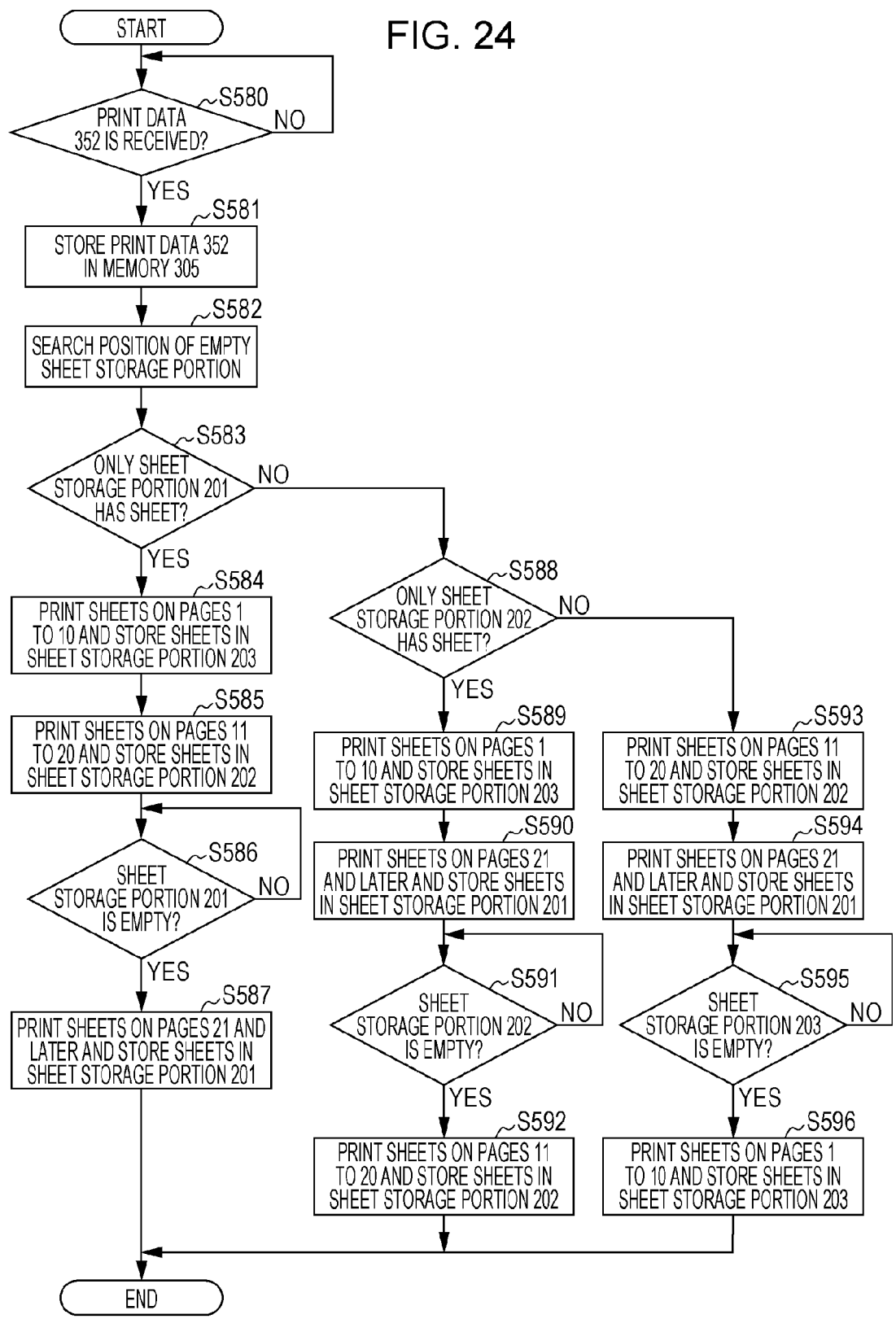
FIG. 24 is a flowchart showing an operation of the control unit according to the seventh embodiment of the invention.

In this embodiment, control when 30 sheets are printed and stored in sheet storage portions is described. FIG. 24 is a flowchart of this embodiment. Control based on the flowchart in FIG. 24 is executed by the controller 302 described in FIG. 16 based on a program stored in the memory 305.

When print data 352 is received from the external device 300 (S580), the print data 352 is stored in the memory 305 (S581). Then, an empty sheet storage portion is searched from the detection results of the sheet sensors 231 to 233 (S582). If only the sheet storage portion 201 has a sheet and belongs to the second group (S583), sheets on pages 1 to 10 are printed, and the printed sheets are stored in the sheet storage portion 203 (S584). Then, sheets on pages 11 to 20 are printed, and the printed sheets are stored in the sheet storage portion 202 (S585). Then, the processing waits until the sheet storage portion 201 becomes empty (S586). If the sheet storage portion 201 becomes empty, sheets on pages 21 and later are printed, and the printed sheets are stored in the sheet storage portion 201 (S587).

If only the sheet storage portion 202 has a sheet and belongs to the second group (S588), sheets on pages 1 to 10 are printed, and the printed sheets are stored in the sheet storage portion 203 (S589). Then, sheets on pages 21 and later are printed, and the printed sheets are stored in the sheet storage portion 201 (S590). Then, the processing waits until the sheet storage portion 202 becomes empty (S591). If the sheet storage portion 202 becomes empty, sheets on pages 11 to 20 are printed, and the printed sheets are stored in the sheet storage portion 202 (S592).

If only the sheet storage portion 203 has a sheet and belongs to the second group, sheets on pages 11 to 20 are printed, and the printed sheets are stored in the sheet storage portion 202 (S593). Then, sheets on pages 21 and later are printed, and the printed sheets are stored in the sheet storage portion 201 (S594). Then, the processing waits until the sheet storage portion 203 becomes empty (S595). If the sheet storage portion 203 becomes empty, sheets on pages 1 to 10 are printed, and the printed sheets are stored in the sheet storage portion 203 (S596). As described above, in this embodiment, the order of pages to be printed is changed depending on the positional relationship between a sheet storage portion storing a sheet and a sheet storage portion not storing a sheet. As described above, in this embodiment, the order of pages to be printed is changed depending on the positional relationship between the sheet storage portion belonging to the first group and the sheet storage portion belonging to the second group.

The sheets up to page 30 are stored in the sheet storage portions, and then the 30 sheets stored in the plurality of sheet storage portions are exposed in a stacked manner from the opening according to the discharge instruction by the user. Consequently, the user can take out a sheet bundle arranged in a correct page order, from the opening.

As described above, in this embodiment, the state is considered, in which two of three sheet storage portions are empty, and the other sheet storage portion stores a sheet of other user and hence cannot be used. With this embodiment, when sheets are printed by a predetermined number that is larger than a number by which sheets can be stored in two sheet storage portions and equal to or smaller than a number by which sheets can be stored in three sheet storage portions, the order of pages to be printed is changed. Accordingly, an image forming apparatus that allows a bundle of sheets to be in a correct page order when the user collectively takes out the sheets stored in the plurality of sheet storage portions can be provided.

In the above-described third to seventh embodiments, the state in which a sheet storage portion stores a sheet of other user as a sheet storage portion that cannot be used. However, in view of the first sorting mode, a sheet storage portion storing a sheet of another job of the same user cannot be also used. In this case, by changing the discharge method, the operation of the embodiment can be applied. That is, while sheets of the same user are exposed in a stacked manner in the above-described embodiment, only sheets of the same job of the same user are exposed in a stacked manner.

Also, in the above-described third to seventh embodiments, the sheet moving units of the respective sheet storage portions have the individual actuators. Accordingly, by driving the actuators simultaneously, sheets stored in a plurality of sheet storage portions can be exposed in a stacked manner. Alternatively, actuators may be provided by a number smaller than the number of sheet storage portions, and for example, a drive transmission switch unit, such as a clutch (not shown), may be provided. Accordingly, a plurality of sheet moving units may be selectively moved by one actuator.

Also, in the above-described third to seventh embodiments, the configuration with the three sheet storage portions is described. However, the number of sheet storage portions is not limited to three. The number of sheet storage portions may be set in accordance with the environment in which the apparatus body is used, the number of users who use the apparatus in a shared manner, or the specification of the apparatus body.

Also, in the above-described third to seventh embodiments, the controller 302 performs control of, for example, determining the page numbers to be printed and designating the storing target. However, the sheet-storage-device control unit 304 may perform the control.

Also, in the above-described third to seventh embodiments, the controller 302 has the memory 305. However, the memory 305 may be provided in the engine control unit 303 or the sheet-storage-device control unit 304, or may be independently provided as a memory unit in the image-forming-apparatus control unit 301.

Figure 25:
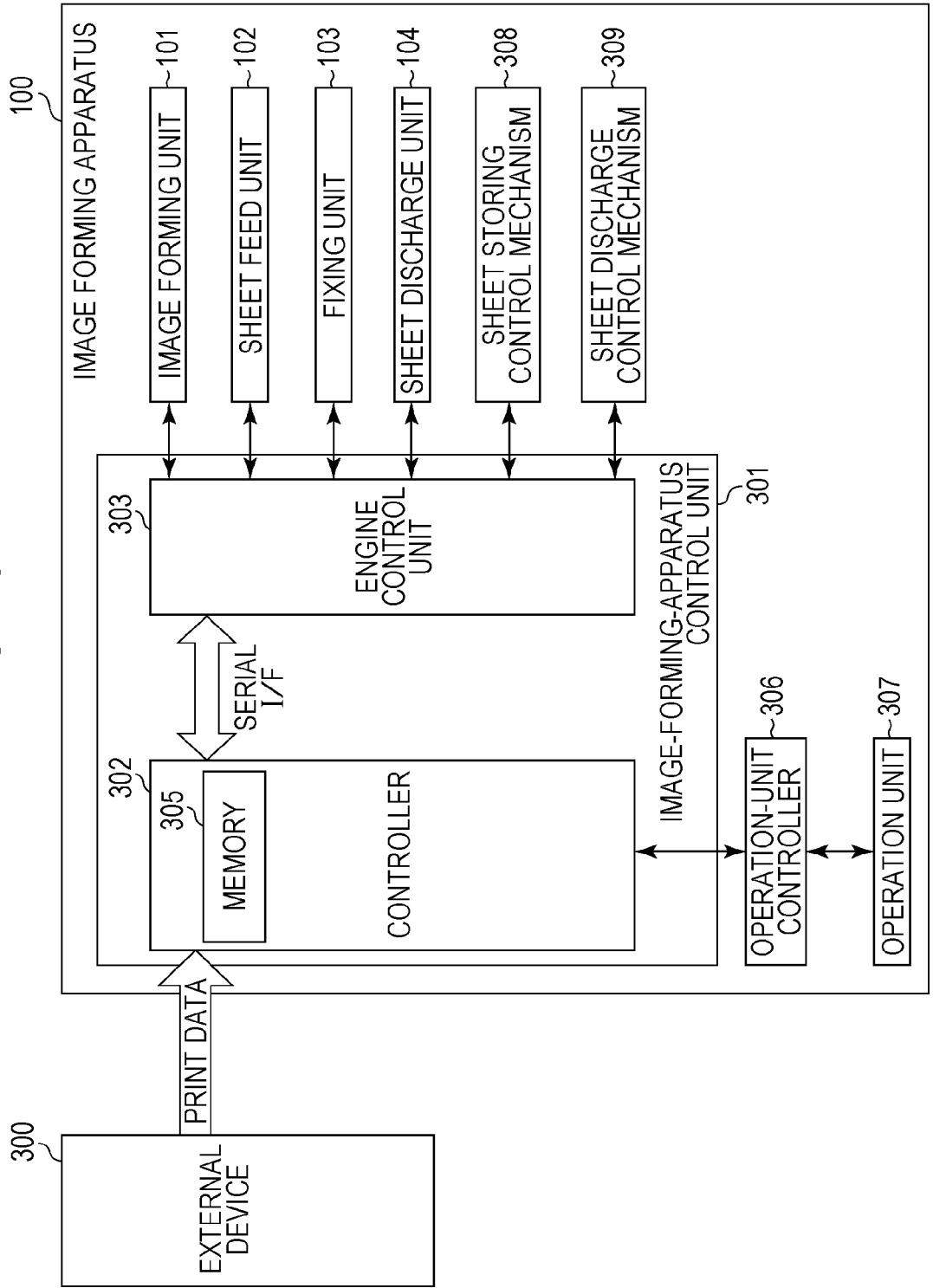
FIG. 25 is a block diagram showing a control unit and a function configuration of an image forming apparatus according to another modification of the invention.

Also, in the above-described third to seventh embodiments, the engine control unit 303 and the sheet-storage-device control unit 304 are individually configured. However, as shown in FIG. 25, the engine control unit 303 and the sheet-storage-device control unit 304 may be integrally configured. In this case, the engine control unit 303 may control the sheet storing control mechanism 308 and the sheet discharge control mechanism 309.

Also, in the above-described third to seventh embodiments, the sheet conveying paths are combined at the downstream sides of the respective sheet storage portions, and only the one opening is provided. However, a plurality of openings may be additionally provided. In this case, the operation of the above-described embodiments can be applied to a case in which sheets of the plurality of sheet storage portions are exposed from one of the plurality of openings.

Also, in the above-described third to seventh embodiments, the example of a laser beam printer is shown. The image forming apparatus to which the invention is applied is not limited thereto. A printer of other print method, such as an inkjet printer, or a copier may be employed.

Eighth Embodiment

In an eighth embodiment, an image forming apparatus that allows a user to easily distinguish a plurality of sheet bundles taken out by the user even when the sheet bundles sorted in a plurality of sheet storage portions are exposed in a stacked manner from the same opening. The configuration of the image forming apparatus 100 is the same as that of the first embodiment, and hence is not described.

Figure 26:
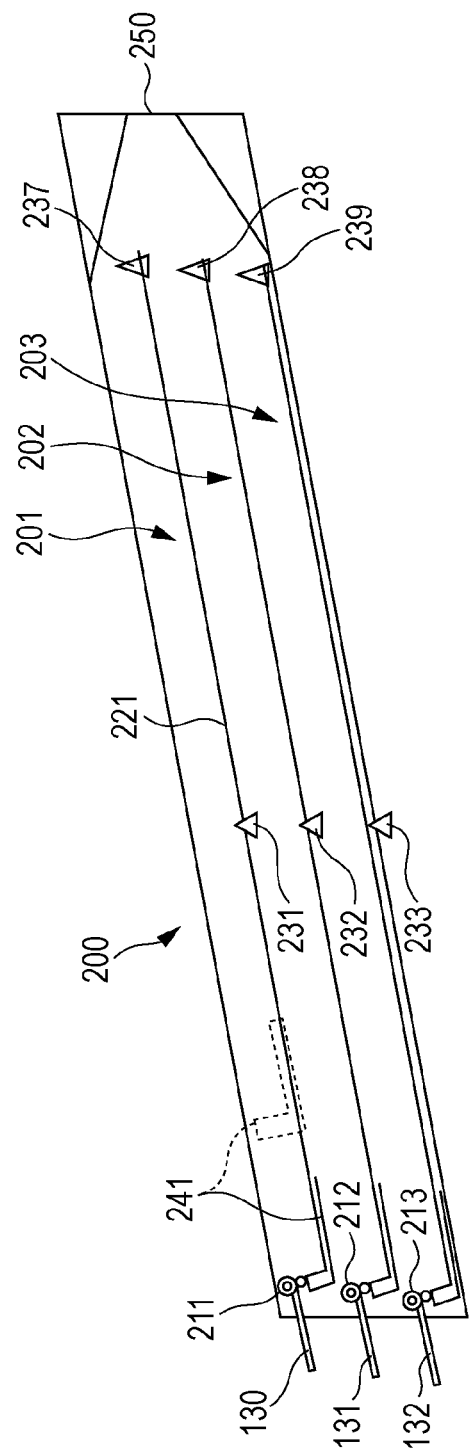
FIG. 26 illustrates a configuration of a sheet storage device according to eighth to tenth embodiments of the invention.

FIG. 26 illustrates a configuration of a sheet storage device 200 in this embodiment. FIG. 26 differs from FIG. 2 in that sheet discharge sensors 237 to 239 are provided instead of the opening sensor 236. The sheet discharge sensors 237 to 239 are arranged near the opening 250, and each detect a taken out state of a sheet exposed to the outside of the apparatus. In the sheet storage device of this embodiment, a plurality of stages of sheet storage portions are vertically stacked.

Block Diagram of Control Unit and Function Configuration in Eighth Embodiment

Figure 27:
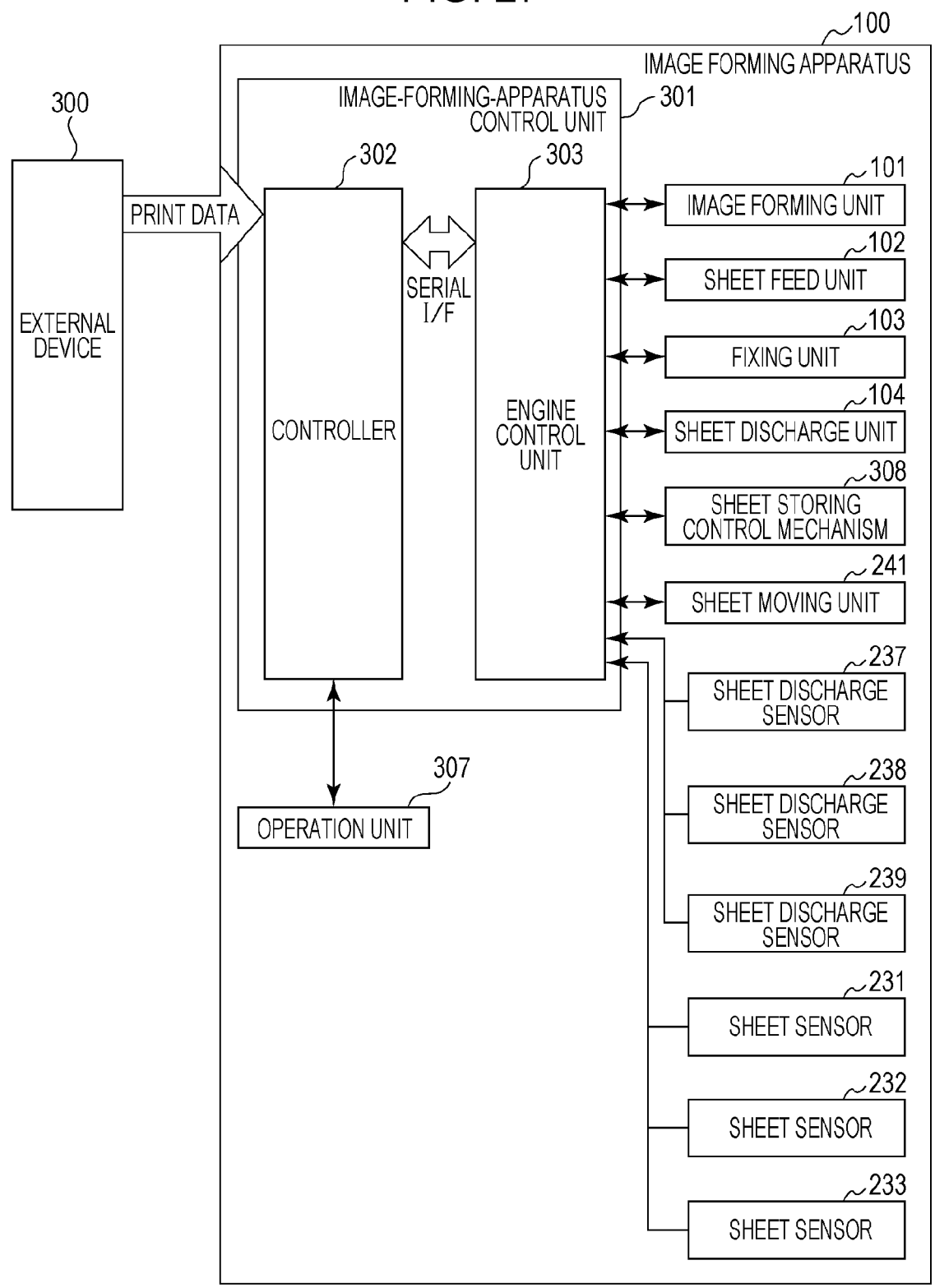
FIG. 27 is a block diagram showing a control unit and a function configuration of an image forming apparatus according to the eighth embodiment of the invention.

FIG. 27 is a block diagram showing a control unit and a function configuration in this embodiment. An image forming apparatus 100 includes an image-forming-apparatus control unit 301 as the control unit. The image-forming-apparatus control unit 301 includes a controller 302 and an engine control unit 303.

The controller 302 makes communication with an external device 300 such as a host computer and receives print data (containing control information such as code data based on a predetermined program language, and image data). Also, the controller 302 designates a print condition (discharge port etc.) that is created on the basis of the print data, for the engine control unit 303 through a serial I/F, and executes a print instruction. Also, the controller 302 gives an instruction of discharging a sheet stored in a sheet storage device 200 for the engine control unit 303 based on information input through an operation unit 307 or information input through the external device connected with the image forming apparatus.

The engine control unit 303 controls printing under the print condition received from the controller 302. The engine control unit 303 controls a sheet feed unit 102 and a sheet discharge unit 104 to feed and discharge a sheet, and controls an image forming unit 101 and a fixing unit 103 to form an image on and fixing the image to the sheet. Also, the engine control unit 303 controls a sheet storing control mechanism 308 including conveying rollers 211 to 213 to convey a sheet with an image formed thereon to the sheet storage device 200. Also, the engine control unit 303 controls a sheet moving unit 241 in response to an instruction from the controller 302, and performs control of exposing the sheet stored in the sheet storage device 200 by using information of the connected sheet discharge sensors 237 to 239.

Description on Operation of Sheet Storage Device in Eighth Embodiment

Next, an operation of the sheet storage device 200 is described. When a user gives an instruction of printing from the external device 300 to the apparatus body of the image forming apparatus 100, the user can select through the external device 300 whether a sheet is discharged to the discharge tray 124 or a sheet is temporarily stored in one of the sheet storage portions 201 to 203. If the user selects to store a sheet in a sheet storage portion, the image-forming-apparatus control unit 301 recognizes a sheet storage portion not storing a sheet based on the detection results of the sheet sensors 231 to 233, and determines the conveyance target of the sheet. The user does not have to designate the sheet storage portion in which user's job is stored. The sheet is automatically stored in an empty sheet storage portion every time. Of course, the user may designate the sheet storage portion storing a sheet.

In this embodiment, a sheet stored in the sheet storage device 200 is pushed out by the sheet moving unit 241 in response to the discharge instruction by the user, and the discharge operation is started. The discharge instruction may be made by, for example, pressing a discharge operation start button of the operation unit 307 provided at the apparatus body, or giving a discharge operation start command through the external device connected with the image forming apparatus. In this embodiment, the discharge of a sheet is started when the user selects the sheet storage portion as the discharge target.

In response to the sheet discharge instruction, the controller 302 instructs the engine control unit 303 to discharge the sheet stored in the sheet storage portion. Then, the engine control unit 303 controls an actuator to move the sheet moving unit 241 from a stack position to an exposure position. Thus, the operation of causing a sheet to be exposed from the sheet storage device is completed.

In this embodiment, the sheet storage portions are provided with the individual actuators for driving the respective sheet moving units. Therefore, even when jobs of the same user are stored in the plurality of sheet storage portions, by driving the respective actuators, the sheets can be discharged so that the user can collectively take out the sheets. Also, when the sheet stored in the sheet storage portion is discharged, the exposure length of a sheet bundle can be set so that the center of gravity of the sheet bundle does not go beyond the opening 250. This is because, if the sheet bundle is pushed out to a position at which the center of gravity goes beyond the opening 250, the sheet bundle may slip down from the opening 250 before the user takes out the sheet bundle.

Also, if it is detected that the sheet bundle is pulled out when the sheet discharge sensors 237 to 239 are changed from ON to OFF, the sheet moving unit 241 moves from the exposure position to the stack position. Further, when the sheet sensors 231 to 233 detect that a sheet is not stacked in the sheet storage portions, the sheet storage portions become available for storing new sheets.

When Sheets are Exposed at the Same Opening from a Plurality of Sheet Storage Portions With the above-described image forming apparatus, a case in which sheets stored in a plurality of sheet storage portions are exposed from the same opening is described with reference to FIG. 28. It is assumed that a user selects a plurality of sheet storage portions as the discharge targets. Also, in the following description, an exposure length represents a length by which a sheet is exposed from the opening to the outside of the apparatus.

First, the lowermost sheet storage portion is selected (S601), and the exposure length to be exposed from the opening is determined according to steps described below. It is determined whether or not the selected sheet storage portion receives a discharge request (S602), and if the discharge request is given to the sheet storage portion, the sheet storage portion becomes the discharge target (S603). If a previously set exposure length is not present (S604), the exposure length of the sheet storage portion is set at L1 (S605). If the previously set exposure length is L1 (S606), the exposure length of the sheet storage portion is determined at L2, which is an exposure length different from L1 (S607). If the previously selected exposure length is L2, the exposure length of the sheet storage portion is set at L1 (S608). This is repeated by selecting the upper sheet storage portions one by one until the processing reaches the uppermost sheet storage portion (S609, S610). After the determination on the discharge target made for all sheet storage portions and the determination on the exposure length of the discharge target, the sheet moving unit of the sheet storage portion as the discharge target is driven and the discharge is performed (S611).

Figure 28:
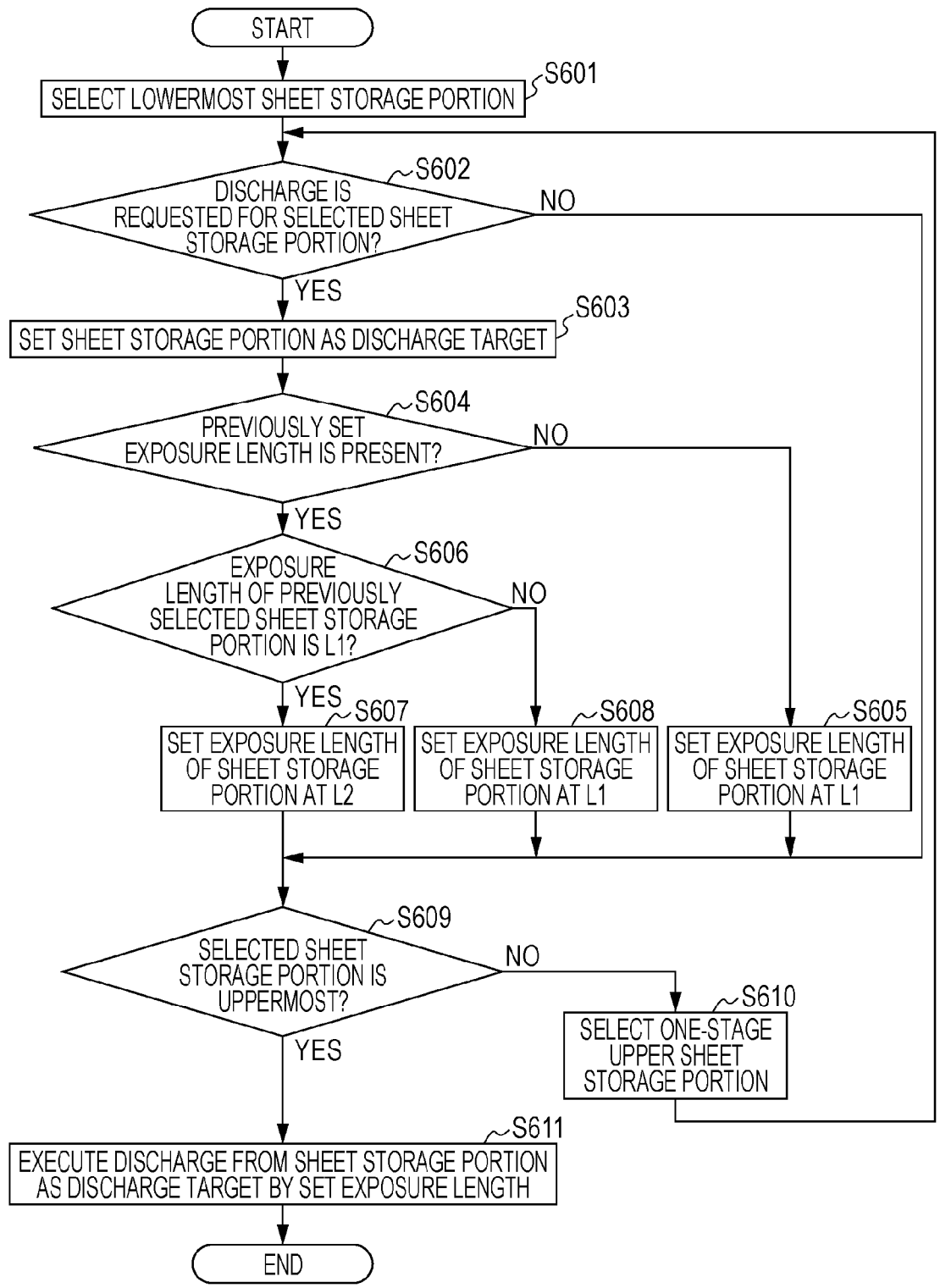
FIG. 28 is a flowchart showing a sheet discharge operation according to the eighth embodiment of the invention.
Figure 29:
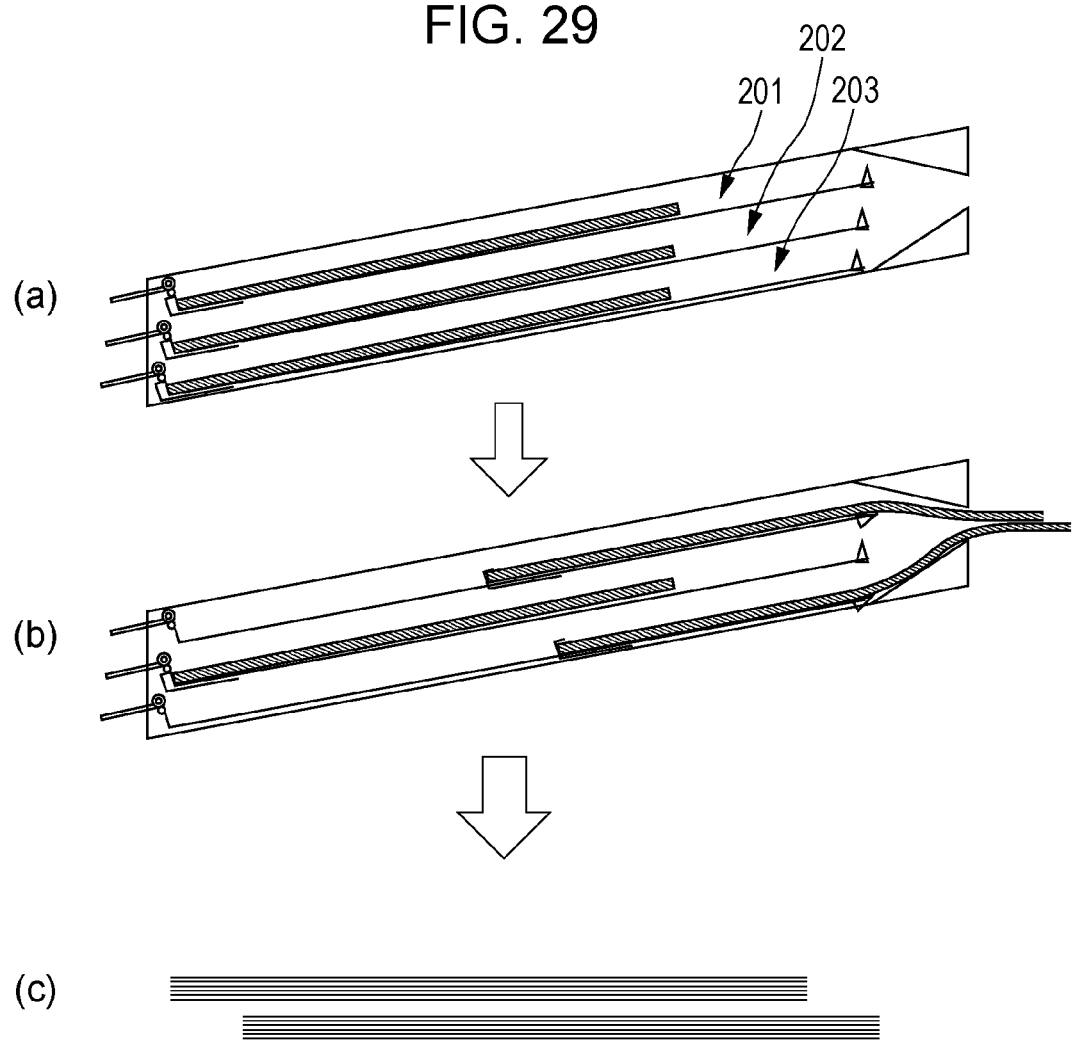
FIG. 29 illustrates a state when sheets are discharged according to the eighth embodiment of the invention.

When the image forming apparatus is operated according to the flowchart in FIG. 28, the exposure length for a plurality of sheets to be exposed from the opening takes the values of L1 and L2 alternately. FIG. 29 illustrates an operation example of this embodiment. An example is provided, in which sheets with the A4 size are stacked on each of the sheet storage portions 201 to 203 and discharge requests are made for the sheet storage portions 201 and 203 (part (a) of FIG. 29). First, the lowermost sheet storage portion 203 is selected, and it is determined whether the discharge request is made or not. Since the discharge request is made on the sheet storage portion 203 and the previously set exposure length is not present, the exposure length of the sheets is determined at 4 cm. Then, the sheet storage portion 202 is selected. Since the discharge request is not made on the sheet storage portion 202, the sheet storage portion 202 is not the discharge target. Further, the sheet storage portion 201 is selected. Since the discharge request is made on the sheet storage portion 201, the sheet storage portion 201 serves as the discharge target, and the exposure length is determined at 3 cm, which is a value different from the previously selected exposure length of 4 cm. When the determination for all sheet storage portions is completed, the sheets of the sheet storage portions as the discharge targets are discharged (part (b) of FIG. 29). In this case, the sheets of the sheet storage portion 203 are exposed by 4 cm from the opening, and the sheets of the sheet storage portion 201 are exposed by 3 cm from the opening. The exposure length may be changed by detecting the leading edge portions of the sheets with the sheet discharge sensors 237 to 239 and controlling the driving amounts of the sheet moving units. When the user collectively takes out the exposed sheets, since the sheet bundles are arranged in a shifted manner, the user can easily distinguish the sheet bundles (part (c) of FIG. 29).

In this embodiment, the exposure lengths of sheets to be discharged are alternately selected from the two values of L1 and L2. However, as long as vertically stacked sheet bundles have different exposure lengths, a value may be selected from three or more values. Alternatively, all sheet storage portions as discharge targets may have different exposure lengths. Also, to allow the user to easily take out sheets, the exposure length at the lowermost sheet storage portion may be the largest, and the exposure length may be decreased toward the upper side. The exposure length is determined successively from the lowermost sheet storage portion. However, the exposure length may be determined from the uppermost side. Also, for the operation of exposing sheets, the exposure length is controlled on the basis of the sheet discharge sensors 237 to 239. However, the driving amount of each sheet moving unit may be controlled on the basis of the distance between the sheets stacked on the sheet moving unit and the length of the sheets without use of the detection results of the sheet discharge sensors 237 to 239. Also, since the three sheet discharge sensors are provided, one discharge sensor common to the sheet storage portions may be provided near the opening at which the sheet conveying paths are combined.

As described above, with the image forming apparatus of this embodiment, a user can easily distinguish a plurality of sheet bundles taken out by the user even when sheet bundles sorted to a plurality of sheet storage portions are exposed in a stacked manner from the same opening.

Ninth Embodiment

In the eighth embodiment, different exposure lengths are set for sheets stored in different sheet storage portions, and hence the difference between the sheet storage portions is indicated for the user. In this embodiment, an image forming apparatus that performs further specific control by taking into account information of a user who has instructed printing of a sheet stored in a sheet storage portion and information of a job number is described. Major part of description is similar to the eighth embodiment, and only part different from the eighth embodiment is described here.

Block Diagram of Control Unit and Function Configuration in Ninth Embodiment

Figure 30:
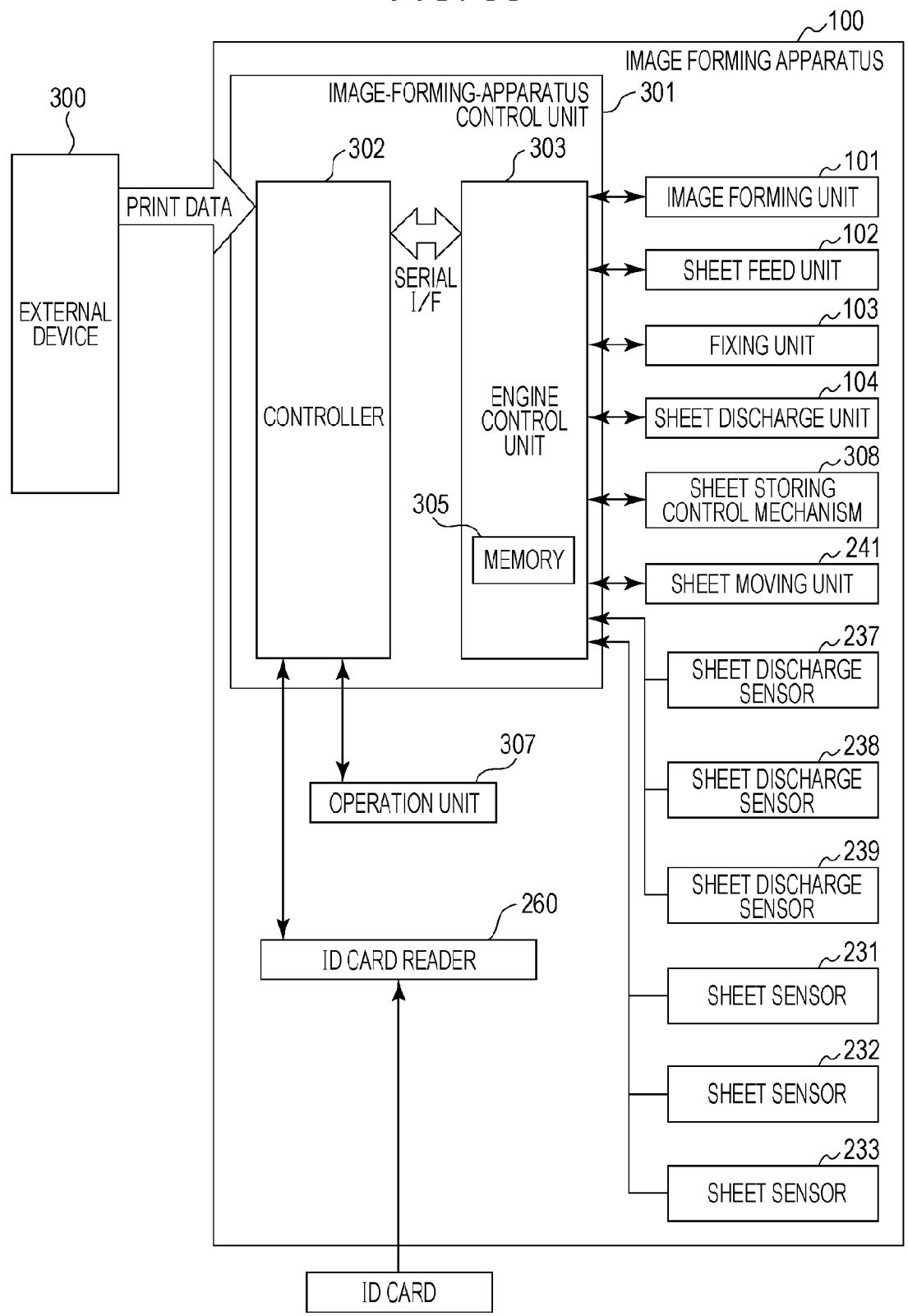
FIG. 30 is a block diagram showing a control unit and a function configuration of an image forming apparatus according to the ninth embodiment of the invention.

FIG. 30 is a block diagram showing a control unit and a function configuration in this embodiment. In addition to the configuration of the first embodiment, an ID card reader 260, and a memory 305 in the engine control unit 303 are provided.

In this embodiment, the controller 302 instructs the engine control unit 303 to discharge a sheet stored in the sheet storage device 200, based on user information input from the operation unit 307, user information acquired from an ID card by the ID card reader 260, or user information input through the external device connected with the image forming apparatus.

The engine control unit 303 stores user information of a user who has printed a sheet stored in a sheet storage portion, a job number, and a sheet size in the memory 305. In this embodiment, the memory is included in the engine control unit 303. Alternatively, the memory may be provided independently in the image-forming-apparatus control unit 301, or may be provided in the controller 302.

Description on Operation of Sheet Storage Device in Ninth Embodiment

An operation of the sheet storage device 200 in this embodiment is described. A sheet stored in the sheet storage device 200 is pushed out by the sheet moving unit 241 in response to a discharge instruction by a user, and a discharge operation is started. The discharge instruction may be made by, for example, pressing a discharge operation start button of the operation unit 307 provided at the apparatus body, authenticating an ID card, or giving a discharge operation start command through the external device connected with the image forming apparatus. A specific method of giving the discharge operation start command on an operation display unit is as follows. For example, a user name and an ID number, with which a job is stored in a sheet storage portion, are displayed on the operation unit 307 provided at the apparatus body of the image forming apparatus 100. A user operates a portion corresponding to the user to give the discharge instruction. Alternatively, if a user is authenticated by using an ID card, the ID card reader 260 is attached to the apparatus body, and ID information is acquired from the ID card, thereby acquiring the sheet discharge instruction.

After reception of the sheet discharge instruction, if the acquired user information corresponds to the user information stored in the memory 305, the controller 302 instructs the engine control unit 303 to discharge a sheet of the user. Then, the engine control unit 303 controls an actuator 239 to move the sheet moving unit 241 from a stack position to an exposure position. Thus, the operation of causing a sheet to be discharged from the sheet storage device is completed.

Also, in this embodiment, if a sheet is discharged through the user authentication, sheets of a plurality of users may be collectively discharged. In this case, group information is input to a receiving unit, such as the operation unit 307 or the ID card reader 260. For example, a discharge target is assumed as an A group, sheets printed by a plurality of users belonging to the A group may be collectively discharged.

When Sheets are Discharged at the Same Opening from a Plurality of Sheet Storage Portions With the above-described image forming apparatus, a case in which sheets stored in a plurality of sheet storage portions are discharged from the same opening is described with reference to FIG. 31.

First, the lowermost sheet storage portion is selected (S621), and the exposure length to be exposed from the opening is determined according to steps described below. It is determined whether or not the selected sheet storage portion receives a discharge request (S622); if the discharge request is given to the sheet storage portion, the sheet storage portion becomes the discharge target (S623). If a previously set exposure length is not present (S624), the exposure length of the sheet storage portion is set at L1 (S625). Then, user information, a job number, and a sheet size stored in the memory 305 are compared. First, a user of a sheet stacked on the sheet storage portion is compared with a user of a sheet storage portion that is previously set as the discharge target (S626). If the users are the same, job numbers are compared (S627). If the job numbers are the same, an exposure length being the same as the previously set exposure length of sheets is set (S628). If the users are different or the job numbers are different, sheet sizes are further compared (S629). If the sheet sizes are different, the previously set exposure length of sheets is set (S628). If the sheet sizes are the same, determination is made depending on the previously set exposure length. If the previously set exposure length is L1 (S630), the exposure length of the sheet storage portion is set at L2, which is an exposure length different from L1 (S631). If the previously selected exposure length is L2, the exposure length of the sheet storage portion is set at L1 (S632). This is repeated by selecting the upper sheet storage portions one by one until the processing reaches the uppermost sheet storage portion (S633, S634). After the determination on the discharge target made for all sheet storage portions and the determination on the exposure length of the discharge target, the sheet moving unit of the sheet storage portion as the discharge target is driven and the discharge is performed (S635).

Figure 31:
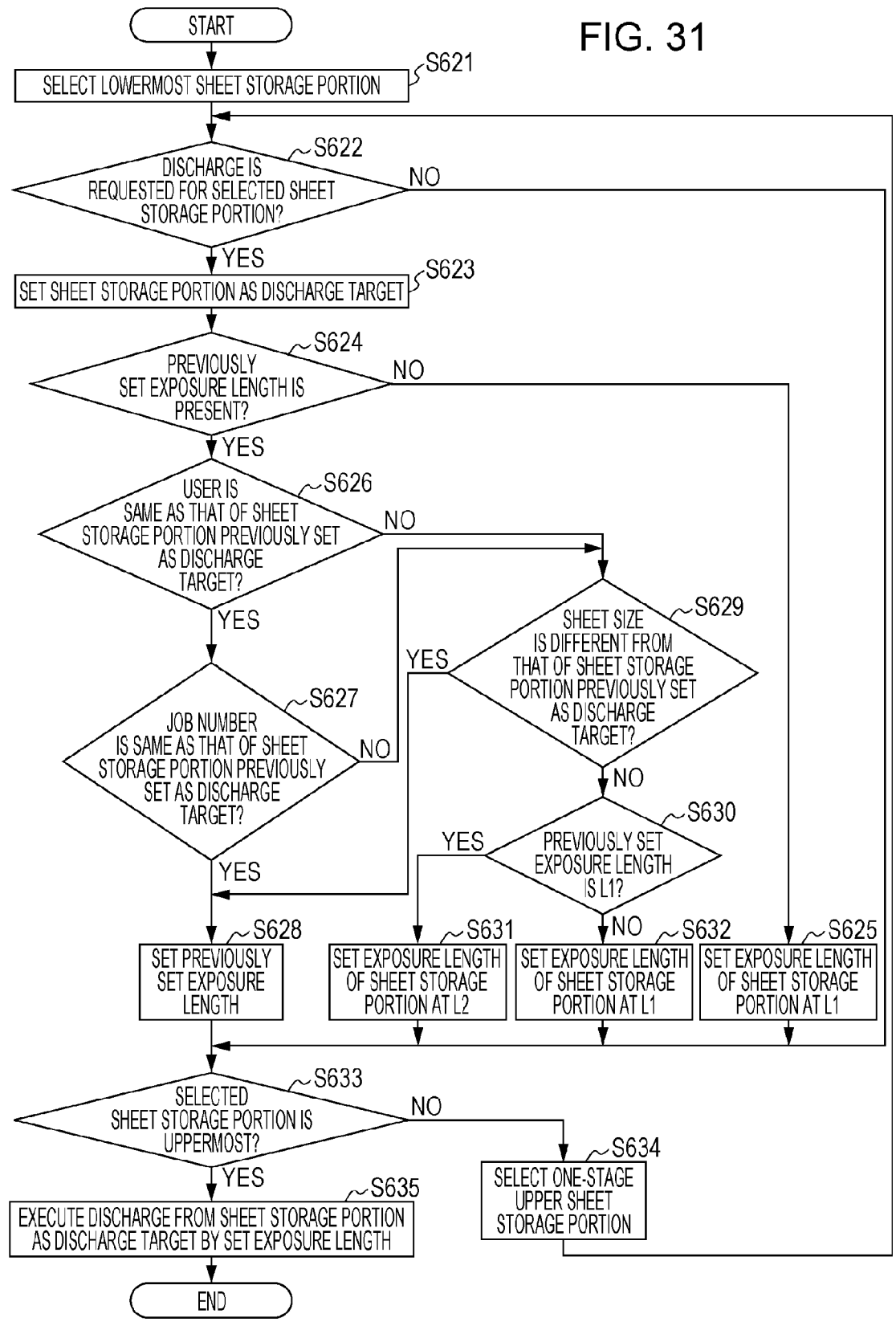
FIG. 31 is a flowchart showing a sheet discharge operation according to the ninth embodiment of the invention.

If the image forming apparatus is operated according to the flowchart in FIG. 31, the exposure length can be determined not on the basis of the difference between the sheet storage portions like the first embodiment, but on the basis of the differences between the users, between the job numbers, and between the sheet sizes. In this embodiment, if the users who have performed printing or the job numbers are different and the sheet sizes are the same, exposure lengths of a plurality of sheets discharged from the opening alternately take the values of L1 and L2. If the users who have performed printing or the job numbers are different and the sheet sizes are different, the exposure lengths of the sheets are not changed. This is because, if sheet bundles with different sheet sizes are stacked, even through the exposure lengths of the sheets are not changed, the sheet bundles are discharged while the sheet widths are shifted or the positions of the trailing edge portions of the sheets not exposed from the opening are discharged in a shifted manner. Accordingly, the user can distinguish the sheet bundles. The user can more easily take out the sheet bundles if the exposure lengths of the sheet bundles exposed from the opening are aligned. Thus, this is good to reduce sheets, which are not taken out and left. Alternatively, in this embodiment, the determination on the sheet size (S629) may be omitted, and the exposure lengths of the sheets may be changed and the sheets may be output if the users who have performed printing or the job numbers are different (S628, S631, S632).

Figure 32:
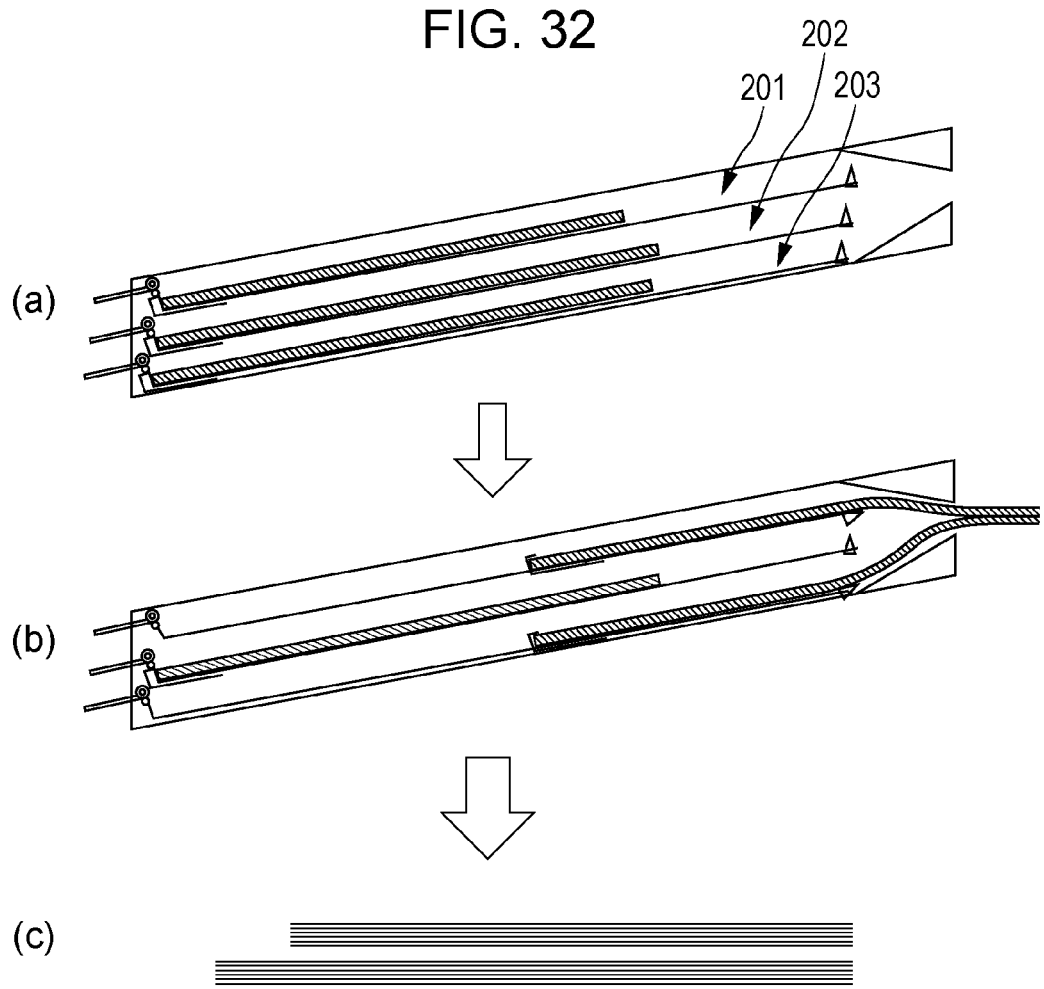
FIG. 32 illustrates a state when sheets are discharged according to the ninth embodiment of the invention.
Figure 33:
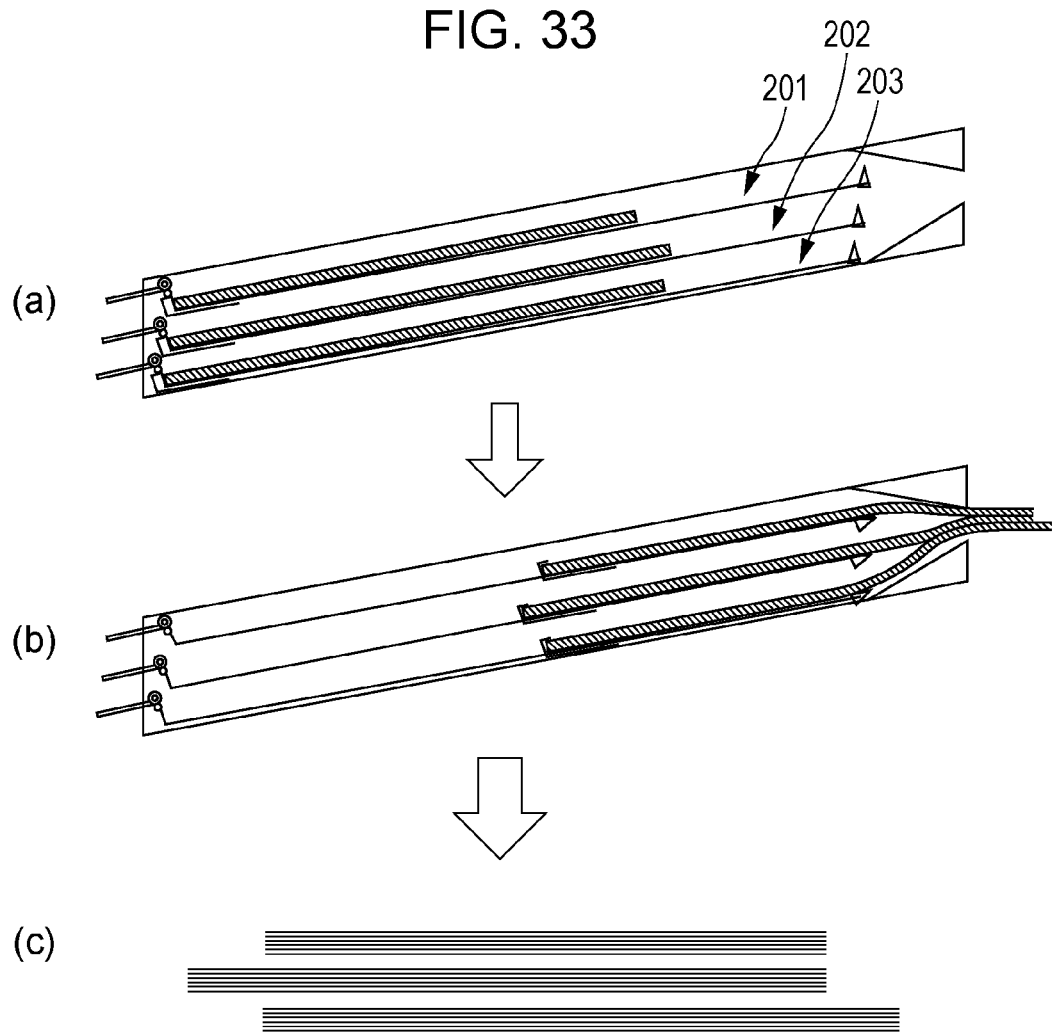
FIG. 33 illustrates a state when sheets are discharged according to the ninth embodiment of the invention.
Figure 34:
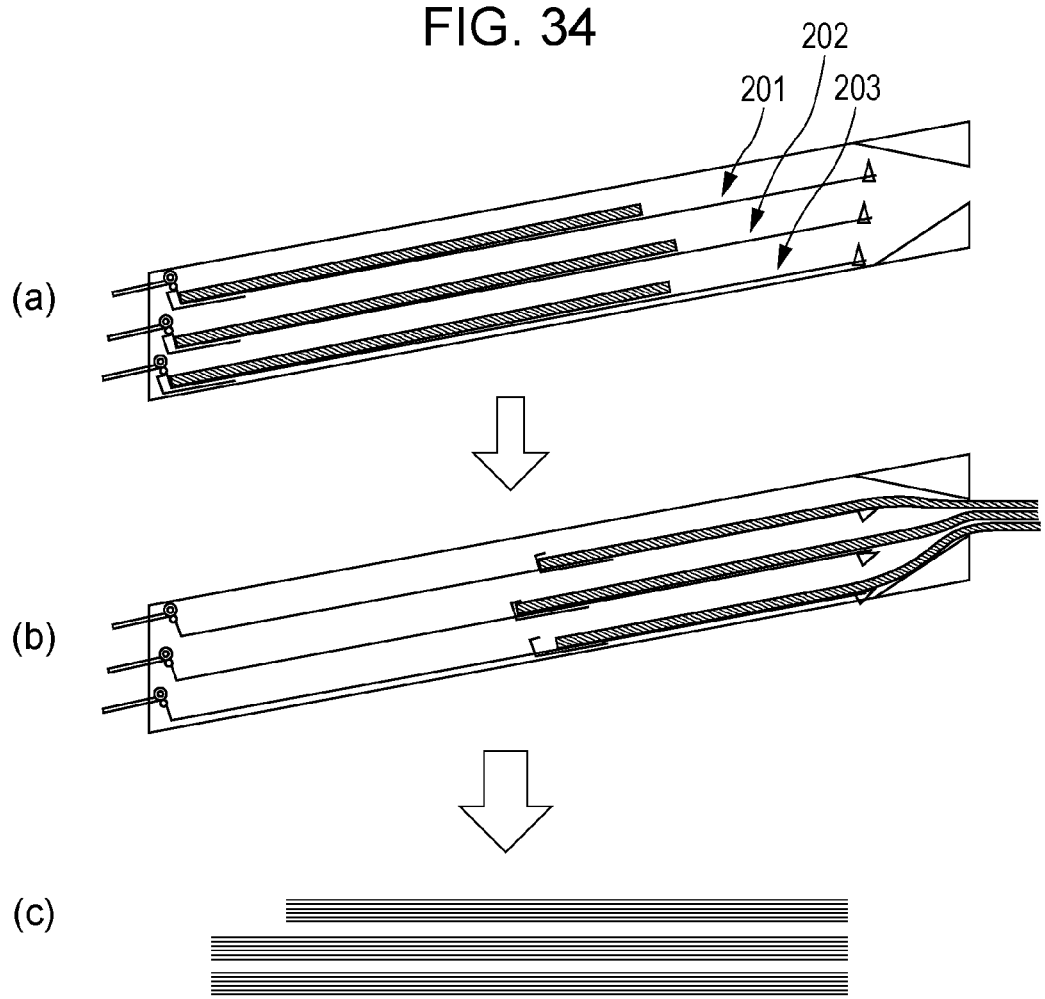
FIG. 34 illustrates a state when sheets are discharged according to the ninth embodiment of the invention.

FIGS. 32 to 34 illustrate operation examples of this embodiment. An example is provided, in which sheets of a user 1 (job number 3, LTR size) are stored in the sheet storage portion 201, sheets of a user 2 (job number 2, A4 size) are stored in the sheet storage portion 202, and sheets of the user 1 (job number 1, A4 size) are stored in the sheet storage portion 203 (part (a) of FIG. 32, part (a) of FIG. 33).

When the discharge instruction is given for the sheets of the user 1, the operation is executed as follows according to the flow in FIG. 31. First, the lowermost sheet storage portion 203 is selected, and it is determined whether the discharge request is made or not. Since the discharge request is made on the sheet storage portion 203 and the previously set exposure length is not present, the exposure length of the sheets is determined at 4 cm. Then, the sheet storage portion 202 is selected. Since the discharge request is not made on the sheet storage portion 202, the sheet storage portion 202 is not the discharge target. Further, the sheet storage portion 201 is selected. Since the discharge request is made on the sheet storage portion 201, the sheet storage portion 201 serves as the discharge target, the user who has printed the sheets stored in the sheet storage portion 201 is the same as the previous sheet storage portion 203, and the job number of the sheets is different. Further, the sheet size is determined Since the sheet size is different, the exposure length of 4 cm being the same as the previous exposure length of the sheet storage portion 203 is selected. When the determination for all sheet storage portions is completed, the sheets of the sheet storage portions as the discharge targets are discharged (part (b) of FIG. 32). The discharge operation is similar to the first embodiment. Part (c) of FIG. 32 illustrates a state of the sheet bundles discharged this time.

In a similarly stacked state, if the discharge instruction is made for all sheet storage portions, the operation is executed as follows. First, the lowermost sheet storage portion 203 is selected, and it is determined whether the discharge request is made or not. Since the discharge request is made on the sheet storage portion 203 and the previously set exposure length is not present, the exposure length of the sheets is determined at 4 cm. Then, the sheet storage portion 202 is selected. Since the discharge request is made on the sheet storage portion 202, the sheet storage portion 202 serves as the discharge target, the user is different from that of the previously selected sheet storage portion 203, and the sheet size is the same. Hence, the exposure length is set at 3 cm. Then, the sheet storage portion 201 is selected. Since the discharge request is made on the sheet storage portion 201, the sheet storage portion 201 serves as the discharge target, the user and the sheet size are different from those of the previously selected sheet storage portion 202. Hence, the exposure length of 3 cm, which is the same as that of the previous sheet storage portion 202, is selected. When the determination for all sheet storage portions is completed, the sheets of the sheet storage portions as the discharge targets are discharged (part (b) of FIG. 33). The discharge operation is similar to the first embodiment. Part (c) of FIG. 33 illustrates a state of the sheet bundles discharged this time. The exposure length of the leading edges of the sheets of the lowermost sheet storage portion 203 is different from that of the sheet storage portion 202 arranged above the sheet storage portion 203, and thus the difference in user can be recognized. The sheet storage portion 201 arranged above the sheet storage portion 202 has the same exposure length of the leading edges of the sheets as that of the sheet storage portion 202 arranged below the sheet storage portion 201. However, the difference in user can be recognized from the difference in sheet size.

Further, a discharge example is provided, in which the same job is stored in a plurality of sheet storage portions. An example is provided, in which sheets of a user 1 (job number 2, LTR size) are stored in the sheet storage portion 201, sheets of the user 1 (job number 1, A4 size) are stored in the sheet storage portion 202, and sheets of the user 1 (job number 1, A4 size) are stored in the sheet storage portion 203 (part (a) of FIG. 34).

When the discharge instruction is given for the sheets of the user 1, if the operation is executed according to the operation flow in FIG. 31, the operation is executed as follows. First, the lowermost sheet storage portion 203 is selected, and it is determined whether the discharge request is made or not. Since the discharge request is made on the sheet storage portion 203 and the previously set exposure length is not present, the exposure length of the sheets is determined at 4 cm. Then, the sheet storage portion 202 is selected. Since the discharge request is made on the sheet storage portion 202, the sheet storage portion 202 serves as the discharge target, the user is the same as that of the previously selected sheet storage portion 203, and the job number is the same. Hence, the exposure length is set at 4 cm. Then, the sheet storage portion 201 is selected. Since the discharge request is made on the sheet storage portion 201, the sheet storage portion 201 serves as the discharge target, the user is the same as that of the previously selected sheet storage portion 202, the job number is different, and the sheet size is different. Hence, the exposure length of 4 cm, which is the same as that of the previous sheet storage portion 202, is selected. When the determination for all sheet storage portions is completed, the sheets of the sheet storage portions as the discharge targets are discharged (part (b) of FIG. 34). The discharge operation is similar to the first embodiment. Part (c) of FIG. 34 illustrates a state of the sheet bundles discharged this time. Since the exposure lengths of the sheets stored in the sheet storage portions 203 and 202 of the same user and the same job number are the same, the sheets form one sheet bundle when the user takes out the sheets, and the sheets can be distinguished as the same job. The exposure length of the sheets stored in the sheet storage portion 201 of the same user and the different job number is the same as the exposure lengths of the other two sheet storage portions. However, the difference in job can be distinguished from the difference in sheet size.

As described above, with the image forming apparatus of this embodiment, a user can easily distinguish a plurality of sheet bundles taken out by the user even when sheets sorted to a plurality of sheet storage portions serving as the discharge targets are exposed in a stacked manner from the same opening.

Tenth Embodiment

As described in the ninth embodiment, if the sheet size is different from that of the sheets of the previous discharge target, even when the exposure lengths of the sheets are the same, the difference in user who has printed the sheets and the difference in job number can be recognized. That is, the sheet bundles can be easily distinguished. The user can more easily take out the sheet bundles if the exposure lengths of the sheet bundles exposed from the opening are aligned. Thus, this is good to reduce sheets, which are not taken out and left. In this embodiment, to provide such a state, an image forming apparatus that stores sheets with different sheet sizes in adjacent sheet storage portions is described.

Figure 35:
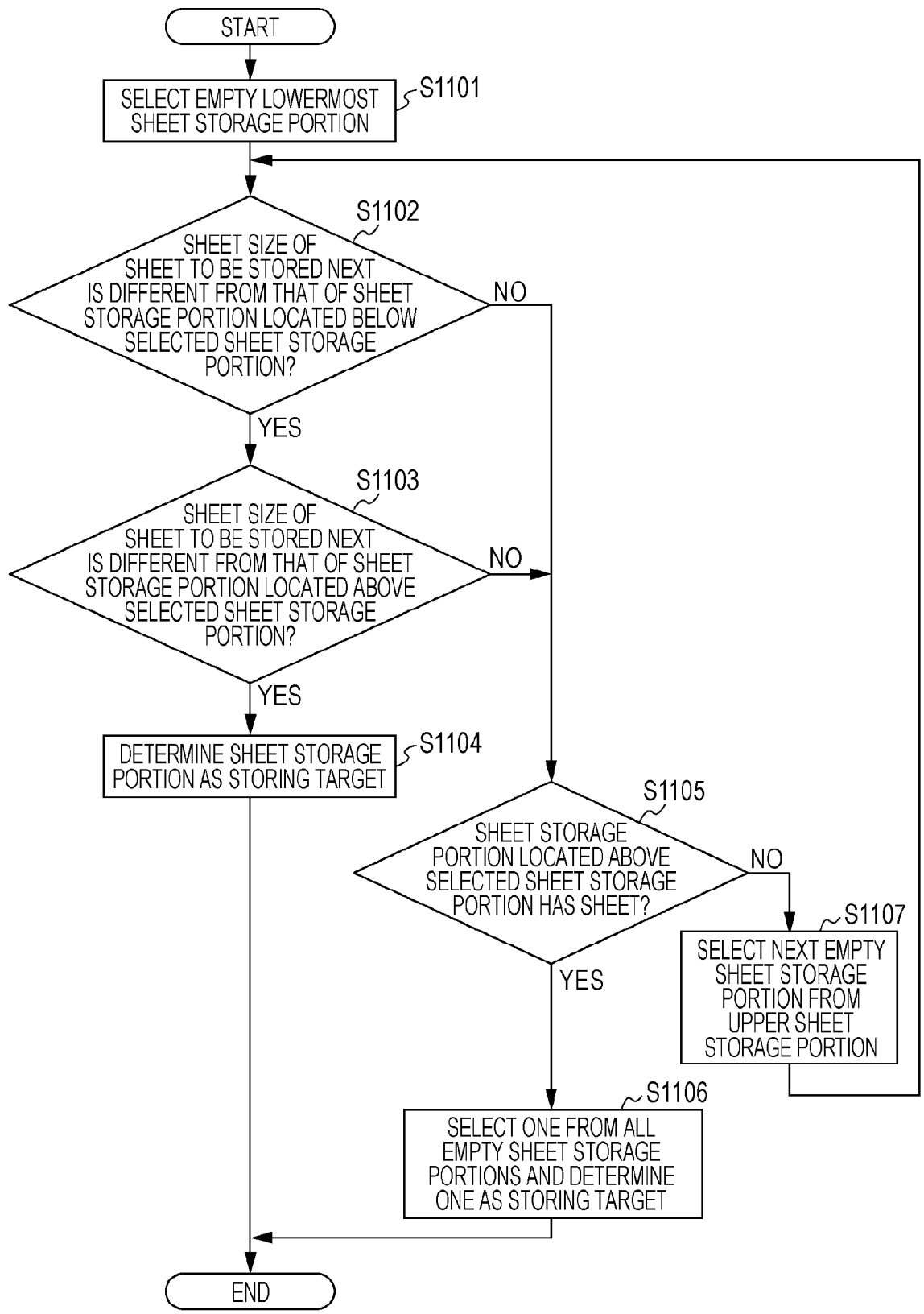
FIG. 35 is a flowchart showing a selection operation of a sheet storage portion according to the tenth embodiment of the invention.

FIG. 35 is a flowchart showing a selection operation of sheet storage portions according to this embodiment. First, the lowermost sheet storage portion is selected from among empty sheet storage portions (sheet storage portions not storing a sheet) (S1101). Then, the sheet size of sheets to be stored next is compared with the sheet sizes of sheets stored in sheet storage portions located below and above the selected sheet storage portion (S1102, S1103). If the sheet sizes of the sheets in both the sheet storage portions below and above the selected sheet storage portion are different, the selected sheet storage portion is determined as the storing target of the sheets (S1104). If the sheet size of the sheets in one of the sheet storage portions below and above the selected sheet storage portion is the same as the sheet size of the sheets in the selected sheet storage portion, an empty sheet storage portion located at the further upper side is selected to search the next storing target, and the processing is repeated (S1105, S1107). If an empty sheet storage portion is not present at the further upper side, one sheet storage portion is selected from all empty sheet storage portions and is determined as the storing target (S1106).

Also, in the flowchart of FIG. 35, if the selected sheet storage portion is the lowermost sheet storage portion from among the sheet storage portions provided in the apparatus, S1102 is skipped, and only the comparison with the upper-side sheet storage portion is performed in S1103. If the selected sheet storage portion is the uppermost sheet storage portion from among the sheet storage portions provided in the apparatus, the comparison with the lower-side sheet storage portion is normally performed in S1102. Then, if the processing goes to S1103, S1103 is skipped, and the uppermost sheet storage portion is determined as the storing target in S1104. Even if a sheet is not stored in the sheet storage portion located above the selected sheet storage portion, the comparison of the sheet size is normally performed in S1102. Then, if the processing goes to S1103, S1103 is skipped, and the selected sheet storage portion is determined as the storing target in S1104.

With the above-described operation, when sheets stored in adjacent sheet storage portions are exposed in a stacked manner from the same opening, a situation with different sheet sizes frequently occurs. Hence, sheets can be exposed while the exposure lengths of the sheets are aligned as possible. Also, although not described in the flowchart, if the same job cannot be stored in one sheet storage portion, adjacent sheet storage portions are selected as the storing targets with priority. In this embodiment, the storing target is determined successively from the lowermost sheet storage portion. However, the storing target may be determined from the uppermost side.

As described above, with the image forming apparatus of this embodiment, since sheets with different sheet sizes are stored in adjacent sheet storage portions, the user can easily distinguish the plurality of sheet bundles taken out by the user.

In the above-described eighth to tenth embodiments, the one opening is provided, and the opening is common to all sheet storage portions. However, a plurality of openings may be additionally provided. In this case, the operation of the above-described embodiments can be applied to a case in which sheets of the plurality of sheet storage portions are exposed from one of the plurality of openings.

Also, in the above-described eighth to tenth embodiments, the configuration with the three sheet storage portions is described. However, the number of sheet storage portions is not limited to three. The number of sheet storage portions may be set in accordance with the environment in which the apparatus body is used, the number of users who use the apparatus in a shared manner, or the specification of the apparatus body.

Also, in the above-described eighth to tenth embodiment, the sheet storage device is part of the image forming apparatus, and the same CPU controls the sheet storage device. However, the sheet storage device may include an independent CPU, and may be operated in response to an instruction from the controller 302 or the engine control unit 303.

Also, in the above-described eighth to tenth embodiments, the example of a laser beam printer is shown. The image forming apparatus to which the invention is applied is not limited thereto. A printer of other print method, such as an inkjet printer, or a copier may be employed.

Eleventh Embodiment

In an eleventh embodiment, control, in which the length by which a sheet is exposed to the outside from the opening is changed in accordance with the basis weight of the sheet, is described. It is noted that the basis weight is a weight per one square meter (unit: $g/m^2$). The configuration of the image forming apparatus 100 is the same as that of the first embodiment, and hence is not described.

Configuration Diagram of Sheet Storage Device in Eleventh Embodiment

Figure 36:
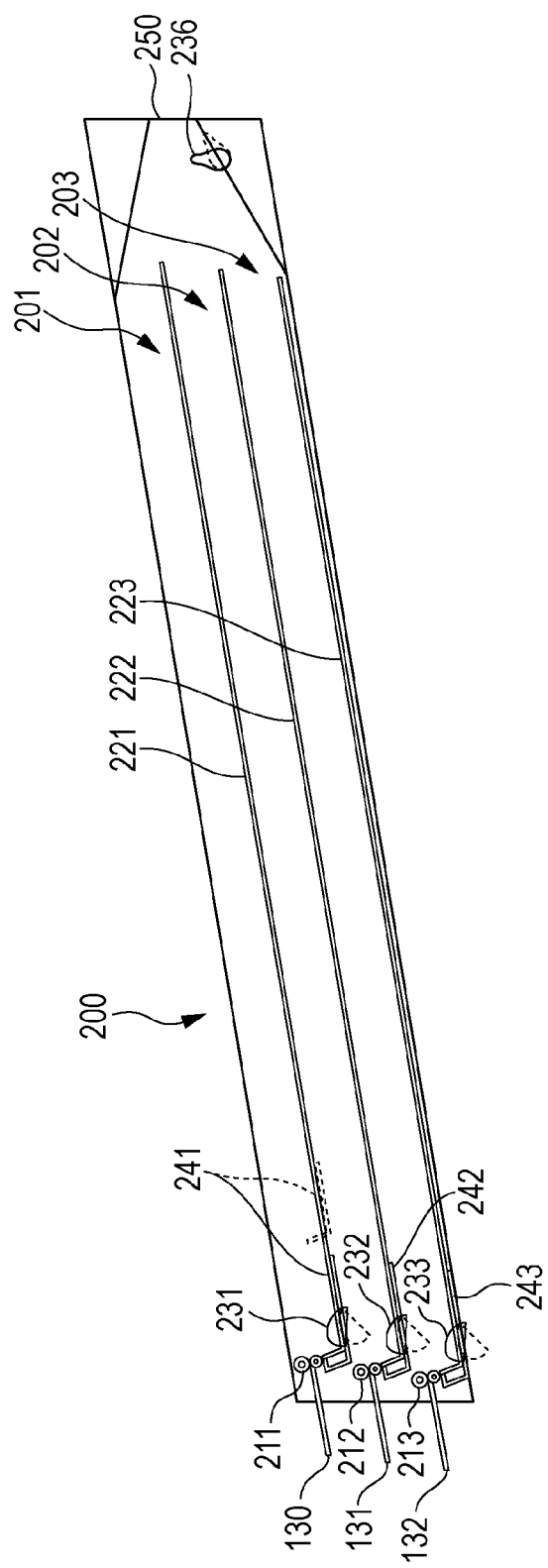
FIG. 36 illustrates a configuration of a sheet storage device according to eleventh and twelfth embodiments of the invention.

FIG. 36 illustrates a configuration of a sheet storage device 200. In the sheet storage device of this embodiment, a plurality of stages of sheet storage portions are vertically stacked. The respective sheet storage portions have the same configuration. Here, the configuration of a first sheet storage portion 201 is described.

The first sheet storage portion 201 includes a conveying roller 211 that conveys a sheet, a stack tray 221 that stacks and temporarily stores the sheet, and a sheet sensor 231 that detects whether the sheet is stored on the stack tray 221 or not. Further, the first sheet storage portion 201 includes a sheet moving unit 241 that presses an upstream edge portion in a conveying direction of the sheet (the trailing edge of the stored sheet), and causes the leading edge of the stored sheet to be exposed to the outside of the image forming apparatus 100. The sheet moving unit 241 moves the sheet to a position at which the user can take out the sheet, and exposes the sheet to the outside of the apparatus from an opening 250. When the leading edge of the moved sheet tilts an opening sensor 236 arranged near the opening 250 to a position indicated by broken lines, the opening sensor 236 is turned ON. When the sheet exposed to the outside of the apparatus is taken out and the opening sensor 236 returns to a position indicated by solid lines, the opening sensor 236 is turned OFF.

Also, the stack tray 221 has a length set such that, even when a sheet with the maximum size being able to be stored in the first sheet storage portion 201 is stacked, the leading edge of the sheet is not exposed from the opening 250. When a sheet is stacked on the stack tray 221 and tilts the sheet sensor 231 to a position indicated by broken lines, the sheet sensor 231 is turned ON. When the sheet is moved by the sheet moving unit 241 and the sheet sensor 231 returns to a position indicated by solid lines, the sheet sensor 231 is turned OFF. If sheets are successively conveyed to the first sheet storage portion 201, the sheet moving unit 241 is located at a stack position indicated by solid lines so as not to disturb conveyance and stacking of the sheets. In contrast, to expose the stored sheets, the sheet moving unit 241 can move toward the opening 250 in the sheet conveying direction, and can move to an exposure position indicated by broken lines so as to expose the sheets.

Figure 37:
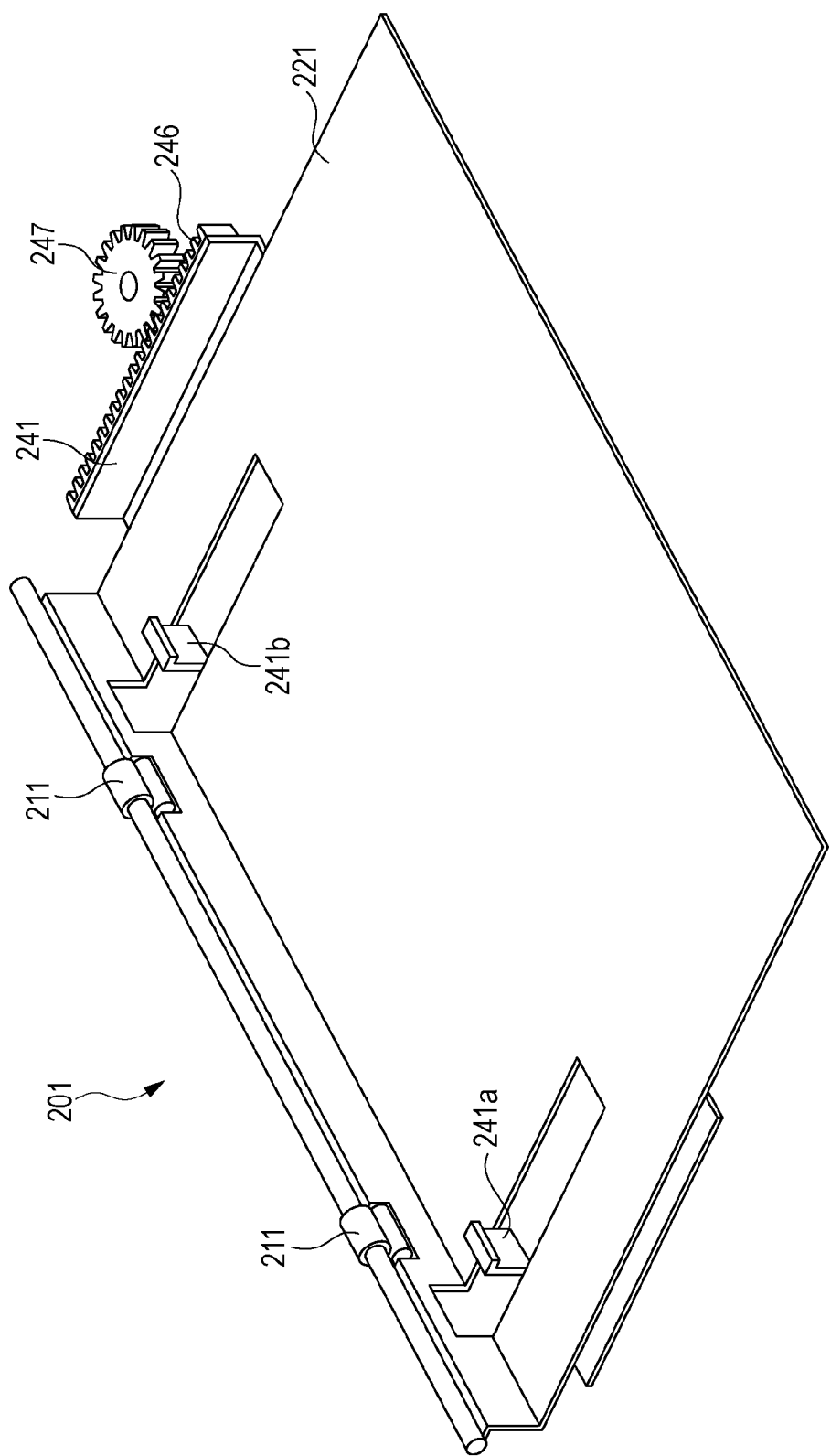
FIG. 37 is a perspective view of a sheet storage portion according to the eleventh and twelfth embodiments of the invention.

FIG. 37 is a perspective view of the sheet storage portion 201. In FIG. 37, the sheet moving unit 241 is located at a position between the stack position and the exposure position. The sheet moving unit 241 has two sheet trailing-edge pressing portions 241a and 241b arranged along a sheet width direction. Also, the sheet moving unit 241 has a rack 246 integrally formed therewith. The rack 246 meshes with a pinion 247. The pinion 247 is connected with an actuator, which is a driving unit (not shown in FIG. 37). The actuator is driven forward or backward, and hence the sheet moving unit 241 can reciprocate between the stack position and the exposure position.

Block Diagram of Control Unit and Function Configuration in Eleventh Embodiment

Figure 38:
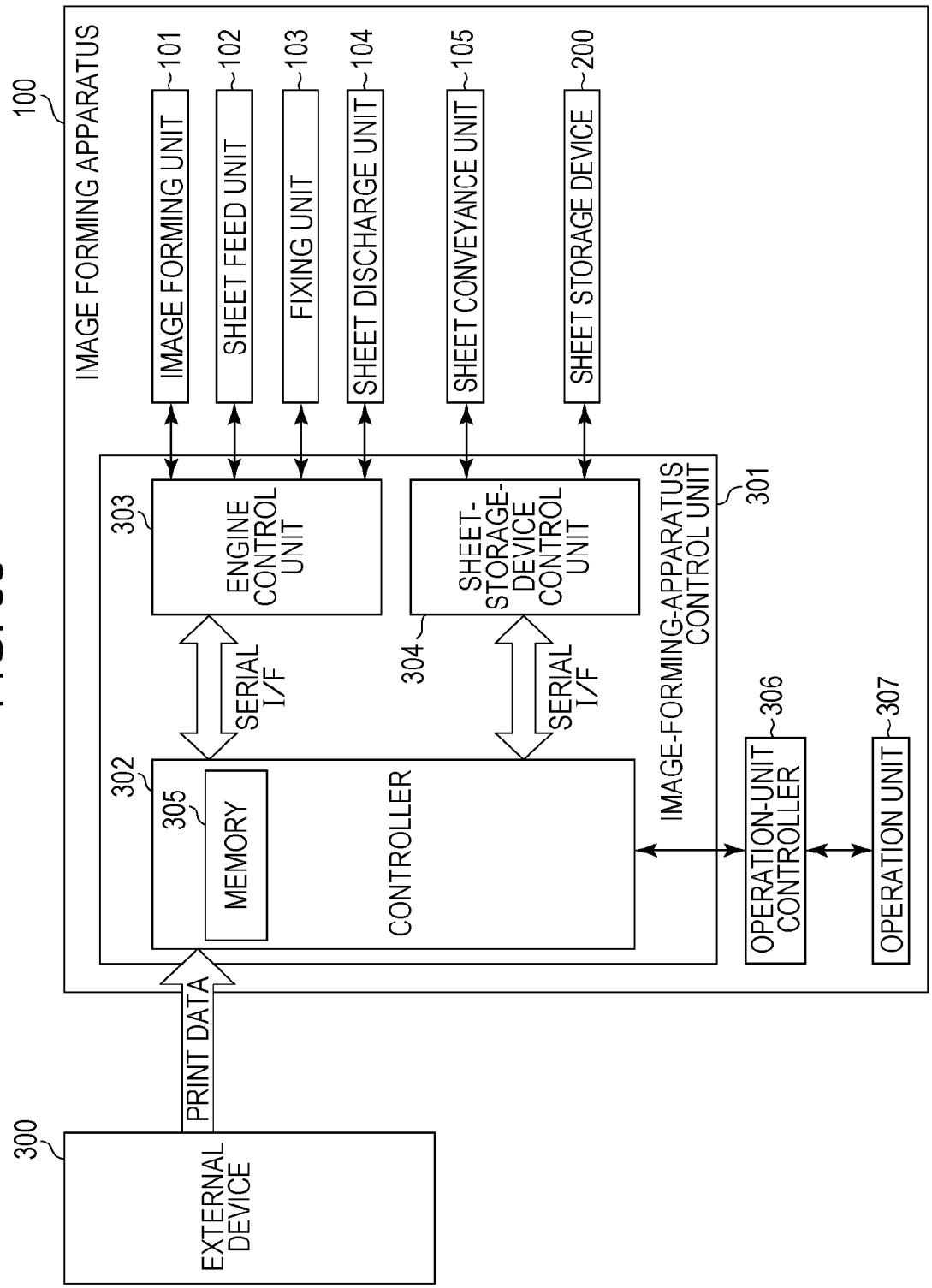
FIG. 38 is a block diagram showing a control unit and a function configuration of an image forming apparatus according to the eleventh and twelfth embodiments of the invention.

FIG. 38 is a block diagram showing a control unit and a function configuration in this embodiment. The image forming apparatus 100 includes an image-forming-apparatus control unit 301 as the control unit. The image-forming-apparatus control unit 301 includes a controller 302, an engine control unit 303, and a sheet-storage-device control unit 304.

The controller 302 makes communication with an external device 300 such as a host computer and receives print data. The received print data is stored in a memory 305 (for example, hard disk). The controller 302 develops the print data stored in the memory 305 and creates a print condition. Also, the controller 302 designates a print condition that is created on the basis of the print data, for the engine control unit 303 through a serial I/F. The engine control unit 303 controls respective mechanisms under the print condition received from the controller 302. To be specific, the engine control unit 303 controls a sheet feed unit 102 and a sheet discharge unit 104 to feed and discharge a sheet, and controls an image forming unit 101 and a fixing unit 103 to form an image on and fixing the image to the sheet.

Also, the controller 302 develops the print data stored in the memory 305 and creates a storing condition and a discharge condition of each sheet storage portion. Also, the controller 302 designates a storing condition and a discharge condition that are created on the basis of the print data, for the sheet-storage-device control unit 304 through a serial I/F. The sheet-storage-device control unit 304 controls respective mechanisms under the storing condition and the discharge condition received from the controller 302. To be specific, the sheet-storage-device control unit 304 controls a sheet conveyance unit 105 to convey the sheet with the image formed thereon to one of the sheet storage portions, and controls the sheet storage device 200 including the sheet moving unit 241 to move the sheet stored in one of the sheet storage portions to the opening 250. Also, an operation-unit controller 306 performs control of notifying the controller 302 about various settings and a discharge instruction made by the user with an operation unit 307.

Detail of Sheet-Storage-Device Control Unit in Eleventh Embodiment

Figure 39:
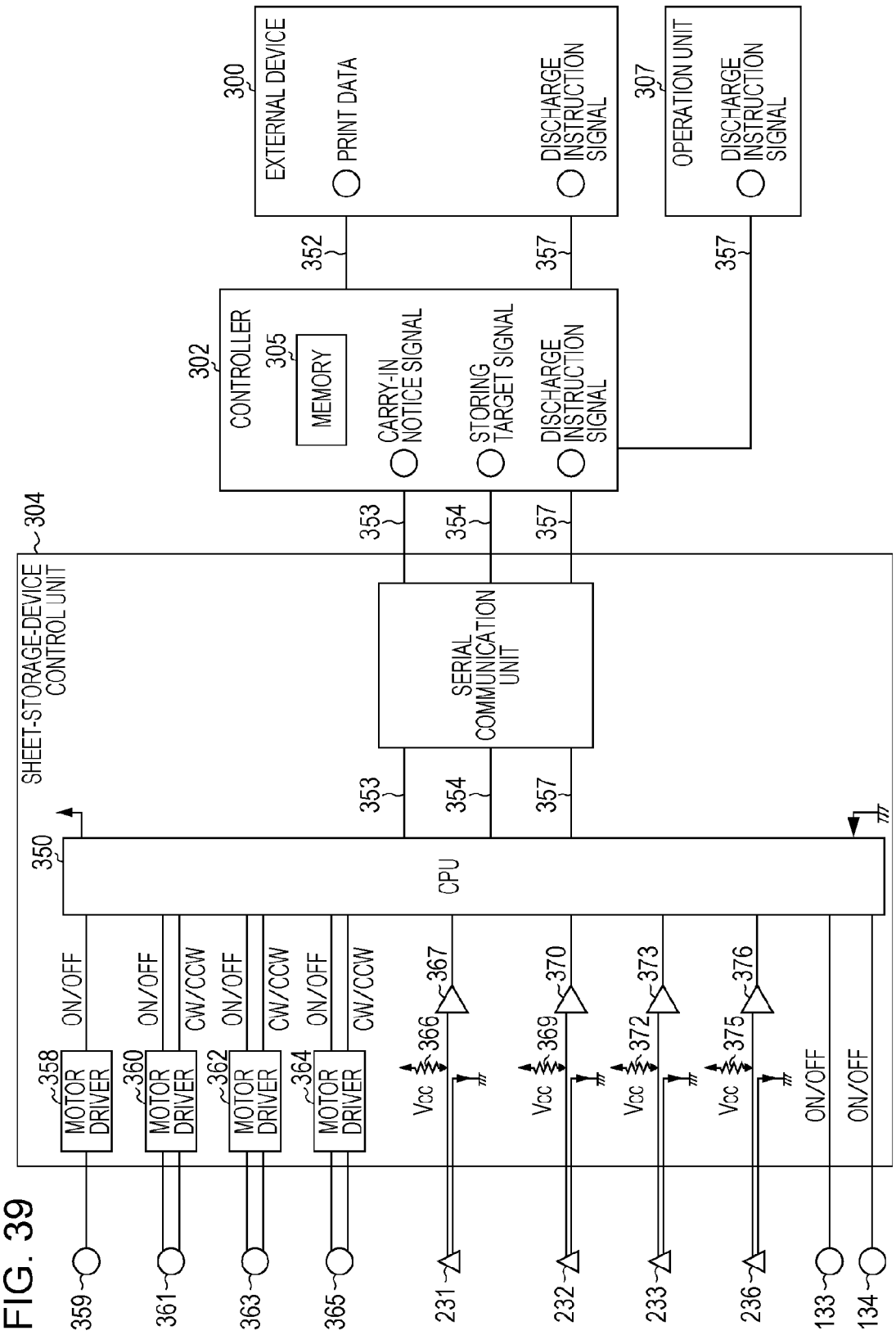
FIG. 39 is a detailed view of a sheet-storage-device control unit according to the eleventh and twelfth embodiments of the invention.

FIG. 39 is a detailed view of the sheet-storage-device control unit 304 in this embodiment. The sheet-storage-device control unit 304 includes a CPU 350, and makes communication with the controller 302 through a serial communication unit. The serial communication unit connects the CPU 350 with the controller 302 through a plurality of signal lines.

Control when a sheet is stored in the sheet storage device 200 is described. When the controller 302 is notified of print data 352 through the external device 300, the controller 302 temporarily stores the print data 352 in the memory 305. Then, the controller 302 develops the stored print data 352, and notifies the CPU 350 of signals, such as a carry-in notice signal 353, and a storing target signal 354, through the serial communication unit. The CPU 350 controls each actuator (described later) based on the notified signals, and conveys a printed sheet to one of the sheet storage portions.

Then, control when a sheet is exposed from the sheet storage device 200 is described. When the user gives a discharge instruction for a sheet stored in a sheet storage portion through the external device 300 or the operation unit 307, the controller 302 is notified of a discharge instruction signal 357. After the controller 302 determines the sheet storage portion for discharge, the controller 302 notifies the CPU 350 of the discharge instruction signal 357 through the serial communication unit, and instructs the discharge to the corresponding sheet storage portion. The CPU 350 controls each actuator (described later) to cause the sheet in the notified sheet storage portion to be exposed from the opening 250.

Next, each actuator connected with the CPU 350 is described.

A motor driver 358 is connected with an output terminal of the CPU 350. The motor driver 358 drives a convey motor 359. When the convey motor 359 is rotated, the conveying rollers 211, 212, and 213 are rotated and convey sheets to the respective sheet storage portions.

A motor driver 360 is connected with an output terminal of the CPU 350. The motor driver 360 drives a discharge motor 361. When the discharge motor 361 is rotated in the CW direction, the sheet moving unit 241 of the first sheet storage portion 201 moves to an exposure position, and the sheet is exposed to the outside from the opening 250. When the discharge motor 361 is rotated in the CCW direction, the sheet moving unit 241 of the first sheet storage portion moves to a stack position. Similarly, motor drivers 362 and 364 are connected with output terminals of the CPU 350, and respectively drive discharge motors 363 and 365. The discharge motor 363 controls a sheet moving unit 242 of the second sheet storage portion 202, and the discharge motor 365 controls a sheet moving unit 243 of the third sheet storage portion 203.

The sheet sensor 231 uses a pull-up resistance 366 and inputs information indicative of whether or not a sheet is stored in the first sheet storage portion 201 to the CPU 350 through a buffer 367. Similarly, a sheet sensor 232 uses a pull-up resistance 369 and inputs information indicative of whether or not a sheet is stored in the second sheet storage portion 202 to the CPU 350 through a buffer 370. A sheet sensor 233 uses a pull-up resistance 372 and inputs information indicative of whether or not a sheet is stored in the third sheet storage portion 203 to the CPU 350 through a buffer 373.

The opening sensor 236 uses a pull-up resistance 375 and inputs information indicative of whether or not a sheet is exposed from the opening 250, to the CPU 350 through a buffer 376.

An actuator that switches a second switch member 133 is connected with an output terminal of the CPU 350. When the actuator is ON, the second switch member 133 is switched to convey a sheet toward the conveyance guide 129. When the actuator is OFF, the second switch member 133 is switched to convey a sheet toward the conveyance guide 132. Similarly, an actuator that switches a third switch member 134 is connected with an output terminal of the CPU 350. The third switch member 134 is switched to convey a sheet toward the conveyance guide 130 when the actuator is ON, and is switched to convey a sheet toward the conveyance guide 131 when the actuator is OFF.

Description on Operation of Sheet Storage Device in Eleventh Embodiment

Next, an operation of the sheet storage device 200 is described. In this embodiment, when sheets are stored in the sheet storage device 200, the sheets are sorted to sheet storage portions for respectively different job numbers of the sheets. Also, when sheets are exposed from the sheet storage device 200, the sheets of a user who has given a discharge instruction for the sheets are exposed from the opening 250. In this embodiment, as described above, the sheet storage portions are provided with the individual actuators for driving the respective sheet moving units 241 to 243. Therefore, even when sheets of the same user are stored in the plurality of sheet storage portions, by driving the respective actuators, the user can collectively take out the sheets. Also, information of a job number of a sheet, information of a user who has instructed printing of the sheet, etc., are stored in the memory 305 provided at the controller 302.

Figure 40:
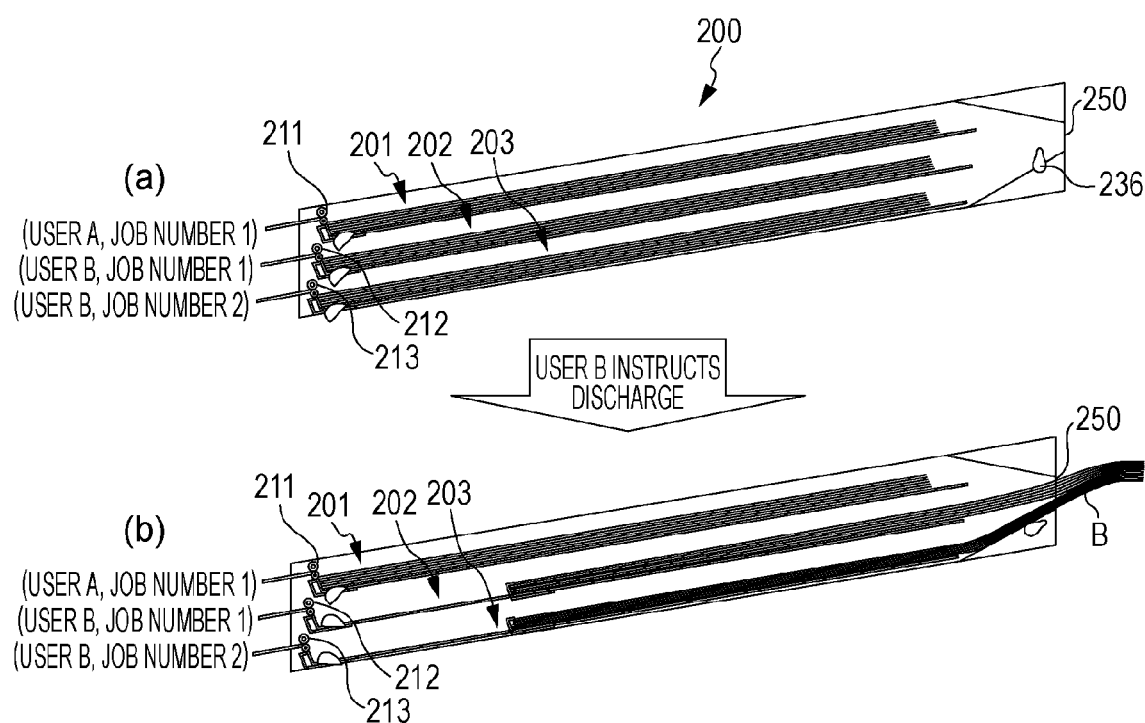
FIG. 40 illustrates a state of the sheet storage device when sheets are exposed according to the eleventh and twelfth embodiments of the invention.

FIG. 40 illustrates an operation example of the sheet storage device 200. In part (a) of FIG. 40, sheets of a user A are stored in the sheet storage portion 201, and sheets of a user B are stored in the sheet storage portions 202 and 203. The sheet storage portion 202 stores sheets of a job number 1 among the sheets printing of which has been instructed by the user B. Sheets of a job number 2 are stored in the sheet storage portion 203. In part (b) of FIG. 40, when a discharge instruction is output for the sheets of the user B, the sheet moving units of the sheet storage portions 202 and 203 are moved to the exposure positions, and expose a sheet bundle B from the opening 250.

Figure 41:
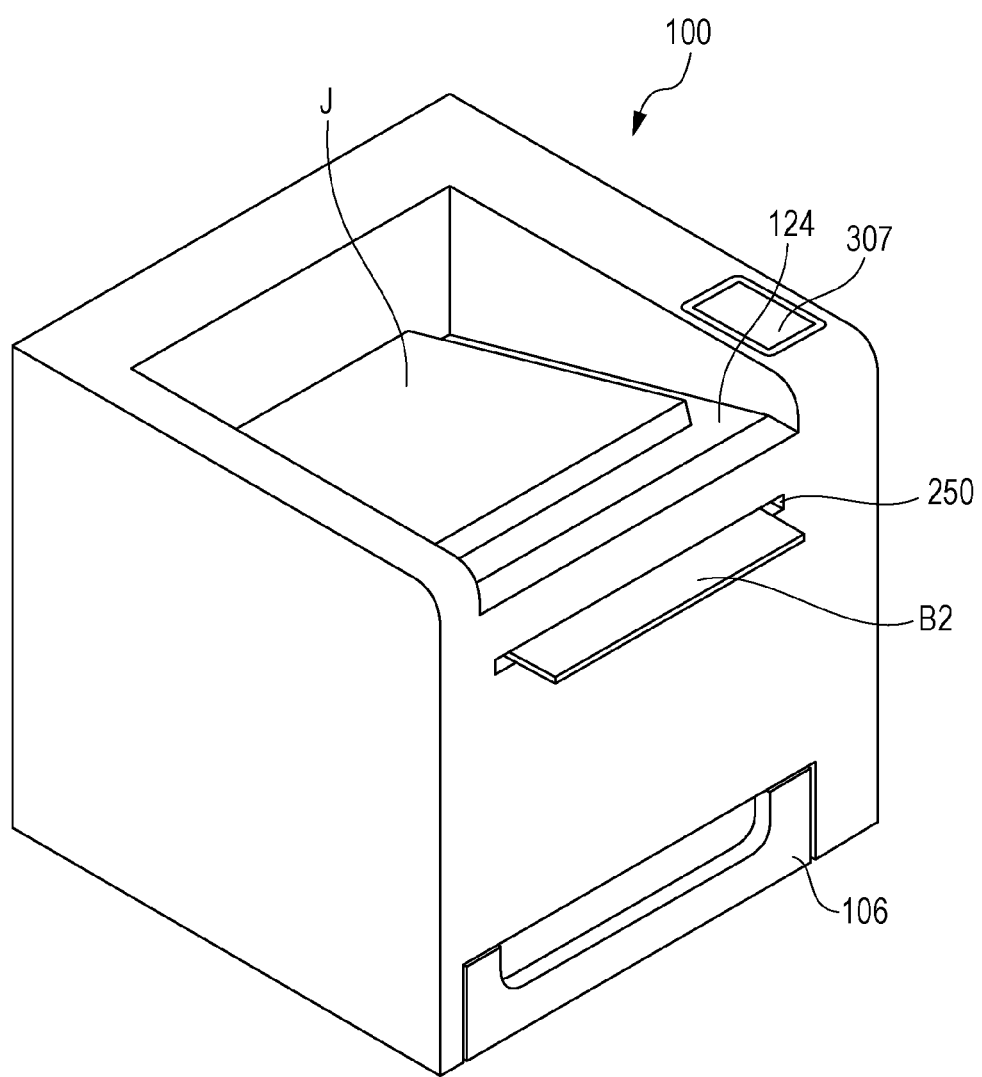
FIG. 41 is a perspective view of the image forming apparatus when sheets are exposed according to the eleventh and twelfth embodiments of the invention.

FIG. 41 is a perspective view of the image forming apparatus 100 at this time. A sheet bundle J printed by a plurality of users is stacked on the discharge tray 124, and a downstream edge portion B2 of the sheet bundle B is exposed from the sheet storage portions 202 and 203 from the opening 250. The user can take out the sheet bundle B by grabbing the downstream edge portion B2 exposed to the outside of the apparatus and pulling out the sheet bundle B.

Description on Control of Changing Exposure Length

With the above-described image forming apparatus, control characteristic to the embodiment of the invention is described. In this embodiment, a length by which a sheet is exposed to the outside from the opening 250, that is, an exposure length is changed in accordance with the basis weight of the sheet.

Figures 42, 43:
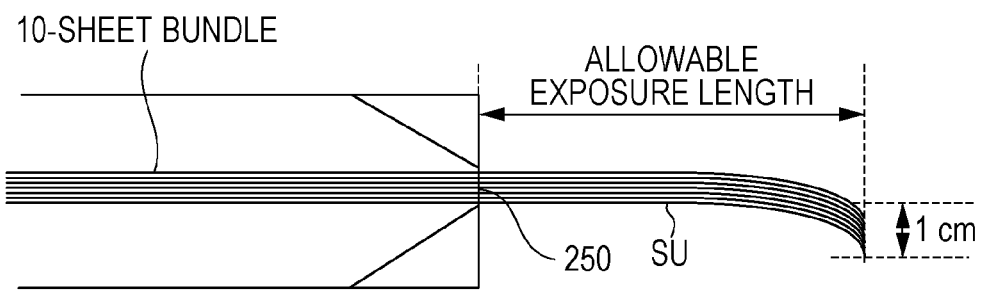
FIG. 42 is a table showing the relationship between the basis weight and the allowable exposure length of a sheet to be exposed.
FIG. 43 explains a definition of an allowable exposure length.

An experiment was performed first to study the relationship between the basis weight and exposure length of a sheet. FIG. 42 shows the result. FIG. 42 is a table showing allowable exposure lengths when sheets with different basis weights were exposed from the opening 250. The sheets used in this case are three types of thin paper, normal paper, and thick paper, and have the same sheet size.

Also, the allowable exposure length in FIG. 42 is an exposure length when 10 sheets are exposed in a stacked manner and a hang-down length of the exposed bundle of sheets becomes 1 cm. In this case, the hang-down length of the bundle of sheets is determined on the basis of a sheet SU located at the lowermost position in the vertical direction among the exposed 10 sheets. In the vertical direction, the length by which the leading edge of the sheet SU hangs down with respect to a position at which the sheet SU contacts the opening 250 is defined as the hang-down length.

FIG. 43 shows the state. The value of 1 cm is an example. The maximum hang-down length to be allowed is set in view of easiness when sheets are taken out.

Referring to the result of FIG. 42, as the basis weight of a sheet increases, the allowable exposure length increases. This is because, as the basis weight of a sheet increases, the hardness of the sheet increases, and hence the bending amount of the sheet decreases. With regard to this result, in this embodiment, the exposure length is set in accordance with the basis weight of the sheet as long as the exposure length does not exceed the allowable exposure length. The exposure length is set at "small" if the sheet is thin paper having a basis weight being smaller than 75 g, the exposure length is set at "medium" if the sheet is normal paper having a basis weight being equal to or larger than 75 g and smaller than 130 g, and the exposure length is set at "large" if the sheet is thick paper having a basis weight of 130 g or larger. In this case, the exposure length is defined such that "small" is 30 mm, "medium" is 50 mm, and "large" is 70 mm. With this exposure length, the hang-down length becomes smaller than 1 mm, and this state causes the user to easily take out the sheets. However, at this time, the exposure length of the sheets can be set so that the center of gravity of the sheets does not go beyond the opening 250. This is because, if the sheets are pushed out to a position at which the center of gravity goes beyond the opening 250, the sheets may slip down from the opening 250 before the user takes out the sheets.

Next, a flowchart and a specific example of this embodiment are described with reference to FIGS. 44 and 45. Control based on the flowchart in FIG. 44 is executed by the controller 302 described in FIG. 38 based on a program stored in the memory 305.

Figure 44:
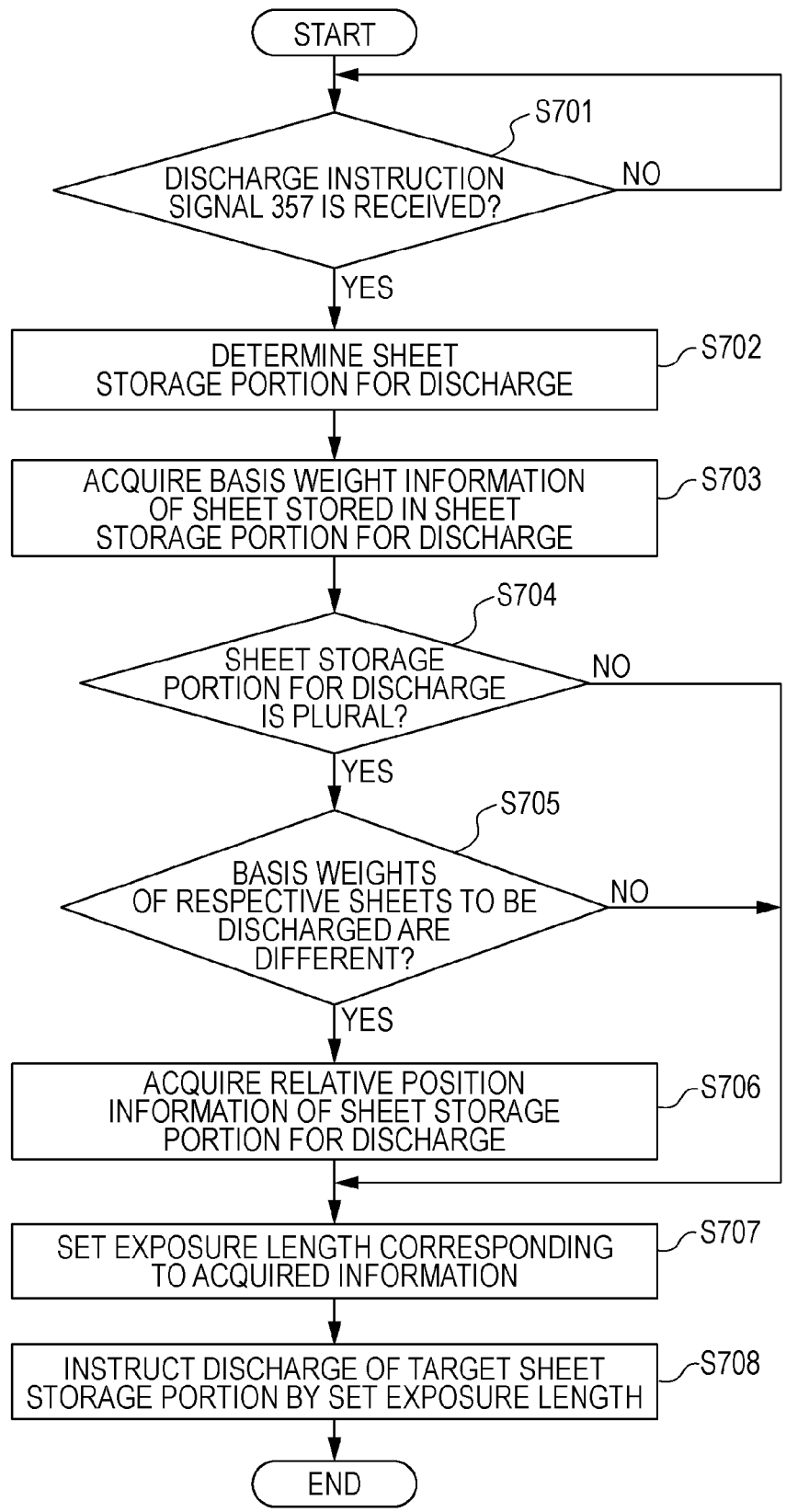
FIG. 44 is a flowchart showing an operation of a control unit according to the eleventh embodiment of the invention.

In FIG. 44, when the user gives a discharge instruction for sheets stored in a sheet storage portion through the external device 300 or the operation unit 307, the controller 302 is notified of a discharge instruction signal 357 (S701). When the controller 302 receives the discharge instruction signal 357, the controller 302 determines a sheet storage portion for discharge (S702). Then, the controller 302 acquires information of the basis weight of sheets stored in the sheet storage portion for the discharge (S703). The information of the basis weight of the sheets is acquired because the user inputs the information through the external device 300 or the operation unit 307 or because a media sensor that detects the basis weight is provided in the apparatus. An ultrasonic sensor (not shown) is known as the media sensor that detects the basis weight. The ultrasonic sensor irradiates a sheet with an ultrasonic wave, and receives the ultrasonic wave which is attenuated through the sheet. Hence, the ultrasonic sensor can detect the basis weight of the sheet. Alternatively, for the media sensor that detects the thickness of a sheet instead of the basis weight, a sensor that irradiates a sheet with light and detects the quantity of light transmitted through the sheet may be used. Then, the acquired information is stored in the memory 305. The controller 302 reads the information from the memory 305, and can acquire information of the basis weight. Then, the controller 302 determines whether the sheet storage portion for the discharge is one or plural (S704). If the sheet storage portion for the discharge is the one sheet storage portion, the controller 302 sets an exposure length corresponding to the acquired information (S707), and instructs the discharge of the one sheet storage portion as the discharge target with the set exposure length (S708).

Figure 45:
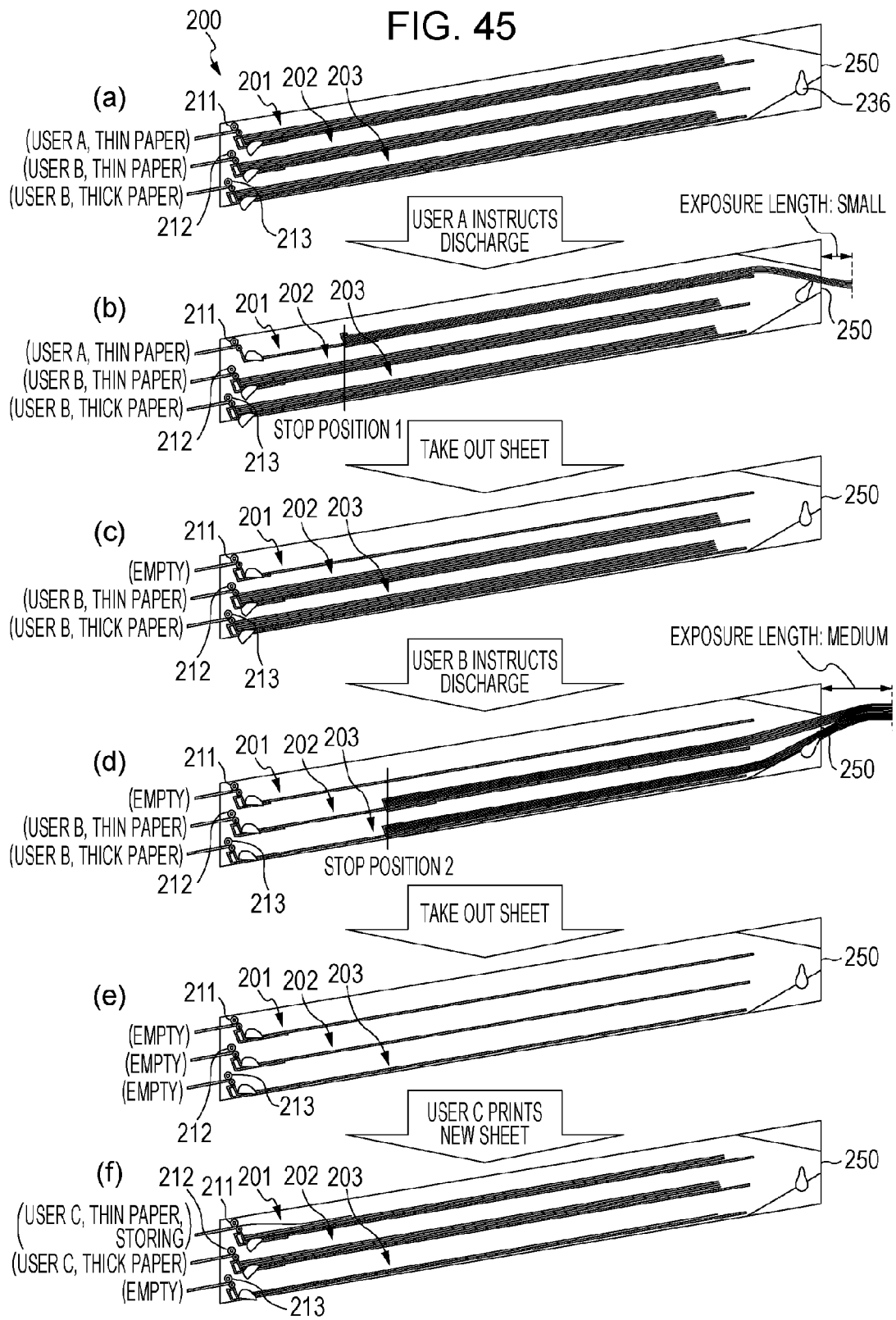
FIG. 45 illustrates a specific example to which the eleventh embodiment of the invention is applied.

Part (a) to part (c) of FIG. 45 illustrate a specific example when the sheet storage portion for discharge is one.

In part (a) of FIG. 45, the sheet storage device 200 includes three sheet storage portions. The sheet storage portion 201 stores sheets of thin paper instructed by a user A for printing. The sheet storage portion 202 stores sheets of thin paper instructed by a user B for printing. The sheet storage portion 203 stores sheets of thick paper instructed by the user B for printing.

Part (b) of FIG. 45 illustrates a state in which the user A gives a discharge instruction in the state shown in part (a) of FIG. 45 and the sheets in the sheet storage portion 201 are exposed to the outside. Since the sheet storage portion 201 stores the sheets of thin paper, the sheet moving unit 241 pushes out the trailing edges of the sheets to a stop position 1 and exposes the sheets from the opening 250 by an exposure length of "small."

Part (c) of FIG. 45 illustrates a state in which, the sheets in the sheet storage portion 201 are exposed, and then the sheets are pulled out by the user A. If it is detected that the sheets have been pulled out when the opening sensor 236 is changed from ON to OFF, the sheet moving unit 241 moves from the exposure position to the stack position. Further, when the sheet sensor 231 detects that the sheet storage portion 201 does not store a sheet, the sheet storage portion 201 becomes available for storing new sheets.

When Sheet Storage Portion for Discharge is Plural in Eleventh Embodiment

Next, a case is described, in which the sheet storage portion for discharge is plural. In the image forming apparatus of this embodiment, as described above, if sheets stored in the plurality of sheet storage portions are exposed from the opening 250, the sheets are exposed in a stacked manner. Then, if the sheet bundle exposed in a stacked manner contains sheets with different basis weights, the allowable exposure length may vary. FIG. 46 illustrates the result of an experiment performed for verifying this. FIG. 46 shows allowable exposure lengths when sheets with two different basis weights are exposed in a stacked manner. Five sheets are exposed from the upper-stage sheet storage portion and five sheets are exposed from the lower-stage sheet storage portion so that the number of sheets is 10 in total.

Referring to the result in FIG. 46, the allowable exposure length of the sheet bundle was 87 mm when the sheet bundle included the five sheets of thin paper stored in the upper-stage sheet storage portion and the five sheets of thick paper stored in the lower-stage sheet storage portion, and hence the sheet bundle included the 10 sheets in total. The value is larger than the allowable exposure length of the 10 sheets of thin paper shown in FIG. 42 by 27 mm, and is smaller than the allowable exposure length of the 10 sheets of thick paper by 8 mm. The allowable exposure length increased as compared with the 10 sheets of thin paper because the thick paper having a high hardness at the lower stage served as a base of the thin paper at the upper stage when the sheets were exposed from the opening 250 and the thick paper restricted the thin paper at the upper stage from bending. Meanwhile, the thick paper at the lower stage receives a force in the gravity direction from the thin paper having a low hardness at the upper stage and the thick paper more likely bends as compared with a case in which the thick paper is stored at the upper stage. Owing to this, the allowable exposure length is smaller than the case of the 10 sheets of thick paper.

In contrast, the allowable exposure length of the sheet bundle was 60 mm when the sheet bundle included five sheets of thick paper stored in the upper-stage sheet storage portion and five sheets of thin paper stored in the lower-stage sheet storage portion, and hence the sheet bundle included the 10 sheets in total. This is the same value as the allowable exposure length of 10 sheets of thin paper shown in FIG. 42. This is because, since the thin paper has a low hardness, the thin paper at the lower stage hangs down earlier than the thick paper at the upper stage. A portion exposed from the opening 250 of the thin paper at the lower stage markedly hangs down by the self weight before the thin paper receives the force in the gravity direction from the thick paper at the upper stage. The state is the same as that only thin paper is exposed, and hence the allowable exposure length is the same as the allowable exposure length of the thin paper.

With regard to this result, in this embodiment, the exposure length is set in accordance with the basis weights of the sheets and the relative positional relationship among the sheet storage portions as long as the exposure length does not exceed the allowable exposure length. If the basis weight of sheets stored in the upper-stage sheet storage portion is smaller than the basis weight of sheets stored in the lower-stage sheet storage portion, the exposure length of the sheets at the upper stage is set to be smaller by a step than the exposure length corresponding to the sheets at the lower stage. For example, if the upper stage stores thin paper and the lower stage stores thick paper, the set exposure length is "medium" that is smaller by a step than "large" corresponding to the thick paper. In contrast, if the basis weight of sheets stored in the upper-stage sheet storage portion is larger than the basis weight of sheets stored in the lower-stage sheet storage portion, the exposure length of the sheets at the upper stage is set to correspond to the sheets at the lower stage. For example, when the upper stage stores the thick paper and the lower stage stores the thin paper, the set exposure length is "small" corresponding to the thin paper.

Next, a flowchart and a specific example of this embodiment are described with reference to FIGS. 44 and 45.

In FIG. 44, if the sheet storage portion for discharge is plural, it is determined whether or not the basis weights of respective sheets to be discharged are different (S705). If the basis weights of the respective sheets to be discharged are the same, processing similar to the case in which the sheet storage portion for discharge is one is executed. In contrast, if the basis weights of the respective sheets to be discharged are different, relative position information of the sheet storage portions for discharge is acquired (S706). The relative position information is information indicative of whether a specific sheet storage portion among a plurality of sheet storage portions for discharge is located at the upper stage or the lower stage in the vertical direction. The controller 302 sets the exposure length corresponding to the acquired information of the basis weight and the acquired position information (S707), and designates discharge of the plurality of sheet storage portions as the discharge targets with the set exposure length (S708).

Part (c) to part (e) of FIG. 45 illustrate a specific example when the sheet storage portion for discharge is plural. Part (f) of FIG. 45 illustrates a specific example when new sheets are stored.

Part (c) of FIG. 45 illustrates a state in which, the sheets in the sheet storage portion 201 are exposed, and then the sheets are pulled out by the user A. The sheet storage portion 202 stores thin paper instructed by a user B for printing. The sheet storage portion 203 stores thick paper instructed by the user B for printing.

Part (d) of FIG. 45 illustrates a state in which the user B gives a discharge instruction in the state shown in part (c) of FIG. 45, and the sheets in the sheet storage portion 202 and the sheet storage portion 203 are exposed to the outside. The sheets stored in the two sheet storage portions have different basis weights. The basis weight of the thin sheets stored in the upper-stage sheet storage portion 202 is smaller than the basis weight of the thick paper stored in the lower-stage sheet storage portion 203. Owing to this, the sheet moving units 242 and 243 push out the trailing edges of the respective sheets to a stop position 2, and expose the sheets from the opening 250 by an exposure length of "medium" that is smaller by a step than the exposure length of "large" corresponding to the thick paper.

Part (e) of FIG. 45 illustrates a state in which, the sheets in the sheet storage portions 202 and 203 are exposed, and then the sheets are pulled out by the user B. If it is detected that the sheets have been pulled out when the opening sensor 236 is changed from ON to OFF, the sheet moving units 242 and 243 move from the exposure positions to the stack positions. Further, when the sheet sensors 232 and 233 detect that the sheet storage portion 202 or 203 does not store a sheet, the sheet storage portions 202 and 203 become available for storing new sheets.

Part (f) of FIG. 45 illustrates a state in which sheets newly instructed by a user C for printing are stored in the sheet storage portions 201 and 202. If the sheets are exposed from the plurality of sheet storage portions, the exposure length can be consequently large if sheets of thin paper are stored at the upper stage and sheets of thick paper are stored at the lower stage. Hence, if the same user instructs a plurality of print jobs and sheets have different basis weights, the sheets with a large basis weight are stored in the lower-stage sheet storage portion with priority.

In this embodiment, the corresponding exposure length is set by dividing types of sheets into three groups of thin paper, normal paper, and thick paper in accordance with the basis weight of the sheets. However, the exposure length may be set more specifically in accordance with the basis weight.

Also, when sheets are exposed from a plurality of sheet storage portions, the exposure length may be set by the above-described method, or other considerable method of setting an exposure length. For example, the exposure length may be set in accordance with an average value of exposure lengths corresponding to basis weights of respective sheets, or by calculating a weighted average in accordance with the numbers of respective sheets.

Also, in this embodiment, it is assumed that one sheet storage portion stores sheets with the same basis weight. However, one sheet storage portion may store sheets with different basis weights. In this case, even if the sheet storage portion for discharge is one, the processing goes to S705, and acquires relative position information in S706. In this case, the position information acquired in S706 is not position information of a sheet storage portion for discharge, but position information of sheets to be discharged. The position information of sheets to be discharged is information indicative of whether a sheet with a specific basis weight in a sheet storage portion for discharge is located at the upper side or the lower side. That is, the order of the sheet stored in the sheet storage portion. Then, the controller 302 sets the exposure length corresponding to the acquired information (S707), and instructs discharge with the set exposure length (S708).

As described above, by changing the length by which a sheet is exposed to the outside from the opening in accordance with the basis weight of the sheet, the sheet can be prevented from unnecessarily bending.

Twelfth Embodiment

Next, in a twelfth embodiment, control, in which the length by which a sheet is exposed to the outside from the opening is changed in accordance with the size of the sheet, is described. Major part of description is similar to the eleventh embodiment, and only part different from the first embodiment is described here.

An experiment was performed first to study the relationship between the size and exposure length of a sheet. FIG. 47 shows the result. FIG. 47 is a table showing allowable exposure lengths when sheets with different sizes are exposed from the opening 250. Sheets used in this case are three types of A5, A4, and A3, and the sheets have the same basis weight. Also, the definition of the allowable exposure length in FIG. 47 is the same as the allowable exposure length in FIG. 42.

Referring to the result of FIG. 47, as the size of a sheet increases, the allowable exposure length increases. This is because as a sheet has a larger size, the area of the sheet contacting one of the stack trays 221 to 223 is increased, and hence the posture of the sheet becomes stable. With regard to this result, in this embodiment, the exposure length is set in accordance with the size of the sheet as long as the exposure length does not exceed the allowable exposure length. In a case of small-size paper such as when the size of a sheet is A5, the exposure length is set at "small." In a case of medium-size paper such as A4, the exposure length is set at "medium." In a case of large-size paper such as A3, the exposure length is set at "large." In this case, the exposure length is defined such that "small" is 30 mm, "medium" is 50 mm, and "large" is 70 mm. With this exposure length, the hang-down length becomes smaller than 1 mm, and this state causes the user to easily take out the sheets. However, at this time, the exposure length of the sheets can be set so that the center of gravity of the sheets does not go beyond the opening 250. This is because, if the sheets are pushed out to a position at which the center of gravity goes beyond the opening 250, the sheets may slip down from the opening 250 before the user takes out the sheets.

Next, a flowchart and a specific example of this embodiment are described with reference to FIGS. 48 and 49. Control based on the flowchart in FIG. 48 is executed by the controller 302 described in FIG. 4 based on a program stored in the memory 305.

Figure 48:
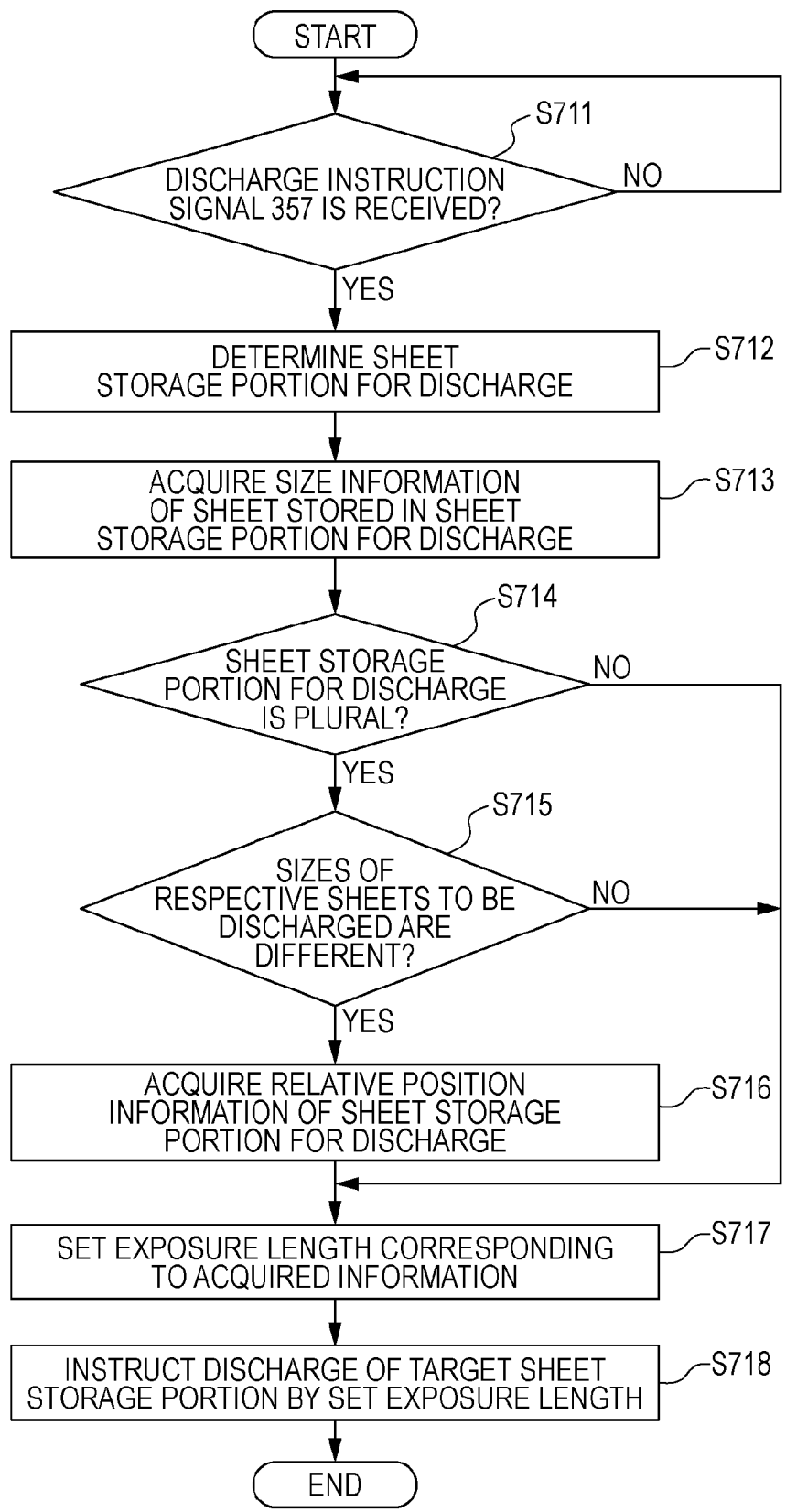
FIG. 48 is a flowchart showing an operation of the control unit according to the twelfth embodiment of the invention.

In FIG. 48, when the user gives a discharge instruction for sheets stored in a sheet storage portion through the external device 300 or the operation unit 307, the controller 302 is notified of a discharge instruction signal 357 (S711). When the controller 302 receives the discharge instruction signal 357, the controller 302 determines a sheet storage portion for discharge (S712). Then, the controller 302 acquires information of the size of sheets stored in the sheet storage portion for the discharge (S713). The information of the size of the sheets is acquired because the user inputs the information through the external device 300 or the operation unit 307 or because various sensors are provided in the apparatus. A known sensor that detects the size of a sheet in the conveying direction is a registration sensor (not shown). The registration sensor can detect the size of a sheet in the conveying direction in accordance with the conveying speed of the sheet and the period of time in which the registration sensor detects the sheet. Then, the acquired information is stored in the memory 305. The controller 302 reads the information from the memory 305, and can acquire information of the size. Then, the controller 302 determines whether the sheet storage portion for the discharge is one or plural (S714). If the sheet storage portion for the discharge is one, the controller 302 sets an exposure length corresponding to the acquired information (S717), and instructs the discharge of the one sheet storage portion as the discharge target with the set exposure length (S718).

Figure 49:
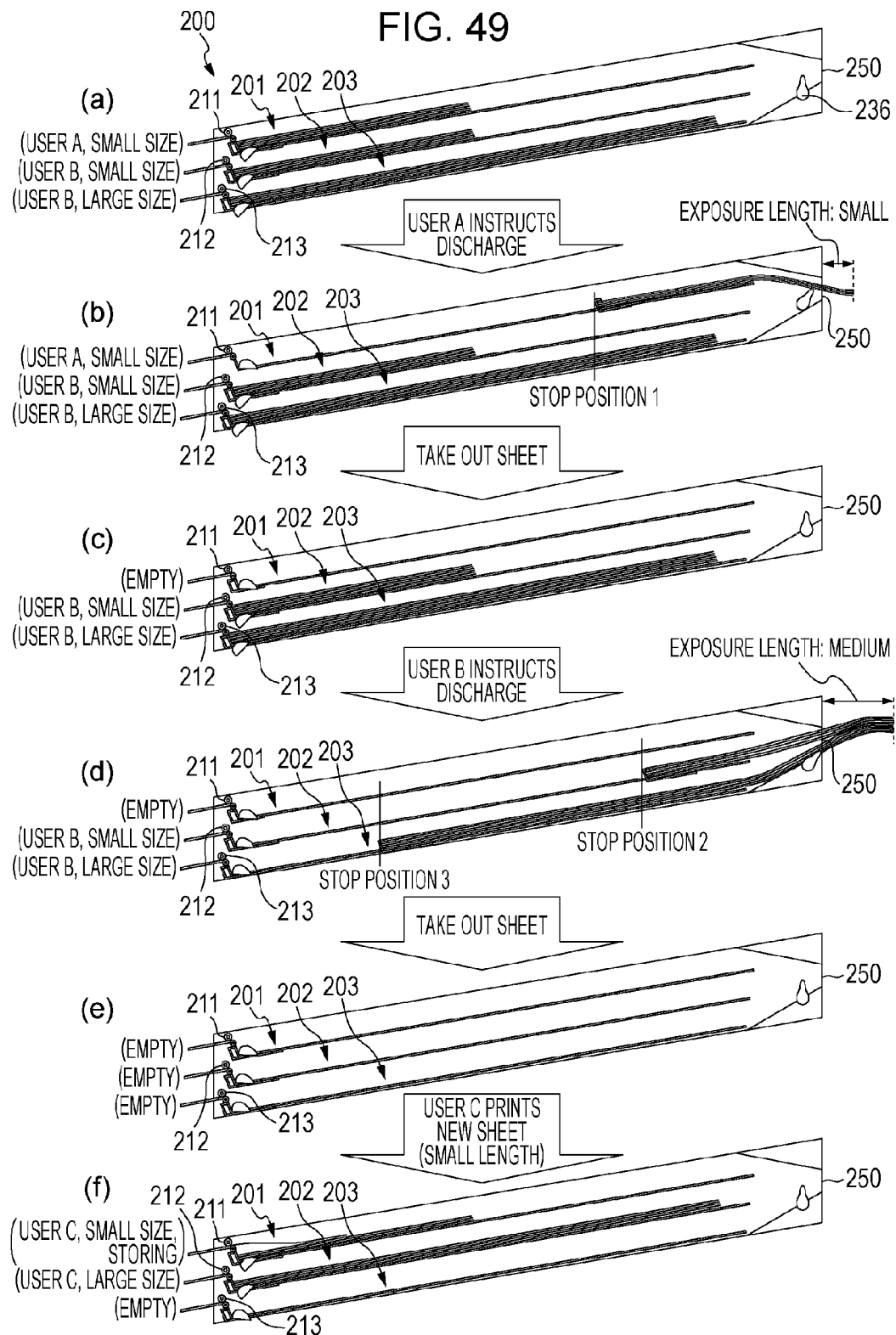
FIG. 49 illustrates a specific example to which the twelfth embodiment of the invention is applied.

Part (a) to part (c) of FIG. 49 illustrate a specific example when the sheet storage portion for discharge is one.

In part (a) of FIG. 49, the sheet storage device 200 includes three sheet storage portions. The sheet storage portion 201 stores small-size paper instructed by a user A for printing. The sheet storage portion 202 stores small-size paper instructed by a user B for printing. The sheet storage portion 203 stores large-size paper instructed by the user B for printing.

Part (b) of FIG. 49 illustrates a state in which the user A gives a discharge instruction in the state shown in part (a) of FIG. 49 and the sheets in the sheet storage portion 201 are exposed to the outside. Since the sheet storage portion 201 stores the small-size paper, the sheet moving unit 241 pushes out the trailing edges of the sheets to a stop position 1 and exposes the sheets from the opening 250 by an exposure length of "small."

Part (c) of FIG. 49 illustrates a state in which, the sheets in the sheet storage portion 201 are exposed, and then the sheets are pulled out by the user A. If it is detected that the sheets have been pulled out when the opening sensor 236 is changed from ON to OFF, the sheet moving unit 241 moves from the exposure position to the stack position. Further, when the sheet sensor 231 detects that the sheet storage portion 201 does not store a sheet, the sheet storage portion 201 becomes available for storing new sheets.

When Sheet Storage Portion for Discharge is Plural in Twelfth Embodiment

Next, a case is described, in which the sheet storage portion for discharge is plural. In the image forming apparatus of this embodiment, as described above, if sheets stored in the plurality of sheet storage portions are exposed from the opening 250, the sheets are exposed in a stacked manner. Then, if the sheet bundle exposed in a stacked manner contains sheets with different sizes, the allowable exposure length may vary. FIG. 50 illustrates the result of an experiment for this. FIG. 50 shows allowable exposure lengths when sheets with two different sizes are exposed in a stacked manner. Five sheets are exposed from the upper-stage sheet storage portion and five sheets are exposed from the lower-stage sheet storage portion so that the number of sheets is 10 in total.

Referring to the result in FIG. 50, the allowable exposure length of the sheet bundle was 71 mm when the sheet bundle included the five sheets of small-size paper stored in the upper-stage sheet storage portion and the five sheets of large-size paper stored in the lower-stage sheet storage portion, and hence the sheet bundle included the 10 sheets in total. The value is larger than the allowable exposure length of the 10 sheets of small-size paper shown in FIG. 13 by 16 mm, and is smaller than the allowable exposure length of the 10 sheets of large-size paper by 4 mm. The allowable exposure length increased as compared with the 10 sheets of small-size paper because the large-size paper having a stable posture at the lower stage served as a base of the small-size paper at the upper stage when the sheets were exposed from the opening 250 and the large-size paper restricted the small-size paper at the upper stage from bending. Meanwhile, the large-size paper at the lower stage receives a force in the gravity direction from the small-size paper having an unstable posture at the upper stage and the large-size paper more likely bends as compared with a case in which the sheets at the upper stage are large-size paper. Owing to this, the allowable exposure length is smaller than the case of the 10 sheets of large-size paper.

In contrast, the allowable exposure length of the sheet bundle was 55 mm when the sheet bundle included five sheets of large-size paper stored in the upper-stage sheet storage portion and five sheets of small-size paper stored in the lower-stage sheet storage portion, and hence the sheet bundle included the 10 sheets in total. This is the same value as the allowable exposure length of 10 sheets of small-size paper shown in FIG. 13. This is because, since the small-size paper has an unstable posture, the small-size paper at the lower stage hangs down earlier than the large-size paper at the upper stage. A portion exposed from the opening 250 of the small-size paper at the lower stage markedly hangs down by the self weight before the small-size paper receives the force in the gravity direction from the large-size paper at the upper stage. The state is the same as that only small-size paper is exposed, and hence the allowable exposure length is the same as the exposure length of the small-size paper.

With regard to this result, in this embodiment, the exposure length is set in accordance with the size of the sheets and the relative positional relationship among the sheet storage portions as long as the exposure length does not exceed the allowable exposure length. If the size of sheets stored in the upper-stage sheet storage portion is smaller than the size of sheets stored in the lower-stage sheet storage portion, the exposure length of the sheets at the upper stage is set to be smaller by a step than the exposure length corresponding to the sheets at the lower stage. For example, if the upper stage stores small-size paper and the lower stage stores large-size paper, the set exposure length is "medium" that is smaller by a step than "large" corresponding to the large-size paper. In contrast, if the size of sheets stored in the upper-stage sheet storage portion is larger than the size of sheets stored in the lower-stage sheet storage portion, the exposure length of the sheets at the upper stage is set to correspond to the sheets at the lower stage. For example, if the upper stage stores large-size paper and the lower stage stores small-size paper, the set exposure length is "small" corresponding to the small-size paper.

Next, a flowchart and a specific example of this embodiment are described with reference to FIGS. 48 and 49.

In FIG. 48, if the sheet storage portion for discharge is plural, it is determined whether or not the sizes of respective sheets to be discharged are different (S715). If the sizes of the respective sheets to be discharged are the same, processing similar to the case in which the sheet storage portion for discharge is one is executed. In contrast, if the sizes of the respective sheets to be discharged are different, relative position information of the sheet storage portions for discharge is acquired (S716). The relative position information is information indicative of whether a specific sheet storage portion among a plurality of sheet storage portions for discharge is located at the upper stage or the lower stage in the vertical direction. The controller 302 sets the exposure lengths corresponding to the acquired information of the size and the acquired position information (S717), and designates discharge of the plurality of sheet storage portions as the discharge targets with the set exposure lengths (S718).

Part (c) to part (e) of FIG. 49 illustrate a specific example when the sheet storage portion for discharge is plural. Part (f) of FIG. 49 illustrates a specific example when new sheets are stored.

Part (c) of FIG. 49 illustrates a state in which, the sheets in the sheet storage portion 201 are exposed, and then the sheets are pulled out by the user A. The sheet storage portion 202 stores small-size paper instructed by a user B for printing. The sheet storage portion 203 stores large-size paper instructed by the user B for printing.

Part (d) of FIG. 49 illustrates a state in which the user B gives a discharge instruction in the state shown in part (c) of FIG. 49 and the sheets in the sheet storage portion 202 and the sheet storage portion 203 are exposed to the outside. The sheets stored in the two sheet storage portions have different sizes. The size of the sheets stored in the upper-stage sheet storage portion 202 is smaller than the size of the sheets stored in the lower-stage sheet storage portion 203. Owing to this, the sheet moving unit 242 pushes out the trailing edges of the sheets to a stop position 2, and the sheet moving unit 243 pushes out the trailing edges of the sheets to a stop position 3, to expose the sheets from the opening 250 by an exposure length of "medium" that is smaller by a step than the exposure length of "large" corresponding to the thick paper.

Part (e) of FIG. 49 illustrates a state in which, the sheets in the sheet storage portions 202 and 203 are exposed, and then the sheets are pulled out by the user B. If it is detected that the sheets have been pulled out when the opening sensor 236 is changed from ON to OFF, the sheet moving units 242 and 243 move from the exposure positions to the stack positions. Further, when the sheet sensors 232 and 233 detect that the sheet storage portion 202 or 203 does not store a sheet, the sheet storage portions 202 and 203 become available for storing new sheets.

Part (f) of FIG. 49 illustrates a state in which sheets newly instructed by a user C for printing are stored in the sheet storage portions 201 and 202. If the sheets are exposed from the plurality of sheet storage portions, the exposure length can be consequently large if small-size sheets are stored at the upper stage and large-size sheets are stored at the lower stage. Hence, if the same user instructs a plurality of print jobs and sheets have different sizes, the sheets with a large size are stored in the lower-stage sheet storage portion with priority.

In this embodiment, the corresponding exposure length is set by dividing types of sheets into three groups of small-size paper, medium-size paper, and large-size paper in accordance with the size of the sheets. However, the exposure length may be set more specifically in accordance with the size.

Also, when sheets are exposed from a plurality of sheet storage portions, the exposure length may be set by the above-described method, or other considerable method of setting an exposure length. For example, the exposure length may be set in accordance with an average value of exposure lengths corresponding to sizes of respective sheets, or by calculating a weighted average in accordance with the numbers of respective sheets.

Also, in this embodiment, it is assumed that one sheet storage portion stores sheets with the same size. However, one sheet storage portion may store sheets with different sizes. In this case, even if the sheet storage portion for discharge is one, the processing goes to S715, and acquires relative position information in S716. In this case, the position information acquired in S716 is not position information of a sheet storage portion for discharge, but position information of sheets to be discharged. The position information of sheets to be discharged is information indicative of whether a sheet with a specific size in one sheet storage portion for discharge is located at the upper side or the lower side in the vertical direction. That is, the order of the sheet stored in the sheet storage portion. Then, the controller 302 sets the exposure length corresponding to the acquired information (S717), and instructs discharge with the set exposure length (S718).

As described above, by changing the length by which a sheet is exposed to the outside from the opening in accordance with the size of the sheet, the sheet can be prevented from unnecessarily bending.

In the above-described eleventh and twelfth embodiments, the sheet moving units of the respective sheet storage portions have the individual actuators. Accordingly, by driving the actuators simultaneously, sheets stored in a plurality of sheet storage portions can be exposed in a stacked manner. Alternatively, actuators may be provided by a number smaller than the number of sheet storage portions, and for example, a drive transmission switch unit, such as a clutch (not shown), may be provided. Accordingly, a plurality of sheet moving units may be selectively moved by one actuator.

Also, in the above-described eleventh and twelfth embodiments, the controller 302 has the memory 305. However, the memory 305 may be provided in the engine control unit 303 or the sheet-storage-device control unit 304, or may be independently provided as a memory unit in the image-forming-apparatus control unit 301.

Figure 51:
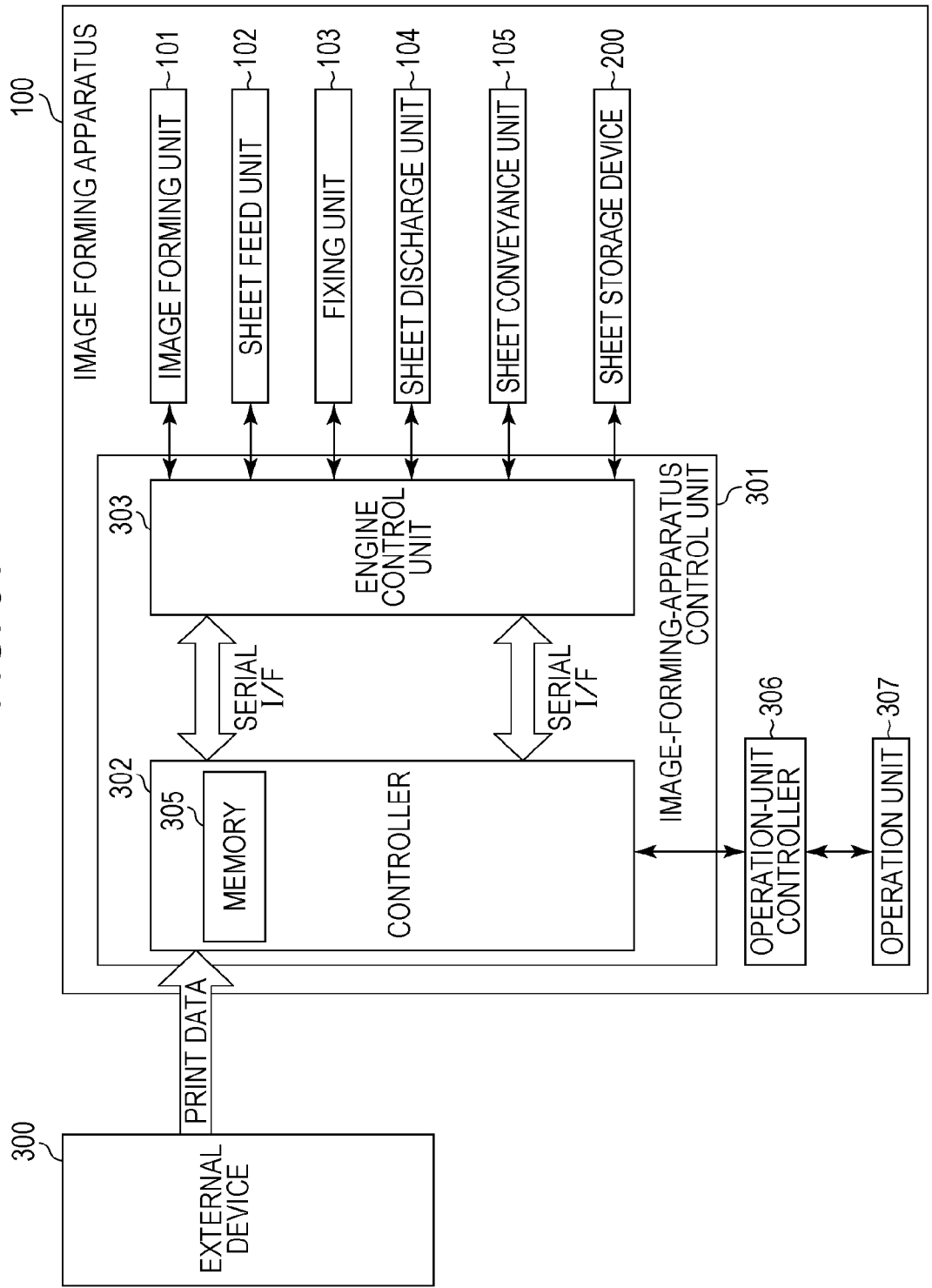
FIG. 51 is a block diagram showing a control unit and a function configuration of an image forming apparatus according to a modification of the invention.

Also, in the above-described eleventh and twelfth embodiments, the engine control unit 303 and the sheet-storage-device control unit 304 are individually configured. However, as shown in FIG. 51, the engine control unit 303 and the sheet-storage-device control unit 304 may be integrally configured. In this case, the engine control unit 303 may control the sheet conveyance unit 105 and the sheet storage device 200.

Also, in the above-described eleventh and twelfth embodiments, the configuration with the three sheet storage portions is described. However, the number of sheet storage portions is not limited to three. The number of sheet storage portions may be set in accordance with the environment in which the apparatus body is used, the number of users who use the apparatus in a shared manner, or the specification of the apparatus body.

Also, in the above-described eleventh and twelfth embodiments, the sheet conveying paths are combined at the downstream sides of the respective sheet storage portions, and only the one opening is provided. However, a plurality of openings may be additionally provided. In this case, the operation of the above-described embodiments can be applied to a case in which sheets of the plurality of sheet storage portions are exposed from one of the plurality of openings.

Also, in the above-described eleventh and twelfth embodiments, the example of a laser beam printer is shown. The image forming apparatus to which the invention is applied is not limited thereto. A printer of other print method, such as an inkjet printer, or a copier may be employed.

Also, in the above described embodiments, when sheets stored in a plurality of sheet storage portions are exposed in a stacked manner from the opening, the sheet moving units of the respective sheet storage portions may be moved at the same timing, or may be moved at different timings. Further, if the actuators that drive the sheet moving units are replaced with small low-cost actuators so that only one sheet moving unit can be moved at a time, the sheet moving units of the respective sheet storage portions may be separately moved. That is, if sheets stored in the storage portions 202 and 203 are exposed from the opening 250 as shown in FIG. 11, the sheet moving unit of the storage portion 202 is first moved from the stack position to the exposure position. After the exposure of the sheet from the storage portion 202 is completed, the sheet moving unit of the storage portion 203 is moved from the stack position to the exposure position to expose the sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-253461, filed Nov. 19, 2012, 2012-253462, filed Nov. 19, 2012, 2012-272626, filed Dec. 13, 2012, and 2013-129229, filed Jun. 20, 2013 which are hereby incorporated by reference herein in their entirety.

The invention claimed is:

1. An image forming apparatus comprising:
a main body formed with an opening;
an image forming unit configured to form an image on a sheet;
a plurality of storage portions each configured to store a sheet on which the image has been formed by the image forming unit inside the main body;
a sheet moving unit configured to move the sheet stored in each of the plurality of the storage portions, and stop the sheet in an exposure state in which a back part of the sheet including a back edge of the sheet is inside the main body and a front part of the sheet including a front edge of the sheet is exposed outside the main body through the opening;
an attribute information adding unit configured to add attribute information to print information corresponding to a sheet to be stored in the storage portion; and
a memory unit configured to store the attribute information added by the attribute information adding unit,
wherein the sheet moving unit moves a first sheet stored in a first storage portion and a second sheet stored in a second storage portion, the first sheet and the second sheet corresponding to predetermined information contained in the attribute information stored in the memory unit, and stops the first sheet and the second sheet in the exposure state, wherein the front part of the first sheet and the front part of the second sheet are exposed outside the main body through the same opening.

2. The image forming apparatus according to claim 1, wherein the predetermined information contained in the attribute information is a job number of a sheet.

3. The image forming apparatus according to claim 1, wherein the predetermined information contained in the attribute information is user information of a user who has instructed printing of a sheet.

4. The image forming apparatus according to claim 1, wherein the predetermined information contained in the attribute information is a time at which a sheet has been printed.

5. The image forming apparatus according to claim 1, wherein the predetermined information contained in the attribute information is a size of a sheet.

6. The image forming apparatus according to claim 1, wherein the predetermined information contained in the attribute information is information relating to a function which has printed a sheet.

7. The image forming apparatus according to claim 1, further comprising:
a receiving unit configured to receive user information of a user, who has instructed printing of a sheet stored in the storage portion,
wherein the predetermined information contained in the attribute information is user information of a user, who has instructed printing of a sheet, and the memory unit stores user information of a user, who has instructed printing of a sheet stored in the storage portion, and
wherein, in a case that the user information acquired by the receiving unit corresponds to the user information stored in the memory unit, the sheet moving unit moves sheets of the corresponding user from the plurality of storage portions, and stops the sheets in the exposure state, wherein the front parts of the sheets are exposed outside the main body through the same opening.

8. The image forming apparatus according to claim 7, further comprising:
a display unit configured to display information relating to image formation and receive an input of an operation by a user,
wherein the user information or group information is acquired by the receiving unit when the user inputs the user information or the group information to the display unit.

9. The image forming apparatus according to claim 7, further comprising:
an ID card reader configured to read an ID card,
wherein the user information or group information is acquired by the receiving unit when a user causes the ID card reader to read the ID card.

10. The image forming apparatus according to claim 1, wherein the sheet moving unit includes:
a first sheet moving portion configured to move the first sheet stored in the first storage portion, and stop the first sheet in the exposure state; and
a second sheet moving portion configured to move the second sheet stored in the second storage portion, and stop the second sheet in the exposure state,
wherein the first sheet moving portion and the second sheet moving portion simultaneously start to move, and wherein the front part of the first sheet and the front part of the second sheet are exposed outside the main body through the same opening.

11. The image forming apparatus according to claim 1, wherein the sheet moving unit includes:
a first sheet moving portion configured to move the first sheet stored in the first storage portion, and stop the first sheet in the exposure state; and
a second sheet moving portion configured to move the second sheet stored in the second storage portion, and stop the second sheet in the exposure state, and
wherein the first sheet moving portion starts to move and the front part of the first sheet is exposed outside the main body through the opening, and then the second sheet moving portion starts to move and the front part of the second sheet is exposed outside the main body through the opening through which the front part of the first sheet is exposed outside the main body.

12. The image forming apparatus according to claim 1, wherein the first sheet and the second sheet contact each other in a case that the first sheet and the second sheet are in the exposure state.

13. An image forming apparatus comprising:
a main body formed with an opening;
an image forming unit configured to form an image on a sheet;
a plurality of storage portions each configured to store a sheet on which the image has been formed by the image forming unit inside the main body;
a sheet moving unit configured to move the sheet stored in each of the plurality of storage portions, and stop the sheet in an exposure state in which a back part of the sheet including a back edge of the sheet is inside the main body and a front part of the sheet including a front edge of the sheet is exposed outside the main body through the same opening;
a memory unit configured to store information relating to the sheet stored in each of the plurality of the storage portions; and
a control unit configured to execute a switching control for switching a first control in which the sheet moving unit moves the sheet stored in each of the plurality of the storage portions to have the same exposure length and a second control in which the sheet moving unit moves the sheet stored in each of the plurality of the storage portions to have different exposure lengths based on the information stored in the memory unit, the exposure length being a length of the front part of the sheet.

14. The image forming apparatus according to claim 13, wherein the memory unit stores user information of respective users, who have instructed printing of sheets stored in the plurality of the storage portions,
wherein the sheet moving unit moves sheets to have the same exposure length in a case that the user information indicates the same user, who has instructed printing of the sheets to be exposed, and the sheet moving unit moves the sheets to have different exposure lengths in a case that the user information indicates different users.

15. The image forming apparatus according to claim 14, wherein the memory unit stores respective sheet sizes of sheets stored in the plurality of the storage portions, and
wherein, when the user information of the users who have instructed printing of sheets to be exposed indicates different users or job numbers of the sheets to be exposed are different, the sheet moving unit moves the sheets to have different exposure lengths in a case that sheet sizes of the sheets to be exposed are the same, and the sheet moving unit moves the sheets to have the same exposure length in a case that the sheet sizes are different.

16. The image forming apparatus according to claim 13, wherein the memory unit stores respective job numbers of sheets stored in the plurality of the storage portions,
wherein the sheet moving unit moves sheets to have the same exposure length in a case that the job numbers of sheets to be exposed are the same, and the sheet moving unit moves the sheets to have different exposure lengths in a case that the job numbers are different.

17. The image forming apparatus according to claim 13, wherein the memory unit stores respective sheet sizes of sheets stored in the plurality of the storage portions,
wherein the sheet moving unit moves sheets to have different exposure lengths in a case that the sheet sizes of sheets to be exposed are the same, and the sheet moving unit moves the sheets to have the same exposure length in a case that the sheet sizes are different.

18. An image forming apparatus comprising:
a main body formed with an opening;
an image forming unit configured to form an image on a sheet;
a plurality of storage portions each configured to store a sheet on which the image has been formed by the image forming unit inside the main body;
a conveying unit configured to convey the sheet on which the image has been formed by the image forming unit to any of the plurality of the storage portions; and
a sheet moving unit configured to move the sheet stored in each of the plurality of the storage portions, and stop the sheet in an exposure state in which a back part of the sheet including a back edge of the sheet is inside the main body and a front part of the sheet including a front edge of the sheet is exposed outside the main body through the opening,
wherein, in a case that the conveying unit conveys a predetermined number of sheets that is larger than the number of sheets that can be stored in one of the storage portions, the conveying unit conveys the sheets to the plurality of storage portions, and the sheet moving unit moves the sheets stored in the plurality of storage portions, and stops the sheets in the exposure state, wherein the front parts of the sheets are exposed outside the main body through the same opening.

19. The image forming apparatus according to claim 18, wherein the predetermined number is larger than the number of sheets that can be stored in one of the storage portions and is equal to or smaller than the number of sheets that can be stored in all storage portions not storing a sheet.

20. The image forming apparatus according to claim 19, wherein the conveying unit selects the storage portion to which sheets are conveyed, in accordance with an order of pages of sheets on which the image has been formed by the image forming unit, and a positional relationship among storage portions not storing a sheet.

21. An image forming apparatus comprising:
a main body formed with an opening;
an image forming unit configured to form an image on a sheet;
a storage portion configured to store the sheet on which the image has been formed by the image forming unit inside the main body;
and
a sheet moving unit configured to move the sheet stored in the storage portion, and stop the sheet in an exposure state in which a back part of the sheet including a back edge of the sheet is inside the main body and a front part of the sheet including a front edge of the sheet is exposed outside the main body through the opening, wherein the sheet moving unit moves the sheet so that an exposure length, which is a length of the front part of the sheet, is changed in accordance with a type of the sheet.

22. The image forming apparatus according to claim 21, wherein the sheet moving unit moves the sheet so that the exposure length is changed in accordance with a basis weight of the sheet.

23. The image forming apparatus according to claim 22, wherein, in a case that a basis weight of a first sheet is smaller than a basis weight of a second sheet, the sheet moving unit moves the first sheet so that the exposure length of the first sheet becomes shorter than the exposure length of the second sheet.

24. The image forming apparatus according to claim 22, wherein, in a case that a basis weight of a first sheet is different from a basis weight of a second sheet, the sheet moving unit moves the first sheet and the second sheet so that the exposure lengths are changed in accordance with the basis weights of the first sheet and the second sheet, and position information of the first sheet and the second sheet.

25. The image forming apparatus according to claim 24, wherein, in a case that the first sheet located at an upper position in a vertical direction has a smaller basis weight than the basis weight of the second sheet located at a lower position among the plurality of sheets, the sheet moving unit moves the first sheet and the second sheet so that the exposure length of the first sheet and the exposure length of the second sheet become longer than the exposure length corresponding to the basis weight of the first sheet and shorter than the exposure length corresponding to the basis weight of the second sheet.

26. The image forming apparatus according to claim 24, wherein, in a case that the first sheet located at an upper position in a vertical direction has a larger basis weight than the basis weight of the second sheet located at a lower position among the plurality of sheets, the sheet moving unit moves the first sheet and the second sheet so that the exposure length of the first sheet and the exposure length of the second sheet become shorter than or equal to the exposure length corresponding to the basis weight of the second sheet.

27. The image forming apparatus according to claim 24, wherein, in a case that the first sheet located at an upper position in a vertical direction has a smaller basis weight than the basis weight of the second sheet located at a lower position among the plurality of sheets, the sheet moving unit moves the first sheet and the second sheet so that the exposure length of the first sheet and the exposure length of the second sheet become longer than an exposure length corresponding to the basis weight of the first sheet.

28. The image forming apparatus according to claim 24, further comprising:
a plurality of the storage portions stacked in the vertical direction,
wherein the sheet moving unit moves the first sheet stored in a first storage portion and the second sheet stored in a second storage portion, and stops the first sheet and the second sheet in the exposure state, and wherein the front part of the first sheet and the front part of the second sheet are exposed outside the main body through the same opening.

29. The image forming apparatus according to claim 28, further comprising:
a conveying unit configured to convey the sheet on which the image has been formed by the image forming unit to any of the plurality of storage portions,
wherein, in a case that a basis weight of a third sheet is smaller than a basis weight of a fourth sheet, the conveying unit conveys the third sheet to a storage portion located at an upper stage of a storage portion that stores the fourth sheet.

30. The image forming apparatus according to claim 21, wherein the sheet moving unit moves a sheet so that the exposure length is changed in accordance with a size of the sheet.

31. The image forming apparatus according to claim 30, wherein, in a case that a size of a first sheet is smaller than a size of a second sheet, the sheet moving unit moves the first sheet so that the exposure length of the first sheet becomes shorter than the exposure length of the second sheet.

32. The image forming apparatus according to claim 30, wherein, in a case that a size of a first sheet is different from a size of a second sheet, the sheet moving unit moves the first sheet and the second sheet so that the exposure lengths are changed in accordance with the sizes of the first sheet and the second sheet, and position information of the first sheet and the second sheet.

33. The image forming apparatus according to claim 32, wherein, in a case that the first sheet located at an upper position in a vertical direction has a smaller size than the size of the second sheet located at a lower position among the plurality of sheets, the sheet moving unit moves the first sheet and the second sheet so that the exposure length of the first sheet and the exposure length of the second sheet become larger than the exposure length corresponding to the size of the first sheet and smaller than the exposure length corresponding to the size of the second sheet.

34. The image forming apparatus according to claim 32, wherein, in a case that the first sheet located at an upper position in a vertical direction has a larger size than the size of the second sheet located at a lower position among the plurality of sheets, the sheet moving unit moves the first sheet and the second sheet so that the exposure length of the first sheet and the exposure length of the second sheet become shorter than or equal to the exposure length corresponding to the size of the second sheet.

35. The image forming apparatus according to claim 32, wherein, in a case that the first sheet located at an upper position in a vertical direction has a smaller size than the size of the second sheet located at a lower position among the plurality of sheets, the sheet moving unit moves the first sheet and the second sheet so that the exposure length of the first sheet and the exposure length of the second sheet become longer than an exposure length corresponding to the size of the first sheet.

36. The image forming apparatus according to claim 32, further comprising:
a plurality of the storage portions stacked in the vertical direction,
wherein the sheet moving unit moves the first sheet stored in a first storage portion and the second sheet stored in a second storage portion, and stops the first sheet and the second sheet in the exposure state, and wherein the front part of the first sheet and the front part of the second sheet are exposed outside the main body through the same opening.

37. The image forming apparatus according to claim 36, further comprising:
- a conveying unit configured to convey the sheet on which the image has been formed by the image forming unit to any of the plurality of storage portions,
- wherein, in a case that a size of a third sheet is smaller than a size of a fourth sheet, the conveying unit conveys the third sheet to a storage portion located at an upper stage of a storage portion storing the fourth sheet.

38. The image forming apparatus according to claim 21, further comprising:
- a detecting unit configured to detect a type of a sheet,
- wherein the sheet moving unit moves the sheet so that the exposure length is changed in accordance with the type of the sheet detected by the detecting unit.

39. The image forming apparatus according to claim 21, wherein the sheet moving unit moves the sheet so that a center of gravity of the sheet does not go beyond the opening.

40. The image forming apparatus according to claim 21,
- wherein the storage portion includes a tray on which the sheet is stacked, and
- wherein the back part of the sheet contacts with the tray and the front part of the sheet does not contact with the tray in a case that the sheet is in the exposure state.

41. An image forming apparatus comprising:
- a main body formed with an opening;
- an image forming unit configured to form an image on a sheet;
- a plurality of storage portions each configured to store a sheet on which the image has been formed by the image forming unit inside the main body in a storage state in which the sheet is not exposed outside the main body through the opening; and
- a sheet moving unit configured to move the sheet stored in each of the plurality of the storage portions, and stop the sheet in an exposure state in which a back part of the sheet including a back edge of the sheet is inside the main body and a front part of the sheet including a front edge of the sheet is exposed outside the main body through the opening,
- wherein the sheet moving unit moves a first sheet stored in a first storage portion and a second sheet stored in a second storage portion, and stops the first sheet and the second sheet in the exposure state, and wherein the front part of the first sheet and the front part of the second sheet are exposed outside the main body through the same opening,
- wherein the sheet moving unit moves the first sheet and the second sheet to have different exposure lengths, each of which is a length of the front part of the sheet.

42. The image forming apparatus according to claim 41, further comprising:
- a control unit configured to receive a discharge instruction, and
- wherein the sheet moving unit starts to move the sheet stored in each of the plurality of the storage portions in a case that the control unit receives the discharge instruction.

* * * * *